United States Patent
Bushong et al.

(10) Patent No.: US 7,740,984 B2
(45) Date of Patent: Jun. 22, 2010

(54) ALKALINE CELLS HAVING HIGH CAPACITY

(75) Inventors: William C. Bushong, Madison, WI (US); Paul Cheeseman, Verona, WI (US); Zhihong Jin, Cottage Grove, WI (US); Erik Mortensen, Sun Prairie, WI (US); Ernest Ndzebet, Madison, WI (US); Karthik Ramaswami, Middleton, WI (US); Viet H. Vu, Verona, WI (US); Deborah Gilbert, Fitchburg, WI (US); Juergen Scherer, Karlsdorf (DE)

(73) Assignee: Rovcal, Inc., Madison, WI (US)

( * ) Notice: Subject to any disclaimer, the term of this patent is extended or adjusted under 35 U.S.C. 154(b) by 473 days.

(21) Appl. No.: 11/055,508

(22) Filed: Feb. 8, 2005

(65) Prior Publication Data

US 2005/0271941 A1 Dec. 8, 2005

Related U.S. Application Data

(63) Continuation-in-part of application No. 10/914,958, filed on Aug. 9, 2004, and a continuation-in-part of application No. 10/914,911, filed on Aug. 9, 2004, and a continuation-in-part of application No. 10/914,934, filed on Aug. 9, 2004, now Pat. No. 7,645,540.

(60) Provisional application No. 60/577,292, filed on Jun. 4, 2004.

(51) Int. Cl.
*H01M 4/50* (2010.01)
*H01M 4/58* (2010.01)
*H01M 4/00* (2010.01)
*H01M 4/42* (2010.01)
*H01M 4/02* (2010.01)
*H01M 2/16* (2010.01)
*H01M 6/00* (2010.01)

(52) U.S. Cl. .................. 429/224; 429/218.1; 429/220; 429/209; 429/246; 429/122

(58) Field of Classification Search ............... 429/122, 429/218.1, 224, 220, 209, 246
See application file for complete search history.

(56) References Cited

U.S. PATENT DOCUMENTS 274,110 A 3/1883 De Lalande et al.

(Continued)

FOREIGN PATENT DOCUMENTS

EP 0 747 983 A1 12/1996

(Continued)

OTHER PUBLICATIONS

International Search Report from PCT/US2004/025895, dated May 18, 2006.

(Continued)

*Primary Examiner*—Patrick Ryan
*Assistant Examiner*—Helen O Conley
(74) *Attorney, Agent, or Firm*—Armstrong Teasdale LLP

(57) ABSTRACT

Aspects of the present invention provide a high capacity electrochemical cell having an anode, a cathode, and a separator disposed between the anode and cathode. The cathode includes a mixture having a first component, a second component and a third component. The first component includes a first element, the second component includes a second element, and the third component includes the first element and the second element. The mixture can, for instance, be a mixed metal oxide. The separator is configured to provide suitable ionic transport between the anode and the cathode.

46 Claims, 23 Drawing Sheets

U.S. PATENT DOCUMENTS

| | | |
|---|---|---|
| 430,279 A | 6/1890 | Edison |
| 479,887 A | 8/1892 | De Lalande |
| 519,330 A | 5/1894 | Hertel |
| 533,078 A | 1/1895 | O'Toole |
| 555,304 A | 2/1896 | Crowdus |
| 684,204 A | 1/1901 | Edison |
| 762,425 A | 6/1904 | Lord |
| 871,214 A | 11/1907 | Edison |
| 1,134,093 A | 4/1915 | Bauer |
| 1,255,283 A | 2/1918 | Benner et al. |
| 1,282,057 A | 10/1918 | Erwin |
| 1,316,760 A | 10/1919 | Benner et al. |
| 1,316,761 A | 10/1919 | Benner et al. |
| 1,375,647 A | 4/1921 | Benner et al |
| 1,378,549 A | 5/1921 | Manchester et al. |
| 1,415,880 A | 5/1922 | Benner et al. |
| 1,434,469 A | 11/1922 | Wilker |
| 1,437,287 A | 11/1922 | Willis |
| 1,438,086 A | 12/1922 | Benner et al. |
| 1,450,004 A | 3/1923 | Martus |
| 1,486,955 A | 3/1924 | Dunham |
| 1,564,741 A | 12/1925 | Wolfe |
| 1,579,558 A | 4/1926 | Martus et al. |
| 1,599,121 A | 9/1926 | Edison |
| 1,602,402 A | 10/1926 | Flath |
| 1,624,480 A | 4/1927 | Armstrong |
| 1,624,845 A | 4/1927 | Nyberg |
| 1,637,446 A | 8/1927 | Hendry |
| 1,644,344 A | 10/1927 | Martus et al. |
| 1,644,389 A | 10/1927 | Marius et al. |
| 1,657,543 A | 1/1928 | Lynn |
| 1,706,895 A | 3/1929 | Martus et al. |
| 1,711,462 A | 4/1929 | Wescott |
| 1,725,716 A | 8/1929 | Martus et al. |
| 1,784,592 A | 12/1930 | Heise et al. |
| 1,786,945 A | 12/1930 | Hendry |
| 1,815,508 A | 7/1931 | Heise |
| 1,830,234 A | 11/1931 | Martus et al. |
| 1,831,460 A | 11/1931 | Martus et al. |
| 1,835,867 A | 12/1931 | Heise |
| 1,835,868 A | 12/1931 | Heise |
| 1,836,720 A | 12/1931 | Martus et al. |
| 1,856,917 A | 4/1932 | Martus |
| 1,863,791 A | 6/1932 | Heise |
| 1,864,652 A | 7/1932 | Heise |
| 1,920,151 A | 7/1933 | Ruben |
| 1,932,654 A | 10/1933 | Dunham |
| 1,936,792 A | 11/1933 | Kahler |
| 1,941,869 A | 1/1934 | Martus et al. |
| 2,048,804 A | 7/1936 | Martus et al. |
| 2,077,561 A | 4/1937 | Heise |
| 2,157,072 A | 5/1939 | Eddy |
| 2,175,885 A | 10/1939 | Eddy |
| 2,189,463 A | 2/1940 | Eddy |
| 2,233,593 A | 3/1941 | Eddy et al. |
| 2,269,040 A | 1/1942 | Rublee |
| 2,369,033 A | 2/1945 | Eubank |
| 2,390,574 A | 12/1945 | Dunham et al. |
| 2,422,045 A | 6/1947 | Ruben |
| 2,422,046 A | 6/1947 | Ruben |
| 2,441,481 A | 5/1948 | Garrity |
| 2,450,472 A | 10/1948 | Dunham et al. |
| 2,457,948 A | 1/1949 | Thomas |
| 2,458,876 A | 1/1949 | Ruben |
| 2,483,565 A | 3/1949 | Ruben |
| 2,473,646 A | 6/1949 | Ruben |
| 2,481,539 A | 9/1949 | Ruben |
| 2,502,723 A | 4/1950 | Harriss |
| 2,509,249 A | 5/1950 | Ruben |
| 2,526,692 A | 10/1950 | Ruben |
| 2,527,576 A | 10/1950 | Ruben |
| 2,542,574 A | 2/1951 | Ruben |
| 2,562,215 A | 7/1951 | Ruben |
| 2,594,714 A | 4/1952 | Andre |
| 2,612,534 A | 9/1952 | Blake |
| 2,635,127 A | 4/1953 | Yardney et al. |
| 2,650,945 A | 9/1953 | Herbert |
| 2,670,395 A | 2/1954 | Audubert |
| 2,679,546 A | 5/1954 | Eisen |
| 2,692,215 A | 10/1954 | Ruben |
| 2,701,272 A | 2/1955 | Reiner |
| 2,768,229 A | 10/1956 | Herbert |
| 2,786,088 A | 3/1957 | Robinson |
| 2,788,383 A | 4/1957 | Robinson |
| 2,809,226 A | 10/1957 | Morehouse et al. |
| 2,829,186 A | 4/1958 | Kort |
| 2,829,189 A | 4/1958 | Coleman et al. |
| 2,859,266 A | 11/1958 | Garvey et al. |
| 2,859,267 A | 11/1958 | Garvey et al. |
| 2,902,530 A | 9/1959 | Eisen |
| 2,942,050 A | 6/1960 | Denes et al. |
| 2,969,413 A | 1/1961 | Peters |
| 2,981,782 A | 4/1961 | Warren et al. |
| 2,991,412 A | 7/1961 | Kordesch |
| 2,993,946 A | 7/1961 | Lozier |
| 3,003,015 A | 10/1961 | Duddy |
| 3,016,413 A | 1/1962 | Pasquale et al. |
| 3,042,732 A | 7/1962 | Kordesch |
| 3,043,896 A | 7/1962 | Herbert et al. |
| 3,048,645 A | 8/1962 | Ruben |
| 3,056,849 A | 10/1962 | Warren et al. |
| 3,060,255 A | 10/1962 | Lozier |
| 3,100,163 A | 8/1963 | Lyons, Jr. |
| 3,100,164 A | 8/1963 | Solomon et al. |
| 3,114,659 A | 12/1963 | Warren |
| 3,121,029 A | 2/1964 | Duddy |
| 3,154,435 A | 10/1964 | Kitagawa et al. |
| 3,158,798 A | 11/1964 | Sauder |
| 3,170,820 A | 2/1965 | Drengler et al. |
| 3,189,486 A | 6/1965 | Pryor et al. |
| 3,205,096 A | 9/1965 | Honer et al. |
| 3,207,833 A | 9/1965 | Meltzer et al. |
| 3,214,299 A | 10/1965 | Balaguer |
| 3,236,690 A | 2/1966 | Booe et al. |
| 3,240,688 A | 3/1966 | Pryor et al. |
| 3,258,415 A | 6/1966 | Kordesch |
| 3,266,936 A | 8/1966 | Lrebs |
| 3,269,869 A | 8/1966 | Mendelsohn |
| 3,287,164 A | 11/1966 | Arrance |
| 3,287,166 A | 11/1966 | Arrance |
| 3,303,054 A | 2/1967 | Gruber et al. |
| 3,316,159 A | 4/1967 | Louzos et al. |
| 3,317,349 A | 5/1967 | Elliott et al. |
| 3,330,701 A | 7/1967 | McElhill et al. |
| 3,335,031 A | 8/1967 | Kordesch |
| 3,355,329 A | 11/1967 | Wilke |
| 3,368,924 A | 2/1968 | Benderly et al. |
| 3,368,952 A | 2/1968 | Pryor et al. |
| 3,368,958 A | 2/1968 | Pryor et al. |
| 3,415,688 A | 12/1968 | Foucry et al. |
| 3,433,679 A | 3/1969 | Johnson et al. |
| 3,441,445 A | 4/1969 | Ehrlich et al. |
| 3,466,195 A | 9/1969 | Spellman et al. |
| 3,468,710 A | 9/1969 | Krasnow et al. |
| 3,484,295 A | 12/1969 | Dawson |
| 3,537,397 A | 11/1970 | Ripley et al. |
| 3,597,276 A | 8/1971 | Jammet |
| 3,607,403 A | 9/1971 | Arrance |
| 3,615,858 A | 10/1971 | Soto-Krebs |
| 3,617,387 A | 11/1971 | Grulke et al. |
| 3,647,542 A | 3/1972 | Berger |
| 3,652,339 A | 3/1972 | Grulke |
| 3,655,450 A | 4/1972 | Soto-Krebs |
| 3,663,182 A | 5/1972 | Hamling |

| Patent No. | Date | Inventor | | Patent No. | Date | Inventor |
|---|---|---|---|---|---|---|
| 3,671,319 A | 6/1972 | Arrange | | 5,389,471 A | 2/1995 | Kung |
| 3,679,489 A | 7/1972 | Jammet | | 5,482,798 A | 1/1996 | Mototani et al. |
| 3,749,608 A | 7/1973 | Sarbacher | | 5,506,077 A * | 4/1996 | Koksbang .................. 429/224 |
| 3,757,793 A | 9/1973 | Fester et al. | | 5,516,604 A | 5/1996 | Mieczkowska et al. |
| 3,796,606 A | 3/1974 | Lehmann et al. | | 5,543,249 A | 8/1996 | Takeuchi et al. |
| 3,839,092 A | 10/1974 | Hausler et al. | | 5,554,460 A | 9/1996 | Wu et al. |
| 3,847,674 A | 11/1974 | Kegelman | | 5,614,331 A | 3/1997 | Takeuchi et al. |
| 3,853,630 A | 12/1974 | Hausler et al. | | 5,616,437 A | 4/1997 | Gao |
| 3,865,631 A | 2/1975 | Clayman | | 5,631,102 A | 5/1997 | Spillman et al. |
| 3,880,672 A | 4/1975 | Megahed et al. | | 5,639,577 A | 6/1997 | Takeuchi et al. |
| 3,884,721 A | 5/1975 | Tucholski | | 5,656,393 A | 8/1997 | Boer et al. |
| 3,894,889 A | 7/1975 | Gilliman et al. | | 5,667,910 A | 9/1997 | Takeuchi et al. |
| 3,897,265 A | 7/1975 | Jaggard | | 5,670,277 A * | 9/1997 | Barker et al. .................. 429/220 |
| 3,907,598 A | 9/1975 | Megahed | | 5,674,369 A | 10/1997 | Watanabe et al. |
| 3,923,550 A | 12/1975 | Von Krusenstierna | | 5,716,422 A | 2/1998 | Muffoletto et al. |
| 3,951,687 A | 4/1976 | Takamura et al. | | 5,716,734 A | 2/1998 | Nakano |
| 3,953,238 A | 4/1976 | Honer | | 5,744,014 A | 4/1998 | Gordon et al. |
| 3,953,241 A | 4/1976 | Langer et al. | | 5,753,389 A | 5/1998 | Gan et al. |
| 3,990,917 A | 11/1976 | Clayman | | 5,776,635 A | 7/1998 | Gan et al. |
| 4,015,055 A | 3/1977 | Langan et al. | | 5,814,419 A | 9/1998 | Kenyon et al. |
| 4,018,970 A | 4/1977 | Jumel et al. | | 5,846,673 A | 12/1998 | Saidi et al. |
| 4,025,698 A | 5/1977 | Von Krusenstierna | | 5,861,213 A | 1/1999 | Ohmory et al. |
| 4,037,033 A | 7/1977 | Takamura et al. | | 5,902,696 A | 5/1999 | Smesko et al. |
| 4,054,727 A | 10/1977 | O'Nan et al. | | 5,935,728 A | 8/1999 | Spillman et al. |
| 4,060,676 A | 11/1977 | Dey et al. | | 5,952,124 A | 9/1999 | Kainthla et al. |
| 4,084,047 A | 4/1978 | Himy et al. | | 5,962,166 A * | 10/1999 | Ein-Eli et al. .................. 429/224 |
| 4,091,181 A | 5/1978 | Merritt, Jr. | | 5,965,291 A | 10/1999 | Pyszczek |
| 4,104,420 A | 8/1978 | Jordan et al. | | 6,027,827 A | 2/2000 | Gan et al. |
| 4,105,480 A | 8/1978 | Sterling et al. | | 6,033,806 A | 3/2000 | Sugiura et al. |
| 4,154,912 A | 5/1979 | Philipp et al. | | 6,040,088 A | 3/2000 | Bennett et al. |
| 4,218,275 A | 8/1980 | Kadija et al. | | 6,060,184 A | 5/2000 | Gan et al. |
| 4,218,280 A | 8/1980 | Philipp et al. | | 6,063,526 A | 5/2000 | Gan et al. |
| 4,230,549 A | 10/1980 | D'Agostino et al. | | 6,068,950 A | 5/2000 | Gan et al. |
| 4,262,067 A | 4/1981 | Philipp et al. | | 6,096,447 A | 8/2000 | Gan et al. |
| 4,272,470 A | 6/1981 | Hsu et al. | | 6,096,453 A | 8/2000 | Grunwald |
| 4,277,572 A | 7/1981 | Fujiwara et al. | | 6,099,987 A | 8/2000 | Daniel-Ivad et al. |
| 4,310,609 A * | 1/1982 | Liang et al. .................. 429/330 | | 6,110,622 A | 8/2000 | Frysz et al. |
| 4,327,157 A | 4/1982 | Himy et al. | | 6,124,058 A | 9/2000 | Ohmory et al. |
| 4,331,746 A | 5/1982 | Sheibley | | 6,153,337 A | 11/2000 | Carlson et al. |
| 4,350,610 A | 9/1982 | Jung et al. | | 6,159,634 A | 12/2000 | Yen et al. |
| 4,357,402 A | 11/1982 | Sheibley et al. | | 6,174,622 B1 | 1/2001 | Thiebold, III et al. |
| 4,361,632 A | 11/1982 | Weber et al. | | 6,177,210 B1 | 1/2001 | Lonsberry |
| 4,371,596 A | 2/1983 | Sheibley | | 6,177,213 B1 | 1/2001 | Fetcenko et al. |
| 4,438,185 A | 3/1984 | Taskier | | 6,180,281 B1 | 1/2001 | Schneider et al. |
| 4,440,838 A | 4/1984 | Schmidt | | 6,183,901 B1 | 2/2001 | Ying et al. |
| 4,487,822 A | 12/1984 | Ruben | | 6,194,098 B1 | 2/2001 | Ying et al. |
| 4,490,448 A | 12/1984 | Williamson, III | | 6,200,706 B1 | 3/2001 | Ashida et al. |
| 4,505,998 A | 3/1985 | Hsu et al. | | 6,203,941 B1 | 3/2001 | Reichert et al. |
| 4,579,791 A | 4/1986 | Wang | | 6,207,324 B1 | 3/2001 | Licht |
| 4,604,335 A | 8/1986 | Johnson | | 6,248,478 B1 | 6/2001 | Friend et al. |
| 4,734,344 A | 3/1988 | Choi | | 6,261,721 B1 | 7/2001 | Andrieu et al. |
| 4,767,687 A | 8/1988 | LaBonte | | 6,274,269 B1 | 8/2001 | Gan et al. |
| 4,812,145 A | 3/1989 | LaBonte | | 6,284,410 B1 | 9/2001 | Durkot et al. |
| 4,833,050 A | 5/1989 | Whitney et al. | | 6,306,545 B1 | 10/2001 | Carlson et al. |
| 4,843,059 A | 6/1989 | Deslandes et al. | | 6,322,900 B1 | 11/2001 | Kiriazis |
| 4,937,154 A | 6/1990 | Moses et al. | | 6,368,365 B1 | 4/2002 | Chi et al. |
| 4,965,147 A | 10/1990 | Mas et al. | | 6,399,243 B1 | 6/2002 | Kaplan et al. |
| 5,019,467 A | 5/1991 | Fujiwara | | 6,403,256 B1 | 6/2002 | Gan et al. |
| 5,075,958 A | 12/1991 | Kelemen et al. | | 6,410,182 B1 | 6/2002 | Ying et al. |
| 5,077,150 A | 12/1991 | Yoneda | | 6,423,444 B1 | 7/2002 | Ying et al. |
| 5,122,375 A | 6/1992 | Sklarchuck et al. | | 6,444,360 B2 | 9/2002 | Gan et al. |
| 5,154,731 A | 10/1992 | Winger | | 6,444,364 B1 | 9/2002 | Harris et al. |
| 5,164,274 A | 11/1992 | Kordesch et al. | | 6,451,486 B1 | 9/2002 | Davis et al. |
| 5,208,120 A | 5/1993 | Winger | | 6,465,129 B1 | 10/2002 | Xu et al. |
| 5,219,685 A | 6/1993 | Taniguchi et al. | | 6,472,103 B1 | 10/2002 | Durkot et al. |
| 5,221,453 A * | 6/1993 | Crespi .................. 204/291 | | 6,489,056 B1 | 12/2002 | Davis et al. |
| 5,262,393 A | 11/1993 | Wada et al. | | 6,489,057 B1 * | 12/2002 | Yamada et al. .................. 429/220 |
| 5,268,243 A | 12/1993 | Noda et al. | | 6,495,292 B1 | 12/2002 | Yen |
| 5,283,139 A | 2/1994 | Newman et al. | | 6,503,658 B1 | 1/2003 | Klein et al. |
| 5,290,645 A | 3/1994 | Tanaka et al. | | 6,503,659 B1 | 1/2003 | Ovshinsky et al. |
| 5,298,348 A | 3/1994 | Kung | | 6,511,772 B2 | 1/2003 | Gan et al. |
| 5,366,832 A | 11/1994 | Hayashi et al. | | 6,511,774 B1 | 1/2003 | Tsukuda et al. |
| 5,374,611 A | 12/1994 | Dabrowski et al. | | 6,514,637 B2 | 2/2003 | Treger et al. |

| | | |
|---|---|---|
| 6,521,378 B2 | 2/2003 | Durkot et al. |
| 6,528,207 B2 | 3/2003 | Gan et al. |
| 6,537,698 B2 | 3/2003 | Gan et al. |
| 6,541,160 B2 | 4/2003 | Cheiky et al. |
| 6,551,747 B1 | 4/2003 | Gan |
| 6,562,515 B2 | 5/2003 | Gan et al. |
| 6,586,134 B2 | 7/2003 | Skoumpris |
| 6,586,135 B2 | 7/2003 | Gan et al. |
| 6,589,612 B1 | 7/2003 | Cintra et al. |
| 6,593,029 B2 | 7/2003 | Spillman et al. |
| 6,605,385 B2 | 8/2003 | Gan et al. |
| 6,627,337 B2 | 9/2003 | Gan et al. |
| 6,656,630 B2 | 12/2003 | Reichert et al. |
| 6,670,074 B2 | 12/2003 | Spillman |
| 6,670,077 B1 | 12/2003 | Huang |
| 6,677,077 B2 | 1/2004 | Spillman et al. |
| 6,692,865 B2 | 2/2004 | Gan et al. |
| 6,692,871 B2 | 2/2004 | Gan et al. |
| 6,730,436 B2 | 5/2004 | Wang et al. |
| 6,753,109 B2 | 6/2004 | Nanjundaswamy et al. |
| 6,759,166 B2 | 7/2004 | Wang et al. |
| 6,808,847 B2 | 10/2004 | Wang et al. |
| 2001/0000485 A1 | 4/2001 | Ying et al. |
| 2001/0006751 A1 | 7/2001 | Gan et al. |
| 2001/0008733 A1 | 7/2001 | Tanaka et al. |
| 2001/0009736 A1 | 7/2001 | Shiota et al. |
| 2001/0009741 A1 | 7/2001 | Durkot et al. |
| 2001/0016287 A1 | 8/2001 | Clough et al. |
| 2001/0024755 A1 | 9/2001 | Bahar et al. |
| 2001/0028976 A1 | 10/2001 | Treger et al. |
| 2001/0033953 A1 | 10/2001 | Gan et al. |
| 2001/0038943 A1 | 11/2001 | Spillman et al. |
| 2001/0053475 A1 | 12/2001 | Ying et al. |
| 2002/0034685 A1 | 3/2002 | Sato et al. |
| 2002/0041997 A1 | 4/2002 | Muffoletto et al. |
| 2002/0061437 A1 | 5/2002 | Gan et al. |
| 2002/0068220 A1 | 6/2002 | Wyler et al. |
| 2002/0071915 A1 | 6/2002 | Schubert et al. |
| 2002/0076611 A1 | 6/2002 | Palazzo et al. |
| 2002/0081492 A1 | 6/2002 | Gan et al. |
| 2002/0090548 A1 | 7/2002 | Gan et al. |
| 2002/0092155 A1 | 7/2002 | Carlson et al. |
| 2002/0094479 A1 | 7/2002 | Gan et al. |
| 2002/0094480 A1 | 7/2002 | Gan et al. |
| 2002/0102465 A1 | 8/2002 | Chen et al. |
| 2002/0132167 A1 | 9/2002 | Gan et al. |
| 2002/0136947 A1 | 9/2002 | Spillman et al. |
| 2002/0136949 A1 | 9/2002 | Gan et al. |
| 2002/0136950 A1 | 9/2002 | Gan et al. |
| 2002/0136951 A1 | 9/2002 | Gan et al. |
| 2002/0136956 A1 | 9/2002 | Gan et al. |
| 2002/0142216 A1 | 10/2002 | Skoumpris |
| 2002/0146505 A1 | 10/2002 | Fetcenko et al. |
| 2002/0155350 A1 | 10/2002 | Spillman |
| 2002/0155352 A1 | 10/2002 | Durkot et al. |
| 2002/0160263 A1 | 10/2002 | Corrigan et al. |
| 2002/0164530 A1 | 11/2002 | Iwakura et al. |
| 2002/0177036 A1 | 11/2002 | Faris et al. |
| 2002/0182511 A1 | 12/2002 | Cheiky et al. |
| 2002/0197530 A1 | 12/2002 | Tani et al. |
| 2003/0017385 A1 | 1/2003 | Frustaci et al. |
| 2003/0017390 A1 | 1/2003 | Probst et al. |
| 2003/0017396 A1 | 1/2003 | Harigae et al. |
| 2003/0022062 A1 | 1/2003 | Wutz et al. |
| 2003/0039887 A1 | 2/2003 | Yun et al. |
| 2003/0044686 A1 | 3/2003 | Bushong et al. |
| 2003/0068552 A1 | 4/2003 | Anglin et al. |
| 2003/0079337 A1 | 5/2003 | Woodnorth et al. |
| 2003/0082443 A1 | 5/2003 | Janmey |
| 2003/0087153 A1 | 5/2003 | Durkot et al. |
| 2003/0096171 A1 | 5/2003 | Thrasher et al. |
| 2003/0099881 A1 | 5/2003 | Bowden et al. |
| 2003/0113632 A1 | 6/2003 | Brown et al. |
| 2003/0118909 A1 | 6/2003 | Paulot et al. |
| 2003/0124427 A1 | 7/2003 | Takeuchi et al. |
| 2003/0134188 A1 | 7/2003 | Roy et al. |
| 2003/0134199 A1 | 7/2003 | Christian et al. |
| 2003/0148181 A1 | 8/2003 | Wang et al. |
| 2003/0162098 A1 | 8/2003 | Gan et al. |
| 2003/0170537 A1 | 9/2003 | Randell |
| 2003/0203281 A1 | 10/2003 | Melzer et al. |
| 2003/0207173 A1 | 11/2003 | Wang et al. |
| 2003/0211392 A1 | 11/2003 | Nanjundaswamy et al. |
| 2003/0211394 A1 | 11/2003 | Tang |
| 2003/0228522 A1 | 12/2003 | Yang et al. |
| 2003/0232248 A1 | 12/2003 | Iwamoto et al. |
| 2004/0005501 A1 | 1/2004 | Naki et al. |
| 2004/0029005 A1 | 2/2004 | Leising et al. |
| 2004/0038120 A1 | 2/2004 | Tsai et al. |
| 2004/0145344 A1 | 7/2004 | Bushong et al. |
| 2004/0175613 A1 | 9/2004 | Eylem et al. |
| 2004/0197654 A1 | 10/2004 | Barker et al. |
| 2004/0224229 A1 | 11/2004 | Mansuetto et al. |
| 2004/0229116 A1 | 11/2004 | Malinski et al. |
| 2005/0074674 A1 | 4/2005 | Boone et al. |
| 2005/0079415 A1 | 4/2005 | Boone et al. |
| 2005/0084755 A1 | 4/2005 | Boone et al. |
| 2005/0271941 A1 | 12/2005 | Bushong et al. |
| 2006/0183020 A1 | 8/2006 | Davidson et al. |
| 2006/0257728 A1 | 11/2006 | Mortensen et al. |

FOREIGN PATENT DOCUMENTS

| | | |
|---|---|---|
| EP | 1 149 426 B1 | 11/2001 |
| EP | 1 519 434 A1 | 3/2005 |
| FR | 2356286 | 1/1978 |
| JP | 49109834 | 10/1974 |
| JP | 55126961 A | 10/1980 |
| JP | 55130067 A | 10/1980 |
| JP | 56091369 A | 7/1981 |
| JP | 56093263 A | 7/1981 |
| JP | 56097967 A | 8/1981 |
| JP | 56116274 A | 9/1981 |
| JP | 56120069 A | 9/1981 |
| JP | 56132768 A | 10/1981 |
| JP | 57060665 A | 4/1982 |
| JP | 58064766 A | 4/1983 |
| JP | 58071561 A | 4/1983 |
| JP | 58082465 A | 5/1983 |
| JP | 58119159 A | 7/1983 |
| JP | 60221959 A | 11/1985 |
| JP | 60221960 A | 11/1985 |
| JP | 60262357 A | 12/1985 |
| JP | 62122057 A | 6/1987 |
| JP | 62291859 A | 12/1987 |
| JP | 62291860 A | 12/1987 |
| JP | 63148534 A | 6/1988 |
| JP | 01248460 A | 10/1989 |
| JP | 01248462 A | 10/1989 |
| JP | 01255162 A | 10/1989 |
| JP | 02267861 | 1/1990 |
| JP | 07094162 A | 4/1995 |
| JP | 08213030 A | 8/1996 |
| JP | 08273653 A | 10/1996 |
| JP | 10275608 A | 10/1998 |
| JP | 11111256 A | 4/1999 |
| JP | 2003272615 | 9/2003 |
| WO | WO 95/30248 A2 | 11/1995 |
| WO | WO 99/34460 A1 | 7/1999 |
| WO | WO 99/34461 A1 | 7/1999 |
| WO | WO 00/41256 A1 | 7/2000 |
| WO | WO 01/79706 A2 | 10/2001 |
| WO | WO 02/101858 A2 | 12/2002 |
| WO | WO 03/009406 A1 | 1/2003 |
| WO | WO 03/096448 A2 | 11/2003 |
| WO | WO 2004/082093 A2 | 9/2004 |

| | | |
|---|---|---|
| WO | 2004102699 A2 | 11/2004 |
| WO | 2005015662 A2 | 2/2005 |
| WO | 2005015664 A2 | 2/2005 |

OTHER PUBLICATIONS

International Search Report from PCT/US2005/004488, dated May 18, 2006.
Invitation to Pay Additional Fees from PCT/2004/041484, dated May 19, 2006.
U.S. Appl. No. 10/020,685, filed Dec. 14, 2001, Ndzebet, et al.
U.S. Appl. No. 10/914,934, filed Aug. 9, 2004, D. Boone.
U.S. Appl. No. 11/058,665, filed Feb. 15, 2005, G. Davidson.
Flerov, "Effect of Some Additives on the Passivation of a Zinc Anode and on the Performance of Alkali Zinc Galvanic Elements," Zuhr. Priklad., Khim. (1957), vol. 30, pp. 1326-1330 (abstract).
Flerov, "Copper Oxide Galvanic Cells with a Superior Discharge Voltage," Zhur. Priklad. Khim. (1961), vol. 34, pp. 2032-2038 (abstract).
Flerov, "The Cu-Zn Alkaline Battery," Izv. Vysshikh Uchebn, Khim. I Khim., Tekhnol, (1962), vol. 5, pp. 462-467 (abstract).
Mansuetto, et al., "An Improved CuO Cathode Material for Use in Primary Aqueous Batteries," Proceedings of the 41st Power Sources Conference, Jun. 14-17, 2004.
Matrus, "A High Amperage Caustic Soda Primary Battery," Trans. Electrochem. Soc., (1935), vol. 68, p. 7 (abstract).
Schumacher, et al., "The Alkaline Cell with Copper Oxide or Air Depolarizer (1902-1952)," J. Electrochem. Soc., (1952), vol. 99, p. 191C.
Schumacher, "Alkaline Copper Oxide: Zinc Cell," Primary Battery, (1971), vol. 1, 191-206, Eds. George W. Heise, New York, NY (abstract).
International Search Report from PCT/US2004/025894, dated Feb. 10, 2006.
Invitation to Pay Additional Fees from PCT/US2004/025809, dated Feb. 3, 2006.
Invitation to Pay Additional Fees from PCT/US2004/025895, dated Mar. 21, 2006.
Invitation to Pay Additional Fees from PCT/US2005/004488, dated Mar. 22, 2006.
Final Office Action, U.S. Appl. No. 10/914,958 (Apr. 14, 2009).

Broemme et al., "Preparation and properties of copper and manganese containing mixed oxides" Solid State Ionics, (1985), pp. 171-177, vol. 16 (Abstract only).
Greedan et al., "Structure and Magnetism in $\lambda$-MnO2, Geometric Frustration in a Defect Spinel," Chem Mater., (1998), 10(10), pp. 3058.
Greenwood et al., "Chemistry of the Elements," 2nd Ed., Butterworth-Heinemann, Oxford Press 1997, §24.3.4, pp. 1057.
Gummow et al. "Improved Capacity Retention in Rechargeable 4V Lithium/Lithium-Manganese Oxide (Spinel) Cells," Solid State Ionics (1994), 69, 59.
Inagaki et al., "Formaiton of Defect Spinel Phase in CdSn03," Z. Anorg. Allg. Chem., (1987), 546(3), 199.
Jarrige et al., "Propirietes du magganite de cuivre Cu1,5Mn1,504" Bull. Soc. Chim. Fr. (1980), pp. I-363 to I-369, vol. 9-10.
Klewicki et al. "Kinetic Behavior of Mn(III) Complexes of Pyrophosphate, EDTA, and Citrate," Environ. Sci. Technol. (1998), 32(19) p. 2916.
Kondrashev, "The Crystal Structure and Composition of Crednerite, CuMn02," Kristallografiya, (1958), 3, 696.
LeRoux, " A Mossbauer Study of Paramagnetic and Magnetic Components in an Uncalcined Iron Managanese Powder," J. Physis. Condens. Matter (1990), 2, 3391.
Masquelier et al., "Chemical and Magnetic Characterization of Spinel Materials in the LiMn204-Li2Mn409-Li4Mn5012System," J. Solid State Chem. (1996), 123(2), 255.
Matzapetakis et al., "Manganese Citrate Chemistry: Syntheses, Spectroscopic Studies, and Structural Characterizations of Novel Mononuclear, Water-Soluble Manganese Citrate Complexes" Inorganic Chemistry (2000) 29(18), 4044.
Vandenberghe et al., "Neutron Diffraction Study of the Cation Ordering in Cu1.5Mn1.504 and CuMg0.5Mn1.504," Acta Crystallogr., Sec. B (1976), 32, 2796-2798.
Wang et al. "Homo-and Hetero-Metallic Manganese Citrate Complexes: Syntheses, Crystal Structures Magnetic Properties," Polyhedron (2005), 24(13), pp. 1656.
Non-Final Office Action, U.S. Appl. No. 11/843,930 (Dec. 31, 2008).
Final Office Action, U.S. Appl. No. 11/843,930 (Jun. 25, 2009).
International Search Report for PCT/US06/05339 mailed Jan. 24, 2008.

* cited by examiner

Low Temp solid state MCS5A Process :

NMC process:

Fig 15

CMK process:

---

61.13g $CuSO_4 5H_2O$
8.4g $MnSO_4 H_2O$
5.27g $KMnO_4$
mix with Mortar and Pestle

↓

Add 10wt% water to form a paste in a crucible, heat 2hr at 90C, 15hr at 180C

↓

Grind the mix to fine powder and gradually add to 124g of 20wt% KOH solution,

↓

Stir solution for 4hrs at RT

↓

Filter and wash with D. I. $H_2O$
Dry 2hr under vacuum at 100C

Co-precipitation and Thermal oxidation: CuMnZ10b

Urea based process

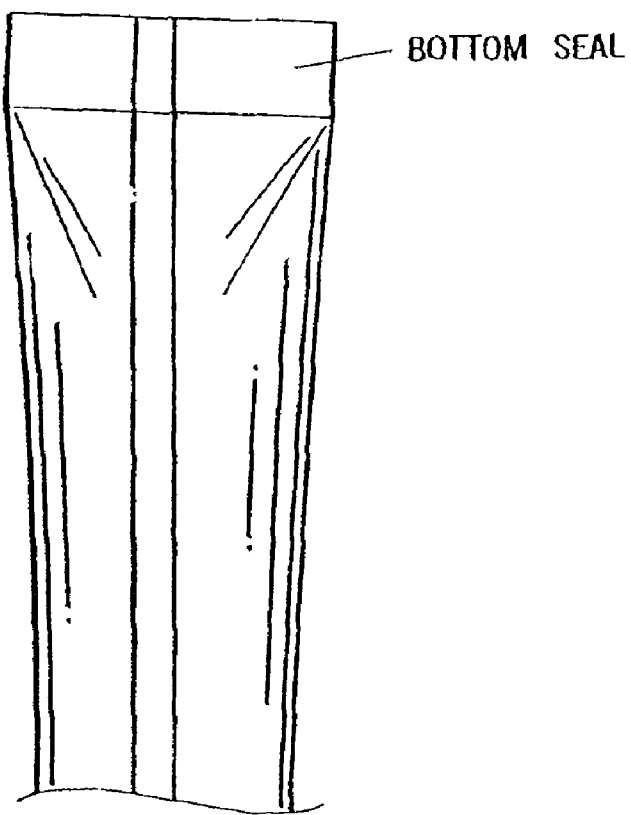
FIG. 25 — BOTTOM SEAL
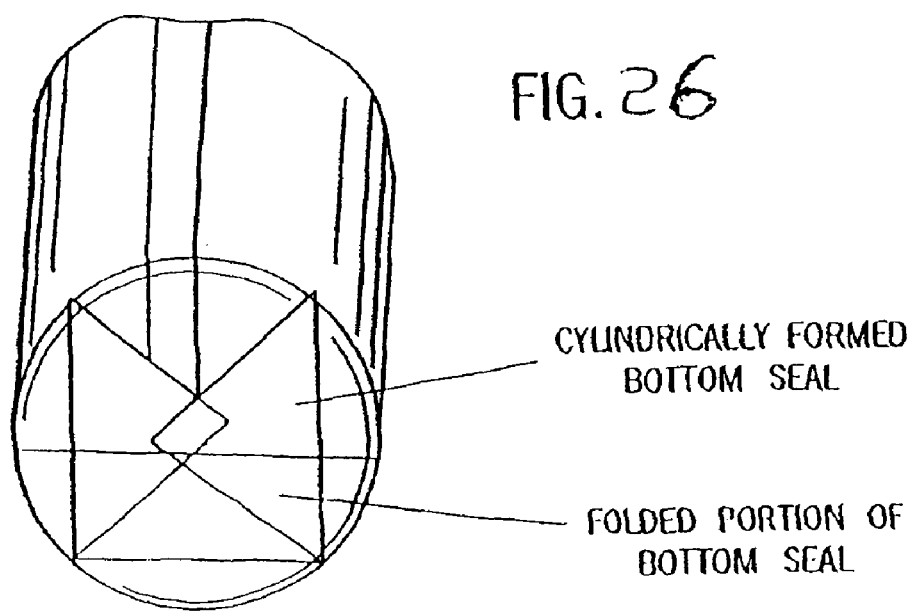
FIG. 26 — CYLINDRICALLY FORMED BOTTOM SEAL / FOLDED PORTION OF BOTTOM SEAL

ALKALINE CELLS HAVING HIGH CAPACITY

CROSS-REFERENCE TO RELATED APPLICATIONS

This claims the benefit of U.S. Provisional Patent Application No. 60/577,292 filed Jun. 4, 2004, and is a Continuation-In-Part of U.S. Utility patent application Ser. No. 10/914,958 filed Aug. 9, 2004, U.S. Utility patent application Ser. No. 10/914,911 filed Aug. 9, 2004, and U.S. Utility patent application Ser. No. 10/914,934 filed Aug. 9, 2004 now U.S. Pat. No. 7,645,540, the disclosure of each of which is hereby incorporated by reference as if set forth in their entirety herein.

STATEMENT REGARDING FEDERALLY SPONSORED RESEARCH OR DEVELOPMENT

The U.S. Government has a pre-paid license in this invention and the right in limited circumstances to require the patent owner to license others on reasonable terms as provided for by the terms of Contract No. 99I28200.

BACKGROUND

Alkaline electrochemical cells are typically configured as elongated cylindrical cells (e.g., AA-, AAA-, C- and D-size cells) or as flat cells (e.g., prismatic cells and button cells). Primary alkaline cells include a negative electrode (anode), a positive electrode (cathode), an electrolyte, a separator, a positive current collector and a negative current collector. The cathode of a conventional primary alkaline electrochemical cell comprises manganese dioxide ($MnO_2$) and a conducting carbonaceous material, typically graphite, such as synthetic, natural, or expanded graphite or mixtures thereof as widely recognized in the art in a mixture wetted with an aqueous alkaline electrolyte such as potassium hydroxide. In cylindrical cells, the cathode mixture is compressed into annular rings and stacked in the battery can or the mixture may be extruded directly into the can, which serves as the positive current collector.

The anode of a primary alkaline cell generally comprises zinc or zinc alloy particles of various dimensions and shapes disposed in an alkaline electrolyte, such as potassium hydroxide, along with gelling agents such as carboxymethylcellulose (CMC) and other additives such as surfactants. A negative current collector, usually a brass pin or nail, is placed in electrical contact with the gelled anode. A separator placed between the electrodes enables ions, but not electrons, to transfer between the cathode and anode while preventing the materials from directly contacting each other and creating an electrical short circuit. Conventionally, the separator is a porous, non-woven, fibrous material wetted with electrolyte. The separator is typically disposed radially inwardly of the cathode. Other aspects of a conventional alkaline cell are well known.

With the successful commercialization of these primary cells in the marketplace, new approaches to designing cells with long service life, acceptable shelf life, and voltage characteristics that operate common portable devices continue to be developed.

However, the low density of the manganese dioxide material and its consumption of water during the discharge reaction of conventional zinc manganese dioxide alkaline electrochemical cells (requiring the designer to provide the necessary water) limits the amount of space available for the zinc anode (which determines the service life), thereby leading to relatively low volumetric energy density. A recognized alternative cathode material is copper oxide, which has a high material density, does not consume any net water in the 2 electron discharge reaction, has a flat discharge curve, high volumetric energy density, and little volume expansion upon discharge. Although it appears to be an excellent candidate for a long service life battery, the operating voltage of conventional batteries having a zinc anode and a copper oxide cathode is unfortunately no more than approximately 1.05V, too low to operate modern day electronic devices at reasonable current drains. At any substantial device current drain, conventional copper oxide batteries can fall significantly below 1V, rendering the electronic device largely inoperable.

SUMMARY

In accordance with one aspect of the present invention, an electrochemical cell includes an anode and a cathode. The cathode includes a cathode active material. The cathode active material includes a mixture. The mixture includes a first component, a second component, and a third component. The first component includes a first element, the second component includes a second element, and the third component includes the first element and the second element. A separator is disposed between the anode and the cathode.

In accordance with another aspect of the present invention, an electrochemical cell includes an anode, a cathode, and a separator disposed between the anode and the cathode. The cathode includes a cathode active material, the cathode active material comprising an oxide of copper identified by $M_xCu_yO_z$, wherein M is any element capable of producing mixed oxide compounds or complexes, and $x \leq 20$, $y \leq 20$, and $z \leq 100$.

In accordance with yet another aspect of the invention, an electrochemical cell includes an anode, and a cathode. The cathode includes a cathode active material. The cathode active material includes a mixture of a manganese oxide, an oxide of copper, and a component identified by $Mn_xCu_yO_z$. A separator is disposed between the anode and the cathode.

In accordance with still another aspect of the present invention, an electrochemical cell includes an anode, a cathode, and a separator disposed between the anode and the cathode. The separator has a water osmosis rate of at least $1 \times 10^{-6}$ moles/cm/hr.

In accordance with one version of the present invention, a size AA alkaline electrochemical cell includes a single, substantially cylindrical anode, a cathode, and a separator disposed between the anode and the cathode. The cell has a discharge voltage of at least 1.0 V for at least 45 minutes at a constant current discharge rate of 1 A.

Other aspects and advantages will become apparent, and a fuller appreciation of specific adaptations, compositional variations, and physical attributes will be gained upon an examination of the following detailed description of the various embodiments, taken in conjunction with the appended claims.

BRIEF DESCRIPTION OF THE DRAWINGS

FIG. 15 shows a flowchart representing a process for synthesizing a mixed metal oxide in accordance with another alternative embodiment;

FIG. 25 illustrates a seam sealed cylindrical separator member having a sealed end using an impulse heat-sealing apparatus;

FIG. 26 illustrates the bottom of a seam sealed and bottom sealed PVA separator tube formed into the shape of the bottom of a cell can into which it will be inserted;

DETAILED DESCRIPTION

Figure 1:
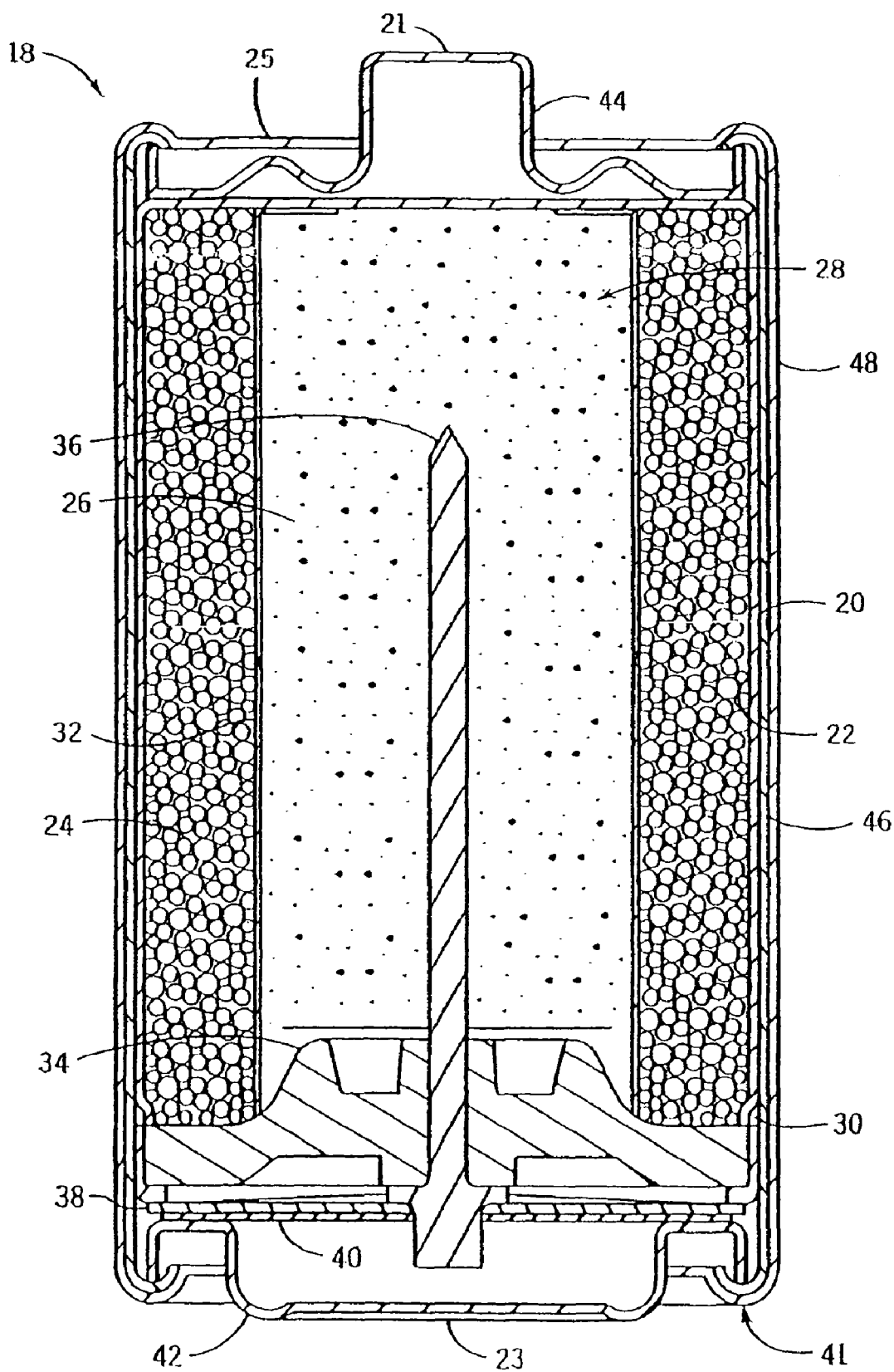
FIG. 1 shows a sectional side elevation view of a cylindrical electrochemical cell.

The present invention relates to an alkaline electrochemical cell and to its component parts. A representative conventional cylindrical cell is illustrated in FIG. 1, though a skilled artisan will appreciate that the present invention is not limited to the cell illustrated, but rather applies to other cylindrical cell configurations and other non-cylindrical cells, such as flat cells (prismatic cells and button cells). Referring initially to FIG. 1, an axially extending cylindrical cell 18 has a positive terminal 21, a negative terminal 23, and a positive current collector in the form of an unplated cylindrical steel container 20. Container 20 is initially closed at its positive end 25 proximal the positive terminal 21 and open at its end proximal the negative terminal 23 such that the negative end of container is crimped to close the cell 18 as is understood generally by a skilled artisan.

At least one or more cylindrical annular cathode rings 24, formed such that their outside diameters at their outer peripheral sidewalls are slightly greater than the inside diameter of the positive current collector 20, are forced into the positive current collector. A coating 22, desirably carbon, can be applied to the radially inner surface of container 20 to enhance the electrical contact between the cathode rings 24 and the container. Installation of the cathode rings 24 forms a pressure contact with coating 22. Cathode 24 further presents an inner surface 27 that define a centrally shaped void 28 in a cylindrical cell within which anode 26 is disposed.

A separator 32 is disposed between the anode 26 and cathode 24. Anode 26, which is placed inside of the cathode rings 24, is generally cylindrically shaped, and has an outer peripheral surface which engages the inner surfaces of a separator 32, and comprises gelled zinc in accordance with at least one aspect of the present invention. The separator is disposed adjacent inner wall 27 between the cathode 24 and anode 26. An alkaline aqueous electrolyte typically comprising potassium hydroxide and water at least partially wets anode 26, cathode rings 24, and separator 32.

A bead 30 is rolled into the container near the negative end 41 to support a sealing disk 34. The sealing disk 34, having a negative current collector 36 extending there-through, is placed into the open end of the container 20 and in contact with the bead 30. The negative open end 41 of the container 20 is crimped over the sealing disk 34 thus compressing it between the crimp and the bead 30 to close and seal the cell. An insulation washer 38 with a central aperture is placed over the crimped end of the cell such that the end of the negative current collector 36 protrudes through the aperture. A contact spring 40 is affixed to the end of the negative current collector 36. Negative terminal cap 42 and positive terminal cap 44 are placed into contact with the contact spring 40 and the positive current collector 20, respectively, and an insulating tube 46 and steel shell 48 can be placed around the cell 18 and crimped on their ends to hold the terminal caps in place. It should be appreciated that steel shell 48 and insulating tube 46 could be eliminated to increase the internal volume for the cell that may be occupied by active ingredients. Such an arrangement is described in U.S. Pat. No. 5,814,419 assigned to Rayovac Corporation, the disclosure of which is hereby incorporated by reference herein for the purposes of background information.

The cathode 24 includes an oxide, for example an oxide of copper (or copper (II) oxide), or a mixed oxide compound that comprises copper and at least one other metal, where the other metal(s) has a reducible oxidation state and can function as a cathode active material. Cathode active materials of this type that are useful in zinc alkaline cells for example, typically may have discharge voltages comparable to the voltage achieved during the reduction of the manganese oxide, $Mn_3O_4$ phase, created during the reduction of $MnO_2$. Such a cathode can comprise a physical mixture of the two, or a chemically synthesized complex oxide of the two or more elements.

A cell constructed in accordance with certain aspects of the invention also includes a separator material that enables the cell to achieve improved performance (relative to conventional cells) in high drain applications, such as those that require a 1 Amp continuous discharge. The invention can also relate to other components of the cathode, and of the anode, the separator, and the electrolyte, which components can be combined as desired to produce a cell having improved discharge voltage and service life characteristics in accordance with the invention. Other aspects of the cell of the invention not specifically described herein can be conventional.

The invention also relates to methods for making and using a cathode, an anode, electrolyte, separator/barrier, separator/barrier seal, and alkaline electrochemical cell.

Cathode Materials and Designs

Focusing first on the cathode, one aspect of the present invention recognizes that copper oxide is known as a high capacity (e.g., about 337 mA/g for 1 electron reduction and 674 mAh/g for a 2-electron reduction) cathode material with the potential to significantly increase service life compared to present day commercially available alkaline cells. The term "copper oxide" is intended to refer to cupric oxide, where the copper has an oxidation state of substantially +2. Under optimal conditions, it discharges in two steps, first producing $Cu_2O$, followed by reduction of $Cu_2O$ to produce Cu metal. However, several issues typically reduce the likelihood that one of skill would include copper oxide as cathode material for conventional Zn gelled anode alkaline cells. One issue arises as a result of the operating voltage of the copper oxide being too low for applications requiring open circuit voltages above 1.1V or closed circuit voltage above 1.0V at reasonable current drains. Various versions of the present invention enable an increase in at least a portion of the operating voltage of a cell containing a mixture that includes an oxide of copper.

Another issue is the current carrying capability of typical commercially available copper oxides, also referred to in the art as "rate capability". Much of this is related to the fact that the kinetics, surface area and surface activity of the available materials are inadequate to sustain high current drains without excessive voltage drop. The present invention enables the synthesis of cathode materials with high discharge capacity as well as high rate capability.

Another issue is the solubility of copper from the copper-containing cathode in alkaline electrolytes. In particular, the soluble species from these materials can be detrimental to the storage and discharge of the gelled zinc anode of alkaline cells if allowed to migrate past the separator to the anode. Various aspects of the present invention disclose ways to mitigate and/or manage this problem and provide batteries with improved service life and shelf life. Similar issues arise with silver, nickel, iodate, and/or sulfur-containing cathode materials.

In order to evaluate new materials, material combinations and to screen potential improvements to the cathode active materials, a quick and reliable test method prior to testing in a complete electrochemical cell is very beneficial. Only materials that show promise are evaluated in a complete electrochemical cell, thereby significantly accelerating the development without expending the significant sources necessary to evaluate all possible materials in an optimized electrochemical cell. A half-cell test in a specially designed fixture is described below.

Half-Cell Test

An electrochemical system comprises an anodic and a cathodic electrode. Each of these electrodes has associated with it, a characteristic half-reaction. For example, in an alkaline battery under certain discharge conditions, the anode half reaction involves the oxidation of the zinc anode to produce $Zn(OH)_2$ and may be represented by the following half-reaction:

$$Zn+2OH^- \rightarrow ZnO+H_2O+2e^-$$

Similarly, the cathode half-reaction involves the reduction of the manganese dioxide to produce MnOOH:

$$2MnO_2+2H_2O+2e^- \rightarrow 2MnOOH+2OH^-$$

The two half-reactions, combined, result in a cell reaction as represented below:

$$Zn+2MnO_2+H_2O \rightarrow ZnO+2MnOOH$$

The voltage behavior of the half-reactions (also referred to as half-cell reactions) can be monitored or investigated by the use of stable reference electrodes as described in "Electrochemical Methods" Allen J. Bard & Larry R. Faulkner, John Wiley & Sons.

In the development of new electrode materials, in the improvement of existing materials or to better understand the interaction of an electrode material with new electrolytes or additives, one skilled in the art typically utilizes an electrochemical half-cell where the electrode in question is investigated vs. a reference electrode, in a manner where interference from the other electrode half-reaction is absent or minimized. The development of new cathode materials described in this invention was comprehensively supported by the use of a special half-cell constructed so as to quickly and easily facilitate evaluation of newly developed materials, comparison and screening of various materials, and the evaluation of the discharge characteristics of the materials or their combinations to determine their suitability for use in the electrochemical cells of this invention.

A representative sample of the cathode material in question is first intimately blended with a conducting agent in a mortar and pestle for at least 5 minutes such that the cathode comprises 80% active material and 20% graphite. The graphite used was KS4 synthetic graphite obtained from Timcal America, Westlake, Ohio 44145. While other graphites could be used, KS 4, by virtue of its small particle size, provides an excellent conducting matrix to evaluate cathode active materials of various particle size ranges. An excess of conducting agent is always used, so as to minimize the effects of inadequate electronic conductivity in the electrode matrix. 0.4 gm of the electrode/graphite mix containing 0.32 g of active material is then made into a flat pellet with cylindrical sides, in a pellet press at a pressure of 8000 pounds. The inner diameter of the pellet die is 1.07 cm.

Figure 2A:
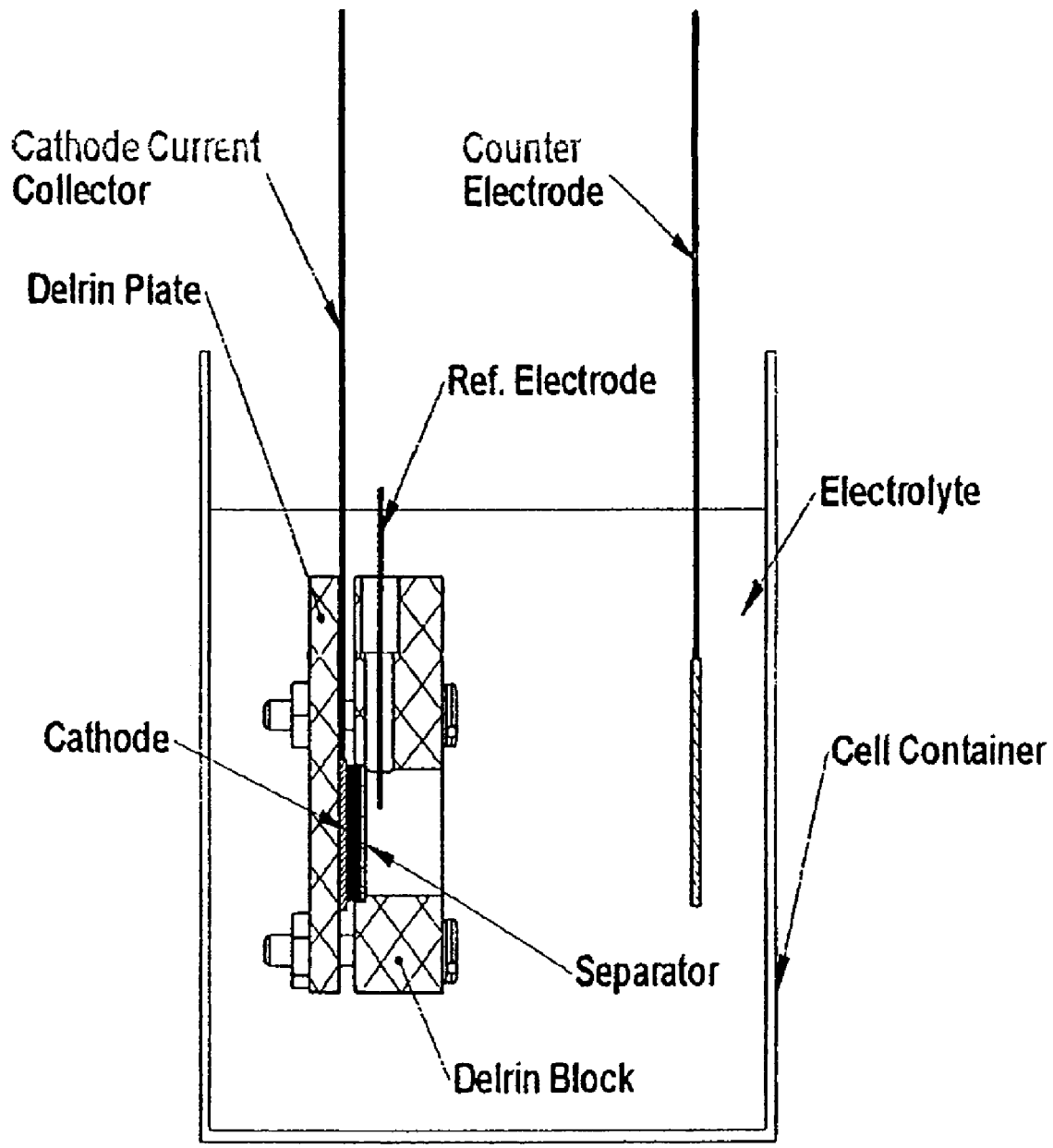
FIG. 2A shows a schematic illustration of a half-cell fixture used to determine the discharge capacity of a cathode constructed in accordance with principles of the present invention.
Figure 2B:
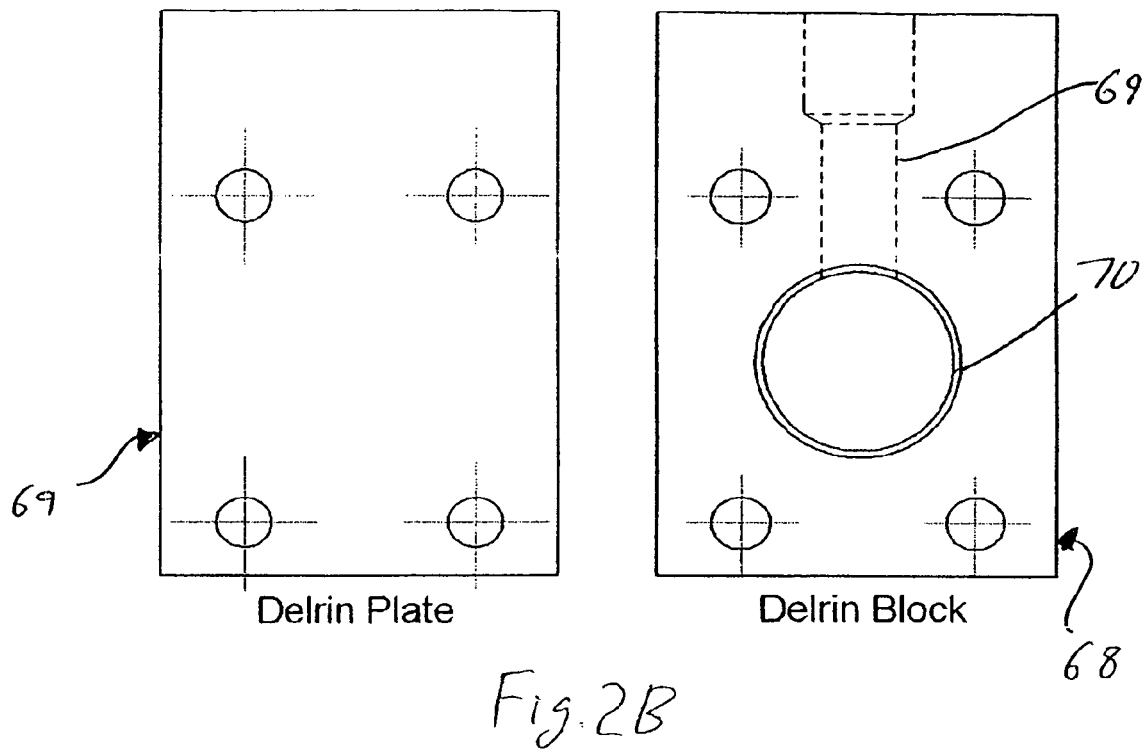
FIG. 2B shows a schematic illustration of the block and plate illustrated in FIG. 2A.
Figure 2C:
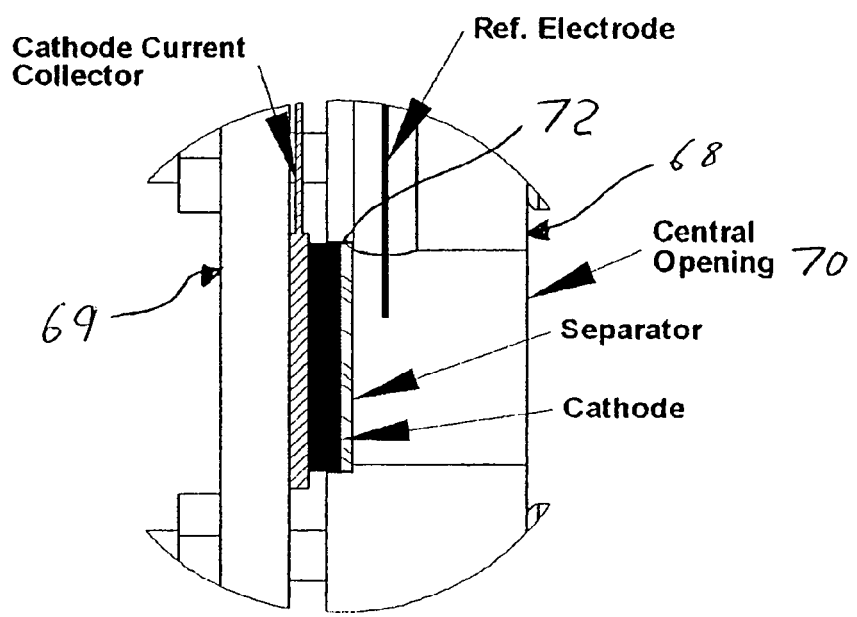
FIG. 2C shows a more detailed schematic illustration of the block illustrated in FIG. 2B.

The compressed, free-standing pellet is then placed into an electrochemical ½ cell fixture against a Ni expanded metal current collector. A schematic of the electrochemical cell fixture is shown in FIG. 2a where the fixture is machined out of an alkali resistant polymer like Delrin™. Other polymers like PTFE or nylon may also be used. The fixture comprises two pieces, a block 68 and plate 69, each with 4 through holes. Once the cathode current collector, cathode pellet and a separator disk are in position in the block, the plate is secured against the block using 4 Delrin screws and nuts, compressing the separator, cathode and current collector into place. The block and plate each have four matching through-holes for the screws, as well as one circular central opening 70 for electrolyte access to the cathode. A schematic of the block and plate are shown in FIG. 2b. The central opening 70 in the Delrin block contains a step 72 shown in the front view in FIG. 2c.

To assemble the cell, a circular disk cut out of a non-woven separator material, e.g. F3T23 (obtained from Kuraray Corp., Japan) comprising cellulose and PVA fibers, is first placed in the slot in the block. The cathode pellet, slightly thicker than the thickness of the slot, is next placed on the separator disk. The Ni expanded metal cathode current collector is next placed on the cathode surface so as to cover the entire surface. The plate is next placed on the current collector and screwed tightly into place, so as to compress the entire current collector, cathode/separator combination. The block additionally contains a reference electrode opening 69 extending along an axis perpendicular to the central opening 70, that terminates in the central circular opening, and which is located such that the reference electrode tip terminates at the surface of the separator, so as to minimize the ohmic voltage drop in the half-cell. Any standard Reference electrode like Hg/HgO or a Zinc wire reference may be used. Initial work was reported against a Hg/HgO reference electrode, although for convenience and reproducibility, recent work has utilized a Zn wire reference electrode, of which a fresh new wire is used for each experiment. It should be noted that for the purposes of the Half-Cell test, all voltages are reported vs. a Zinc wire reference electrode. Once the block and plate portion of the fixture is assembled, the counter electrode, made of gold plated Ni mesh, is placed against the surface of the block and flush against the central opening such that it faces the separator with the cathode pellet under it. This entire assembly is next turned on it's side 90° and immersed in a container containing 29% KOH electrolyte.

In the half-cell test of a sample cathode pellet, a constant current of 5, 10, or 30 mA is applied using a power supply Galvanostat or a testing system like one made by Arbin Instruments, College Station, Tex. Since the cathode pellet always has the same superficial surface area and the same mass, the current density/unit area and per unit mass always remains the same, from one experiment to another. Typically, a low current like 5 mA (15.625 mA/g active) is used to determine the gravimetric discharge capacity of a cathode material in mAh/g of active material. A high current like 30 mA (93.75 mA/g) is used to determine the rate capability of the material. Such a high current density is used to screen out poor materials, which would not perform well in a battery under high drain, limited electrolyte conditions. In a material with poor rate capability, the discharge voltage drops or shows a sloping profile when the discharge current is increased from 5 mA to 30 mA. To a fixed end point voltage, if the delivered capacity is significantly reduced, it indicates that the material has poor rate capability and has a low efficiency of discharge at high currents. On the other hand a material with good rate capability will show a much lower voltage drop upon increasing current. It will also show higher discharge efficiency to the same fixed end point voltage.

Various versions of the present invention provide physical and chemical approaches to raising at least a portion of the operating discharge voltage of a cell that comprises an oxide of a metal, and in particular an oxide of copper, in the cathode compared to the voltage level of CuO alone while maintaining a high discharge capacity substantially similar to that of CuO. Without intending to be limited to a theory of the invention, it is believed that thermodynamic and kinetic considerations support the disclosed approach.

Three general approaches are disclosed herein, to raise the operating voltage of the cathode relative to commercially available copper oxide. Within each of these general approaches, several examples and methods are disclosed. Limitations of some of these approaches, problems associated with them, and means to alleviate the problems are also disclosed.

The first general approach involves supplementing the CuO with at least one additional cathode active material that has an operating voltage higher than CuO, for example manganese dioxide (EMD, CMD, NMD), NiO, NiOOH, Cu (OH)$_2$, Cobalt Oxide, PbO$_2$, AgO, Ag$_2$O, AgCuO$_2$, CuMnO$_2$, Cu$_{2-x}$Mn$_x$O$_2$ (where x<2), Cu$_{3-x}$Mn$_x$O$_4$ (where x<3), Cu$_2$Ag$_2$O$_4$, and Cu$_2$Ag$_2$O$_3$. The combination of CuO with the additive(s) therefore will also have at least a portion of the operating voltage higher than that of CuO alone as determined in the Half-Cell Test.

In the second general approach, the discharge voltage of the cathode can be increased by supplementing the CuO with at least one additive having a discharge voltage that is lower than the discharge voltage of CuO vs. a reference electrode. This approach provides a cathode having CuO mixed or combined in various ways with at least one additional material such that the Gibbs Free Energy of the overall reaction with zinc is increased as a result of displacement reactions between (for example) CuO and the additional material like copper sulfide (CuS). When a suitable additive is combined with CuO, however, the combination has a higher discharge voltage than either the additive or the CuO alone. The open circuit voltages and the discharge voltages of the CuO, the additive, and the combination of the CuO and the additive can, of course, be determined experimentally by one skilled in the art. Alternatively, the present inventors recognize that a suitable additive can be selected by screening multiple candidate materials without experimentation by first estimating the change in Gibbs' Free Energy of a combination versus zinc, and hence the open circuit voltage of the reduction reaction utilizing the Gibbs Free Energy equation. In particular, a suitable additive can be identified when the change in Gibbs Free Energy of the reduction reaction of the combination versus zinc is higher with respect to the change in Gibbs Free Energy of the reduction reaction of either individual component versus zinc. Of course, alternatives to a zinc anode could be substituted for batteries having a different anode, as would be appreciated by one having ordinary skill in the art. The open circuit voltage being a thermodynamic characteristic, a high value will not always produce a high operating voltage due to kinetic considerations, however a high open circuit voltage is indicative of possible suitable additive candidates. Once a candidate material is selected based on calculating the change in Gibbs' Free Energy, one skilled in the art would recognize that simple experimentation may be performed to establish the discharge voltage of its combination. This aspect is discussed below with reference to a CuO/CuS mixture.

The third general approach to increase at least a portion of the discharge voltage of a cathode comprising copper oxide includes compounding or complexing a plurality of components to synthesize new cathode active materials and mixtures that, in general, comprise copper and at least one other metal or non-metal. Using copper and manganese as examples, several variants of this approach are disclosed. In one version, copper oxide is deposited on the surface of manganese dioxide. In a second version, manganese dioxide is deposited on the surface of copper oxide. Both of these are targeted toward reducing or minimizing the abrupt transition and voltage dip that occurs by simple blending of the two components as described in the first approach. In a third version, new cathode active materials comprising Cu and Mn are synthesized. In a fourth version, a mixture of components is synthesized, to leverage the desirable properties of manganese oxide and copper oxide with the added improvement of increasing the rate capability of the component comprising the oxide of copper.

Copper and manganese are described here in detail, but the general approach disclosed here applies to any combination of materials. For example one may desire to combine the voltage characteristics of $MnO_2$, NiOOH and CuO. Physical blending of these three materials will produce distinct voltage transitions and possibly voltage dips that would limit their practical utility in a battery. By utilizing the concepts taught in this invention, mixed compounds of, for example, Mn/Cu, Mn/Ni, Ni/Cu or Mn/Ni/Cu may be synthesized to produce the "bridge" compounds that provide the smooth voltage transitions when the discharge reaction switches from that of the higher voltage material to that of the next lower voltage material in the mix. In another similar manner, in the case of Cu/Ag oxides, this invention can provide a cathode active material that is synthesized as a mixture that comprises silver oxide, copper oxide, and a copper/silver mixed oxide where the mixed oxide phase represents only a small fraction of the mixture, while the CuO phase represents a significantly large proportion. This can have significant cost-saving implications.

Use of these materials, even by simply blending them, may also be effective at reducing or minimizing the voltage dip that occurs when they are not used. In a related embodiment, a variant of the fourth version involves blending such a synthesized mixture with known cathode active materials like manganese dioxide, NiO, NiOOH, silver oxides, etc., to provide a combined cathode active material that has the desirable discharge characteristics.

It is further recognized that various combinations of the described general approaches may be used to provide a cathode and a cell with the desired characteristics.

First Approach:

In the first approach, chemical components having the desirable physical characteristics (e.g., particle size, surface area, etc.) for use in a cathode can be physically mixed to homogeneity using standard processing methods known to those having ordinary skill in the art. In use, such a physical cathode mixture transitions from the discharge behavior of the higher oxide to that of the oxide of copper. Supplementary metal oxide additives to the oxide of copper can be chosen from the group of generally known positive electrode materials that independently provide higher operating voltages vs. zinc in the initial portion of discharge than does the oxide of copper. Suitable examples of positive electrode materials can include, but are not limited to, $MnO_2$ (EMD or CMD), NiO, NiOOH, $Cu(OH)_2$, Cobalt Oxide, $PbO_2$, AgO, $Ag_2O$, $Ag_2Cu_2O_3$, $CuAgO_2$, $CuMnO_2$, $CuMn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$ and suitable combinations thereof.

Mn is used as an example herein since it is currently the most widely used cathode active material. Mn is therefore used in combination with Cu to increase at least the initial portion of the discharge curve of a cathode comprising CuO while maintaining the longer service life provided by CuO. Similar methods can be utilized using other elements such as Ni, Co, Pb, Ag, etc. to enhance the voltage in the initial portion of the discharge curve as desired. Generally, the higher the oxidation state of an active material, the higher the discharge voltage.

Figure 3:
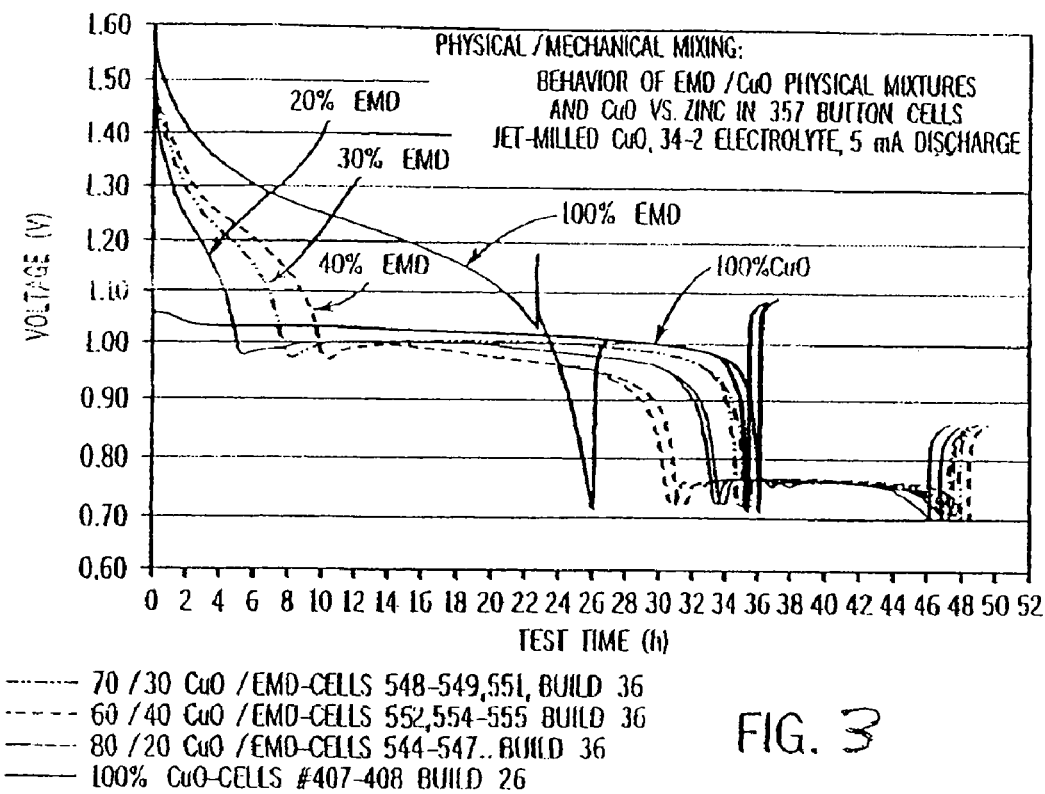
FIG. 3 shows a graph representing the physical/mechanical mixing behavior of EMD/CuO and CuO alone vs. Zinc in 357 Button cells under conditions using jet-milled CuO, 34-2 electrolyte, and a 5 mA discharge.

By way of example, a cathode having an appropriate quantity of EMD $MnO_2$ (say, 5-60%), which has an initially high operating voltage but a rather sloping discharge curve, can be mixed with CuO to yield a mixed cathode that exhibits the higher initial operating voltage of the $MnO_2$ with an extended service life more characteristic of the CuO electrode at ~1V. The $MnO_2$ discharges first, followed by the CuO, with a relatively sharp transition between them. It is envisioned that by adding $MnO_2$ to about 20% one can obtain almost the same discharge capacity as CuO (and significantly higher than $MnO_2$ by itself), with the advantage of the higher operating voltage of the manganese oxide for the first 6 hours of the discharge as shown in FIG. 3 which depicts an increase in operating voltage when EMD is physically mixed in various ratios with CuO in a button cell. For reference, the EMD behavior is also shown, with about 25 hrs delivered to 0.8V. This example demonstrates the potential of a simple, mixed cathode material that can deliver at least 50% higher capacity than EMD itself. The two components can be provided at a wide range of ratios, to meet the desired discharge characteristics. Compounds with other elements like Ni, Co, Ag, Pb, etc. . . . can similarly be used.

As can be seen in the following written half-cell reactions, the discharge mechanisms of $MnO_2$ and CuO are very different.

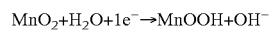

$MnO_2$ reduction reaction consumes one mole of water per mole of $MnO_2$.

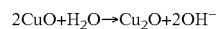

The reaction consumes half a mole of water per mole of CuO.

In a standard $Zn/MnO_2$ cell, the $MnO_2$ has a density of 4.5 g/cc, consumes 1 mole of water per mole of $MnO_2$, incorporating protons into its structure to yield MnOOH (a poor electronic conductor and a material of lower density). The need for water for the cathode reaction limits the amount of active material (e.g. zinc and $MnO_2$) that can be used in the cell, resulting in relatively low volumetric energy density. The cathode also has a sloping discharge curve with little useful capacity below 1 V at intermediate and high current drains. On the other hand, copper oxide (CuO), which has a density of approximately 6.3 g/cc, consumes only half a mole of water per mole of CuO discharged for the first electron (with little volume expansion), has a very flat discharge curve, and provides high volumetric energy density in a cell.

The need for water in the overall reaction of $Zn/MnO_2$ cells typically limits the cell designer's flexibility in optimizing the performance of the cell in the available volume by balancing amounts of the various components. While not being bound by theory, the present inventors have determined that a cell comprising oxides of copper require less water than a cell where the cathode is manganese dioxide alone. Therefore, a cell comprising manganese dioxide and oxides of copper would also require less water than an equivalent manganese dioxide cell. In theory, the molar ratio of water to $MnO_2$ in an alkaline manganese dioxide need not be more than about 1 for a 1 electron discharge. Typical ratios used in commercial cells are about 1.3/1 to about 1.35/1 in order to compensate for inefficiencies with regard to water transport within the cell at intermediate and high drains and also allowing for a portion of the second electron discharge at low drains. It is undesirable to include more water in the cell than necessary, since this restricts the amount of active materials that can be accommodated into the fixed internal volume of a cell. One skilled in the art would know that the cathode discharge efficiency of manganese dioxide increases with increasing water/$MnO_2$ molar ratio, as can be seen from half-cell discharge under flooded electrolyte conditions.

By utilizing the mixture of cathode materials including an oxide of copper (which has less need for water) as well as the combination of the mixtures with manganese dioxide, as described herein, the inventors have discovered that it is possible to take advantage of the higher discharge efficiency of $MnO_2$ by providing in the cell, a water/$MnO_2$ molar ratio that significantly exceeds the state of the art designs of commercially available cells $Zn/MnO_2$ cells. This results in a significant improvement in the discharge efficiency of the $MnO_2$ portion of the cathode in the inventive electrochemical cells, resulting in superior overall service life as compared to conventional cells. Not by way of limitation but by way of example, it is possible to design cells containing mixtures of the herein disclosed oxides of copper with manganese dioxide (for example EMD, CMD, NMD) and usefully design the cell to have a water/$MnO_2$ molar ratio greater than 1.3:1, 1.35:1, 1.4:1, 1.5:1, 1.6:1, 2:1, 5:1, 10:1, and, alternatively, 15:1. One skilled in the art would understand that the determination of the above ratios depends on the purity of the $MnO_2$, in the manganese dioxide (which may vary depending on the source of the manganese dioxide; i.e., EMD, CMD or NMD as well as the manufacturing method). The water/$MnO_2$ molar ratio is determined in the following manner: a). the total number moles of water in the cell is determined including all sources of water, for example, the anode, the cathode, the pre-wet electrolyte, etc. b). the total number of moles of $MnO_2$ is calculated based on the mass of manganese dioxide in the cathode, its molecular weight of 86.94 and it's purity in the manganese dioxide source (for example, the purity of $MnO_2$ is typically about 90% to about 92%).

In a cathode containing a physical mixture of the two, it appears that the performance of the CuO portion of the cathode deteriorates as $MnO_2$ content increases, presumably for the following reasons. While not being bound by theory, in such a cathode, the CuO discharge reaction takes over after the $MnO_2$ substantially discharges its first electron. However, insufficient electrolyte is available to the CuO for efficient reaction, presumably creating a mass transfer polarization and a voltage drop. Additionally, the electrolyte concentration is also higher as a result of the $MnO_2$ discharge product $OH^-$, which is unfavorable to the copper oxide reduction. The $MnO_2$ volume expansion during discharge may separate the CuO particles from themselves and from the conducting material (e.g., synthetic or expanded graphite) that is usually provided in the cathode. This increases the ohmic resistance in the cathode, resulting in a further loss in voltage.

When a cell undergoes continuous discharge this voltage loss often appears in the form of a dip in the discharge voltage curve in the region where the cathode transitions from discharging mostly the $MnO_2$ component of the cathode to discharging mostly the CuO component. Additionally, the anode is already partially discharged when the CuO discharge commences, contributing anode polarization to the cell voltage as well. The presumed net effect of these processes is that the CuO material operates at a lower voltage than it otherwise would, resulting in a lower than desirable battery voltage as shown in FIG. 3. Additionally, at higher current drains, the transition dip if it occurs, can prematurely push the battery voltage below the end-point cut-off voltage of the test or the device, significantly reducing the usefulness of the battery. In accordance with certain aspects of this invention this dip may be sufficiently removed to ensure that the battery does not prematurely reach the end-point voltage in a device. This is enabled by the appropriate selection of a third component in the mixture such that the third component contains at least a first element from the first component and a second element from the second component. An electrochemical cell made from this mixture then possesses a continuous discharge curve wherein the cathode active material displays a continuous discharge curve having a slope that is less than positive.

Certain aspects of this invention (i.e., CuO≧40% by weight of cathode active material) also seek to mitigate the detrimental effects of dissimilar discharge behaviors by optionally providing in the cell a plurality of cathode active materials in separate layers or pellets (or in separate layers that can comprise mixtures of oxides), such that the operating voltage of a cell having a zinc anode and a cathode of the invention is higher than that of a Zn/CuO cell.

One aspect of the present invention provides a cathode having an active material comprising more than one component, such that the discharge voltage of the resulting cathode is higher in at least a portion of the discharge compared to the voltage of CuO. Suitably, the discharge voltage of the battery incorporating a cathode material with an additive, with the additive having either 1) a higher discharge voltage than the first cathode active material or 2) a lower discharge voltage than the first cathode active material but, when combined with the first cathode active material, produces a combination having a discharge voltage higher than the first cathode active material, produces a discharge voltage greater than 1.05 V for at least an initial 5% of the cell discharge period (meaning the first 5% of a total length of time that the cell is discharged continuously until the operating voltage is reduced to a level of 0.8V) at a current density of at least 5 mA/g. Accordingly, a cathode constructed in accordance with aspects of the present invention achieves a higher discharge voltage than prior art cells including copper oxide cathode active materials, whose discharge voltages were not sufficiently high to operate modern devices. It should be appreciated that this embodiment is not restricted to the case of the additive being physically blended with the oxide of copper. The embodiment is intended to include methods described in the various approaches disclosed herein.

Second Approach:

In the second general, supplementary additives can also be chosen for combining, from elements or compounds that have a lower discharge voltage than CuO, but which, in combination with CuO, produce a higher discharge voltage than either constituent alone. When the reaction kinetics are suitably rapid, the discharge voltage of these couples also follows the same trend as the open circuit voltage. Examples of such materials may include, but are not limited to, elemental sulfur, selenium, tellurium, sulfides, selenides, tellurides, and iodates such as $CuS$, $Ag_2S$, $ZnS$, $B_2S_3$, $SnS$, $FeS$, $Fe_2S_3$, $CoS$, $NiS$, $CuSe$, $CuTe$, $CuAgS$, $CuAg_3S$, and suitable compounds and mixtures thereof. For example, it is believed for the case of a CuO/CuS combination, that the discharge voltage is unexpectedly higher as a result of a displacement reaction between CuO and CuS (i.e., CuS having a discharge voltage lower than CuO). Thus, while pure CuS by itself has a lower discharge voltage versus zinc (0.7V vs. Zn), the combination of CuS with CuO discharges at a higher voltage than either material by itself. Shown below are theoretical open circuit voltages for relevant reactions to help illustrate the CuO/CuS system:

Copper Oxide Reduction Reaction: (Reaction 1)

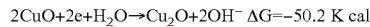
$$2CuO+2e+H_2O \rightarrow Cu_2O+2OH^- \; \Delta G=-50.2 \text{ K cal}$$

Theoretical OCV: 1.089V vs. Zn

Copper Sulfide Reduction Reaction (Reaction 2)

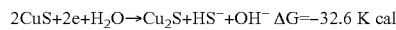
$$2CuS+2e+H_2O \rightarrow Cu_2S+HS^-+OH^- \; \Delta G=-32.6 \text{ K cal}$$

Theoretical OCV: 0.708 vs. Zn

Copper Oxide/Copper Sulfide Mixture Reduction Reaction: (Reaction 3)

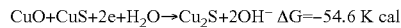
$$CuO+CuS+2e+H_2O \rightarrow Cu_2S+2OH^- \; \Delta G=-54.6 \text{ K cal}$$

Theoretical OCV: 1.183 V vs. Zn

To determine the change in Free Energies and Open Circuit Voltages above, the anode reaction used was:

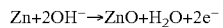
$$Zn+2OH^- \rightarrow ZnO+H_2O+2e^-$$

The experimental OCV values obtained were found to reflect the theoretical values quite well. It has also been determined that the reaction kinetics are sufficiently rapid, resulting in the discharge voltage of a CuO/CuS combination being higher than the discharge voltage of CuO or CuS alone versus Zinc. The change in Gibbs' Free Energies were calculated from the free energies of formation of reactants and products, available in the "The oxidation states of the elements and their potentials in aqueous solutions", Second Edition, Wendell M. Latimer, Prentice Hall, Inc, 1952, the disclosure of which is incorporated by reference to the extent that it discusses the free energies of formation of reactants and products of the type described herein. The open circuit voltages were calculated utilizing the formula $\Delta G=-nFE$, where Delta G refers to the free energy change of a reaction, n refers to the number of electrons involved in the reaction, F is the Faraday constant (96500 coulombs/mole) and E is the voltage in V as one skilled in the art would readily recognize.

Figure 4:
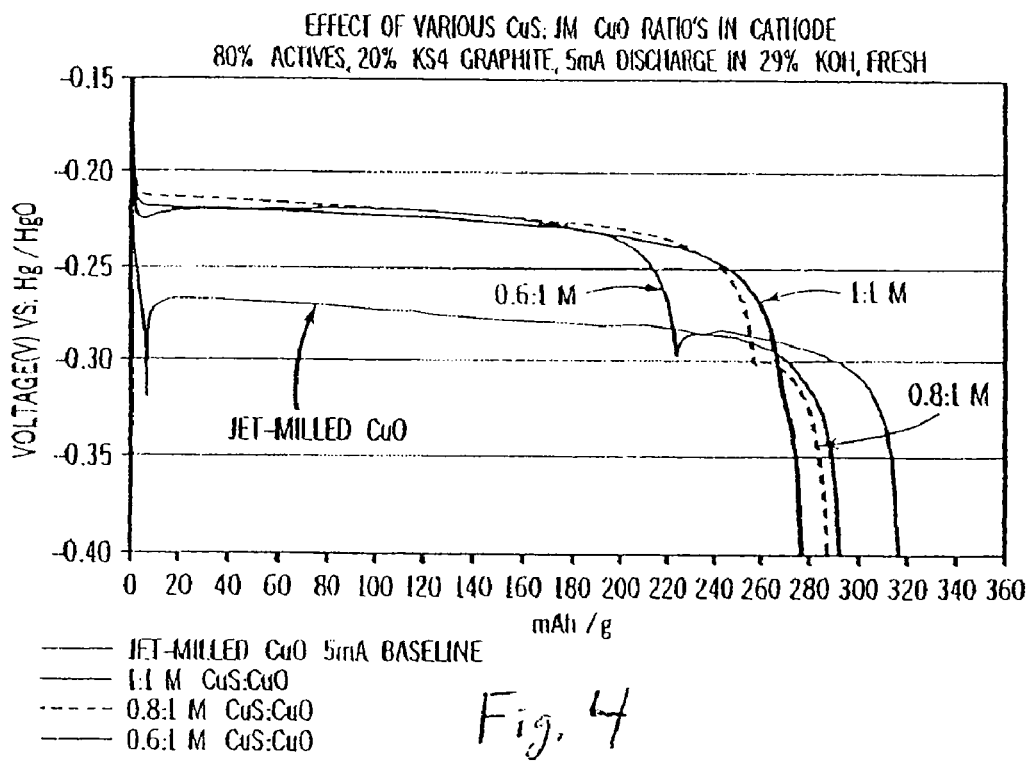
FIG. 4 is a graph plotting the discharge behavior of pure CuO and various CuO/CuS mixtures in a half-cell vs. a Hg/HgO reference electrode.

It is believed that the ratio of CuO to CuS dictates the discharge voltage profile. For example, an excess of CuO in a CuO/CuS mixture will cause the reaction to proceed in two steps, where Reaction 3 proceeds first at about 1.18V, until the CuS is consumed, followed by Reaction 1 at approximately 1.09V vs. Zinc. Since the copper oxide/copper sulfide mixture reduction reaction consumes equi-molar amounts of CuO and CuS, use of a mixture containing a 1:1 molar ratio of CuO and CuS provides a discharge profile at approximately 1.1V for the entire capacity, without a lower discharge plateau as is observed when CuO is in excess as described above. A 1:1 molar ratio represents a 45/55 weight ratio of CuO/CuS for the mixture. FIG. 4 shows the discharge behavior of pure CuO and cathode mixtures comprising various molar ratios of CuO/CuS in a half-cell vs. Hg/HgO reference electrode. It is noteworthy that the operating voltage is significantly higher than pure CuO alone. The present invention further provides cathode materials having a flatter voltage profile than, for example, $MnO_2$, and more similar to that of CuO.

Various versions of this invention encompass a molar ratio within the range of 0.5:1 and 1:1.5 CuO/CuS, and one-tenth increments of CuO between 0.5:1 and 1.5:1, with a suitable molar ratio of approximately 1:1.

Table 1 shows the theoretical capacity to −0.9V vs. Hg/HgO reference electrode that can be obtained from cathodes containing various CuO/CuS molar ratio blends.

TABLE 1

| Cathode Mix CuS:CuO Molar Ratio | Theoretical Capacity at 5 mA to −0.3 V vs. Hg/HgO Ref mAh/gm |
| --- | --- |
| 1:1 | 306 |
| 0.9:1 | 292 |
| 0.8:1 | 275 |
| 0.6:1 | 235 |

For a cylindrical cell (AAA, AA, C, D) for which annular cylindrical cathodes are formed ex-situ or in-situ, it has been discovered that the unique characteristics of the CuS material can be leveraged to allow tablet densities hitherto not seen in commercial alkaline batteries. The cathodes in present day commercial alkaline batteries have densities of about 3.2 g/cc of cathode volume. With appropriate choice (e.g. about 97%) of CuO, CuS, conducting carbon (e.g., about 3% or KS4 and/or expanded graphite) and processing conditions (e.g., using a standard hydraulic or pelletting press), cathode densities of about 3.5 g/cc up to about 4.5 g/cc of cathode volume can be achieved. A skilled artisan will appreciate that variants of these concentrations can also produce the stated cathode densities. This allows significantly more active material to be packed into a cell, to provide batteries with longer service life than previously known. AA cells with delivered capacities up to 4 Ah may be produced, which are significantly improved over present day commercial alkaline batteries having deliverable capacities of about 2.5-2.8 Ah.

Figure 5:
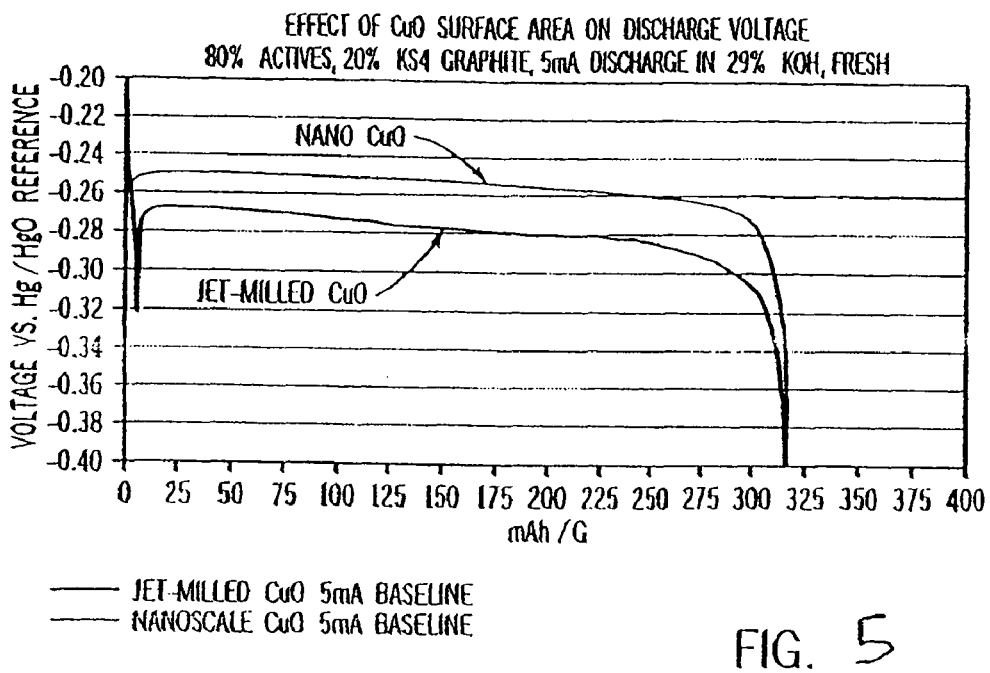
FIG. 5 is a graph illustrating the effect of using higher surface area CuO on its discharge voltage.

The present inventors also recognize that jet-milling of commercially available CuO to reduce particle size and increase surface area results in a higher operating voltage. The surface area plays an important role in the reaction kinetics and hence the operating voltage of the battery. The present invention recognizes that an applied current to a cathode creates a stress that is distributed among the entire surface area of the cathode. Accordingly, cathodes having a greater surface area perform better than those having smaller surface areas as illustrated in FIG. 5.

In addition to mechanical attrition and air-jet milling, the surface area of the CuO can also be increased by modifying the process conditions during synthesis of the CuO, particularly if using a solution process. Jet milling of as-received commercial CuO (from Sigma/Aldrich, located in St. Louis, Mo.) is shown to more than double the BET surface area from ~1.27 $m^2/g$ to ~5.57 $m^2/g$. Solution synthesized CuO can be obtained, where suface areas are significantly higher, thereby providing electrodes with lower polarization. A commonly known method to determine surface areas of powders is the BET method, which uses the principle of gas adsorption of the surface of the particles to estimate the surface area. A commercially available Tristar 3000 Gas Adsorption Analyzer and Smart prep Degasser manufactured by Micromeretics Corp., located in Norcross, Ga. were used for the analysis. 1 gram samples were used, after degassing for 2 hours. The results are illustrated in Table 2.

TABLE 2

| | Mean Particle Size, micro meter (um) | Particle Size Range Um | BET Surface Area, $m^2/g$ |
|---|---|---|---|
| CuO & Source | | | |
| As Recd. from Aldrich 99+% ACS grade, <5 micron | 9.6 | 1-25 | 1.3 |
| Jet milled Aldrich | 1.9 | 0.7-3.5 | 5.6 |
| Jiangsu Taixing (China) | 4.5 | 0.2-60 | 10.5 |
| Nano (NanoScale Corp.) | 22.3 | 1.0-60 | 39.6 |
| CuS & Source | | | |
| Alfa Aesar, 99.8% (metals basis), -200 mesh powder | 24 | 0.1-100 | 1.2 |

Chemically synthesized agglomerates of a nano-CuO may also be used for the cathode. Such materials can be obtained from NanoScale Materials, Inc. 1310 Research Park Drive, Manhattan, Kans. 66502 USA. In accordance with one aspect of the present invention, the particle size is within a range whose lower end is between, and includes, 0.1 microns and 10 microns, and whose upper end is between, and includes, 50 microns and 150 microns. In accordance with another aspect of the present invention, the CuO has a surface area within a range whose lower end is between, and includes, 0.5 $m^2/g$, 1 $m^2/g$, and 5 $m^2/g$, and whose upper end is between, and includes, 20 $m^2/g$, 30 $m^2/g$, 60 $m^2/g$, 70 $m^2/g$, and 100 $m^2/g$.

The particle size, particle size distribution (PSD) and Brunauer, Emmett, and Teller (BET) surface area of the CuS are believed to play an important role in achieving the desired cathode packing density and integrity, as well as discharge voltage characteristics. The relative PSD's of the CuO and CuS are also believed to be important considerations in making blends, as would be appreciated by one of skill in the art.

Figure 6:
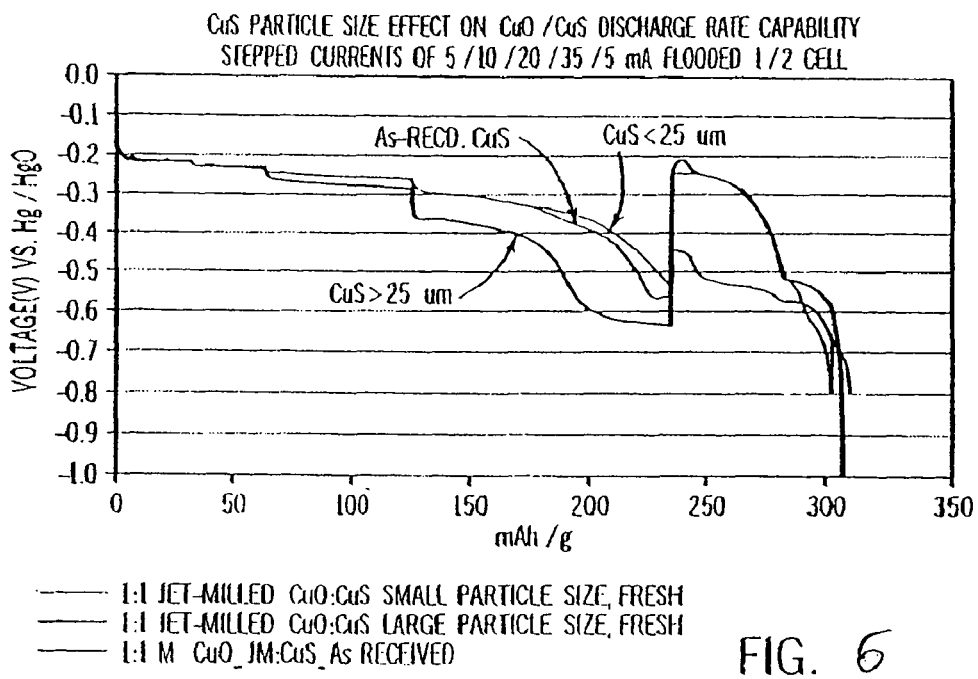
FIG. 6 is a graph illustrating the effect of CuS particle size on the rate capability of a jet-milled CuO/CuS cathode in a flooded half-cell where the current is progressively stepped between 5 mA and 35 mA.

FIG. 6 shows the effect of CuS particle size on the rate capability of a jet-milled CuO/CuS cathode in a flooded half-cell where the current is progressively stepped between 5 mA and 35 mA. At 20 mA and higher currents, the electrode comprising CuS of particle size smaller than 25 micrometers shows a significantly lower polarization (higher voltage) than a cathode comprising CuS particles>25 micrometers in diameter. Since a smaller particle size contributes a higher surface area than larger particles of the same mass, this result indicates that a higher surface area CuS provides superior current carrying capability (rate capability) in a cathode comprising CuO/CuS.

The particle size and particle size distributions were measured using a Coulter Series LS230 Laser Diffraction Particle Size Analyzer with a small-volume module (Beckman-Coulter Corporation, Miami, Fla. 33196). One skilled in the art would recognize, that the physical characteristics of all the materials comprising a cathode, need to be optimized to achieve the desirable physical robustness, conductive matrix, pore size and porosity distribution to deliver optimum and discharge characteristics in a battery. Copper oxide as well as the copper containing multi-component synthesized mixtures disclosed in this invention have a lower electronic conductivity that a material such as manganese dioxide (EMD, CMD, NMD). In the design of the electrode for an electrochemical cell, conductive additives like graphite are always added. The present inventors have discovered that for an effective, adequately conductive electrode, it is very important to match the particle size of the graphite to that of the active material. This is particularly important when a commercial material like EMD which has a mean particle size ranging from about 15 to 40 microns (depending on source/manufacturer) is blended with the synthesized multi-component mixtures disclosed herein, the particle size of the conductive carbon must be carefully matched such that both the manganese dioxide and the multi-component mixture have the adequate conductive matrix surrounding them. Conductive additives having a small particle size, such as carbon black (for example Vulcan XC-72R Acetylene Black obtained from Cabot Corp, located in Chicago, Ill.), can be used in combination with graphite. In accordance with one aspect of this invention, the conductive additive has a mean particle size similar to the mean particle size of the active material.

Increasing the surface area is beneficial to the electrode structure and performance. It is believed that increasing the surface areas to as high as high as 50 or 100 $m^2/g$ will provide the desired benefits in an electrochemical cell. The surface area can be increased by a number of conventional methods such as for example, air-jet milling. One skilled in the art will also recognize that surface area can also be increased by appropriate control of the synthesis conditions during manufacture.

In accordance with one aspect of the present invention, the particle size of CuS is within a range whose lower end is between, and includes, 0.1 microns and 10 microns, and whose upper end is between, and includes, 50 microns and 150 microns. In accordance with another aspect of the present invention, the CuS has a surface area within a range whose lower end is between, and includes, 0.5 $m^2/g$, 1 $m^2/g$, and 5 $m^2/g$, and whose upper end is between, and includes, 20 $m^2/g$, 30 $m^2/g$, 60 $m^2/g$, 70 $m^2/g$, and 100 $m^2/g$.

One problem with copper or silver containing materials in the cathode is the solubility of the materials in alkaline electrolytes (such as KOH) and the migration of these species toward the zinc anode where they can foul and interfere with the anode's reactions and lead to passivation, self-discharge or other undesirable situations that, depending on the conditions, depress the anode voltage or cell voltage. Hence it is desirable to block, tie-up or slowdown this process of species generation and migration in order to produce a practical battery with reasonable shelf life. Various aspects of this invention teach the use of special separator materials as well as methods to practice the preparation and sealing of the separator seams, in order to allow one to utilize the high operating voltage and still produce a battery with reasonable shelf life.

Various versions of the present invention recognize the good lubricating properties and high conductivity of CuS in practice. Use of CuS in a mixture therefore allows the reduction or elimination of conducting carbons in the cathode and provides an additional 5-7 wt. % room for active material, thereby further increasing cell capacity. In a related aspect, the conductive and lubricating properties of CuS may be utilized to replace the conductive carbon coating 22 currently used on the internal can surfaces in alkaline batteries (See FIG. 1).

The initial voltage of this combination of CuO/CuS could be further increased by the presence of other higher voltage cathode active materials such as $MnO_2$, NiO, NiOOH, $CuAg_2O_4$ and the like. Unfortunately, if the individual material characteristics are not properly matched, then any mismatch before, during or after discharge causes the performance of the later discharging material to be inferior to its normal discharge behavior, as was shown in FIG. 3. This is particularly the case if the first discharging material has a significant volume or density change upon discharge, consumes water or electrolyte, or produces a discharge product that has poor electronic conductivity. When this happens the second discharging material no longer has ideal conditions for its discharge, hence the overall behavior of the cell is compromised, negating the benefit of mixing the two materials.

While this has been demonstrated in the example of FIG. 3, it is further exemplified in a situation where soluble sulfur species or sulfides are present in the mix with $MnO_2$, and where the sulfur species appear to interfere with the proton intercalation of the $MnO_2$, thereby significantly reducing the operating voltage of the $MnO_2$ portion. It is believed that if the $MnO_2$ is separated from the mixture of CuO and CuS, or the sulfur species are prevented from contacting the $MnO_2$, this detrimental effect would be minimized. Therefore, to prevent the reduction of the operating voltage due to any of the foregoing reasons (physical and/or chemical), a method is provided whereby the different active materials are not mixed together. Rather, the individual active materials that possess a mismatch are kept in separate layers or pellets whereby one material only minimally affects the behavior of the second discharging material.

Each layer or pellet comprises either a distinct cathode active material or a physical mixture of the materials suitable for use in combination with the invention. It is specifically contemplated that where separate cathode layers or pellets are provided, at least one layer or pellet can comprise a physical mixture of copper oxide with another additive (e.g., a metal oxide or sulfide) while another layer or pellet can comprise a mixed compound. Likewise, a layer or pellet can comprise a physical mixture of a mixed oxide compound with an additive (e.g., another metal oxide or sulfide).

Figure 7:
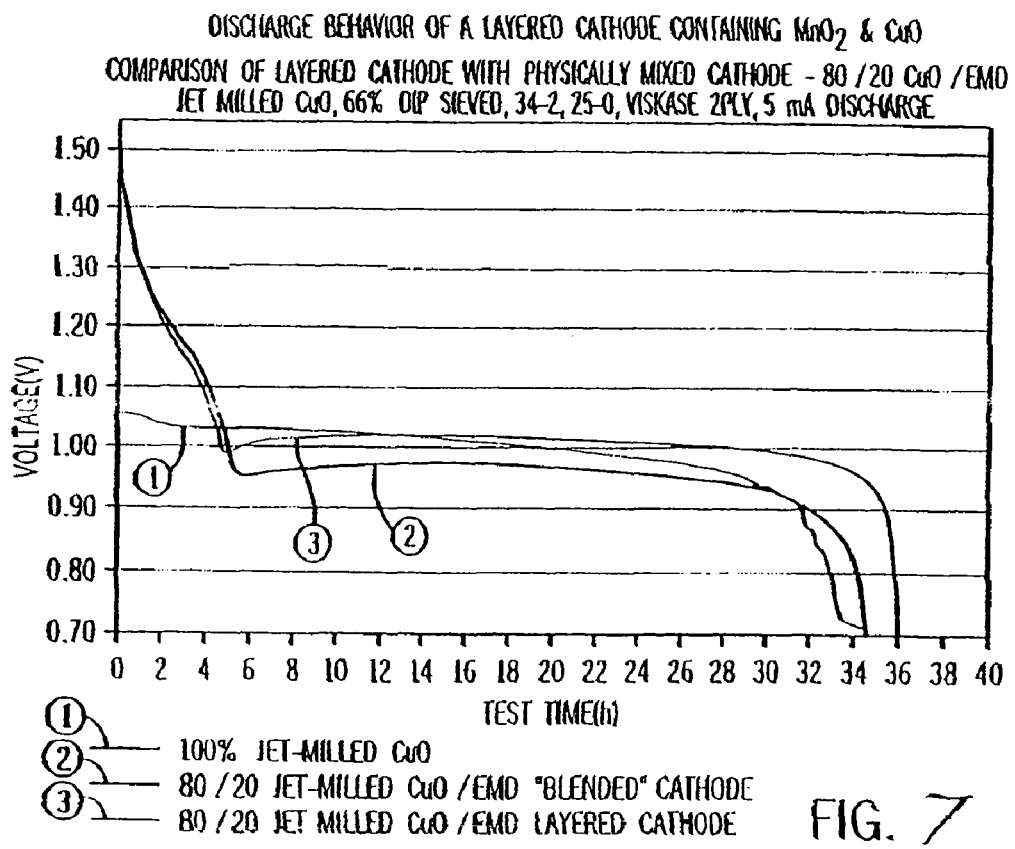
FIG. 7 shows a graph representing the discharge behavior of a layered cathode containing (EMD) $MnO_{2+}$ CuO under conditions using jet-milled CuO, 66% BIP Sieved anode, with 34-2 electrolyte and 25-0 pre-wet electrolyte, and a 5 mA discharge.

The concept is shown in FIG. 7 for the case of CuO and $MnO_2$. In particular, a homogeneous physical mixture of EMD and CuO is shown where, after the initial EMD discharge and transition, the CuO discharge occurs at a significantly lower voltage than the pure CuO discharge that is also shown. The use of a layered cathode, where the EMD and CuO are in separate layers on top of each other as in FIG. 8, significantly mitigates the problem caused by interaction between the EMD and CuO.

Figure 8:
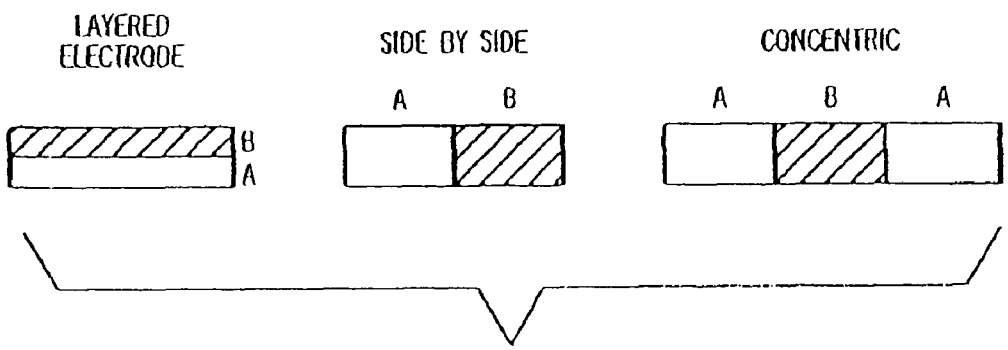
FIG. 8 illustrates three examples of electrode configurations for flat cathodes of button cells.

In a button cell battery where the cathode is in a disk form, the active materials can be in layers one over the other, or as concentric circles (discs) one within the other as shown in FIG. 8. The active materials can also be in the form of semi-circular segments placed beside one another.

Figure 9:
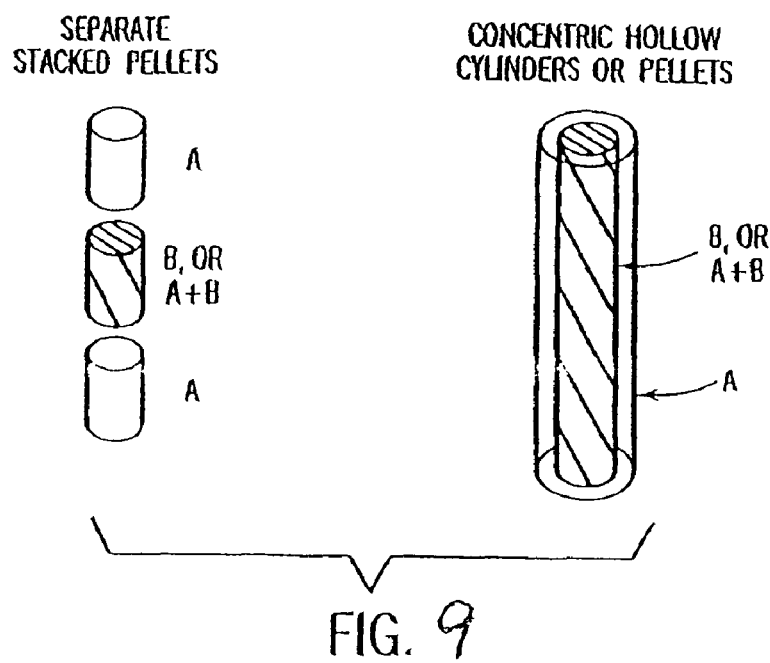
FIG. 9 illustrates two examples of cylindrical electrode configurations.

For a prolate cylindrical battery configuration, which uses a cylindrical cathode in a can, either pressed externally and inserted, or fabricated in-situ in the can, the same concept can be used to keep the materials separated as shown in FIG. 9. The materials are in contact, but are not mixed or blended together.

It is recognized that a mixture of CuO and CuS in a cathode can raise the operating voltage of the cathode in alkaline solution compared to a cathode including CuO alone. However, it has been discovered that a mixture of CuO and CuS can react when stored in an alkaline solution, and produce soluble sulfur species that, if allowed to migrate unheeded to the anode, can adversely affect the performance of the zinc anode. For purposes herein those species that adversely impact the performance of a zinc anode are referred to as anode-fouling species. Examples of anode-fouling species are well known to those skilled in the art and include various Cu, Ag, S, Fe, Ni, and Sb species.

In these situations, it is desirable to further provide an additive that reduces the ability of the species to foul the anode. The additive can be included in the anode, cathode, electrolyte, or separator and operate at the location where anode-fouling species would be generated, at the separator where the fouling species would migrate through the separator, or after anode-fouling species migrate through the separator from the cathode towards the anode but prior to the fouling species interact with and foul the anode. The additive can operate either by binding to the species or chemically interacting (e.g. by oxidation, reduction complexing, coordinating, etc. . . . ) with the species to form a non-anode-fouling product, having a reduced solubility. Furthermore, the additive can reduce the effect of anode-fouling soluble species by modulating the local hydroxide ion concentration within the electrode. Whereas not intending to be bound by theory, it is recognized that precipitation is a vehicle for removing soluble species from solution by moving some species from solution. The solubilities of species are represented by their $K_{sp}$ value. It has been determined that low solubility products of the product of the reaction between the additive and the anode-fouling soluble species are beneficial. One such beneficial solubility product has been found to be less than or equal to $2 \times 10^{-25}$. It will thus be appreciated that the additive can mitigate anode-fouling either by effectively limiting migration from the cathode to the anode, and/or reacting with the copper or silver species to form an innocuous product or a less fouling product. Various versions of the present invention recognize that suitable additives include, but are not limited to, bismuth oxide ($Bi_2O_3$), bismuth hydroxide ($Bi(OH)_3$), zinc sulfide (ZnS) and zinc oxide (ZnO). Example 9 below, for instance, describes the effect of a ZnO additive in a CuO/CuS cathode. Each of these chemicals, when added to a copper-containing cathode, have been found to reduce the ability of the species to foul the anode, either by reacting with the species or by effectively limiting the species from migrating through the separator to the anode. One skilled in the art will recognize that additives performing a similar function can also be targeted toward anode fouling soluble copper species. Complexing agents like EDTA (ethylene diamine tetra-acetic acid), ethanol amines, oxalic or citric acid etc. interact with metal ions in solution.

Third Approach

As already pointed out, $MnO_2$ has some very desirable properties, particularly its high voltage, high rate capability and low cost. Copper oxide by itself has excellent gravimetric capacity and material density, flat discharge voltage profile, but low rate capability and relatively low discharge voltage. A key objective of our research has been to invent materials that combine the very attractive features of each material to develop a new material that has reasonably high voltage, high rate capability and much longer delivered service life in a battery without the sharp discontinuity in voltage transition that is observed with physical blends of these two apparently incompatible materials, as shown in FIG. 3. It is believed that synthesizing a mixed oxide material that contains both manganese and copper can provide a "bridge" that makes the two materials more compatible, with a voltage profile that is substantially free from a significant "dip" even at high discharge rates. It has been discovered that chemical synthesis under some specific conditions can provide such materials. Hence a higher operating voltage than pure CuO, and a smoother and more continuous transition than in the preceding method, can be obtained by solution phase chemical compounding or synthesis using soluble cationic elements to produce mixed oxide compounds or complexes existing in one or more phases. Suitable elements can include, but are not limited to, Mn, Ni, Co, Fe, Sn, V, Mo, Pb, or Ag, or combinations thereof. Such mixed oxide compounds may also be produced via solid state reactions at appropriate temperatures, as one skilled in the art will readily appreciate.

As is readily recognized by one skilled in the art, present commercially available alkaline electrochemical cells which utilize $MnO_2$ as the major constituent of the cathode can have trace levels of copper present as a result of assorted impurities in the sourced materials. In various aspects of the invention these trace levels of impurities are recognized as insufficient and therefore ineffective at providing measurable performance advantages to the cell discharge. In accordance with an aspect of this invention the copper content of the cathode is greater than about 0.5% by weight of the mixture.

In accordance with this aspect of the invention, the general formula of a copper based mixed oxide material of this invention is $M_xCu_yO_z$ (where M is any suitable element, as noted, while x is less than 20 (alternatively $1 \leq x \leq 5$), y is less than 20 (alternatively $1 \leq y \leq 5$), and z is less than 100 (alternatively $1 \leq z \leq 20$). Compounds having $A_wM_xCu_yO_z$ as general formula (where w is <20 and A can be, for example, Li, Na, K, Rb, Cs, Ca, Mg, Sr, Ni and Ba) can also be designed for use as cathode active materials. Whereas it is anticipated that materials across the range of formulations such as $M_xCu_yO_z$ can have varying degrees of advantages with regard to cell performance, an aspect of the invention anticipates that such mixed metal oxides of the tenorite type of crystal structure and the spinel type of crystal structure can have particular advantages due to their structural type and its similarity to other species in the cathode. Tenorite and spinel type structures are well known to one having ordinary skill in the art.

It is in keeping with yet another aspect of the invention that the mixed metal oxide, $M_xCu_yO_z$, has the formula where x=3−y and z=4 where y is positive and y<3. In still another aspect of the current invention the mixed metal oxide, $M_xCu_yO_z$ has the formula where x=2−y and z=2 where y is positive and y<2.

One example of a process for preparing a mixed oxide cathode active material involves chemically reducing a mixed solution of salts together with a complexing agent and a reducing agent (e.g., sodium tetra-borohydride ($NaBH_4$), sodium formate, formic acid, formaldehyde, fumaric acid or hydrazine) to produce a compound containing the metals. A complex compound of the form $AM_xCu_y$ can also be prepared upon addition of a third metal salt as a precursor in this reduction step. The resulting product can be oxidized under acidic conditions with an oxidizing agent (e.g., hydrogen peroxide, potassium permanganate, potassium persulfate or potassium chlorate) to form a copper based mixed oxide of the general formula $A_wM_xCu_yO_z$.

For instance, Cu/Mn compounds prepared in this, manner were confirmed by X-ray diffraction (XRD) analysis to be a mixed copper manganese oxide compound of a new phase. Although, no ASTM card corresponds to this oxide, its diffraction pattern is similar to that of $Cu_2Mn_3O_8$. Other compounds such as of $Cu_2Mn_2O_5$ alone or in combination with CuO are also detected when the pH of hydrogen peroxide is made more acidic during the oxidation process. Oxidation conditions can substantially affect the crystalline structure and performance of the copper based mixed oxide. In addition to the mixed oxide phase, the product of the synthesis also contains other phases including manganese oxides and copper oxides. As is known to one skilled in the art, low/medium temperature solution based synthesis methods as discussed here tend to produce significant amounts of amorphous materials, which are difficult to characterize by X-ray diffraction analysis.

It is also envisioned that oxidation of the Cu/Mn compounds can be carried out in, for example, an alkaline solution or a solution having a neutral pH. Organic or inorganic acid (or base) can be used to adjust the pH of the oxidation solution. Also, the compounds can be first heat treated prior to chemical oxidation. Furthermore, copper mixed oxide compounds can be heat-treated prior to being mixed with conducting material to form cathode.

The compounds can also be prepared by known mechanical alloying methods using a high-energy ball mill or by direct high-temperature melting in a furnace. It is further envisioned that $M_xCu_yO_z$, or $A_wM_xCu_yO_z$ copper based mixed oxide materials can alternatively be made by co-precipitating a mixture of metal salt solution followed by heating the precipitate under appropriate conditions.

Figure 10:
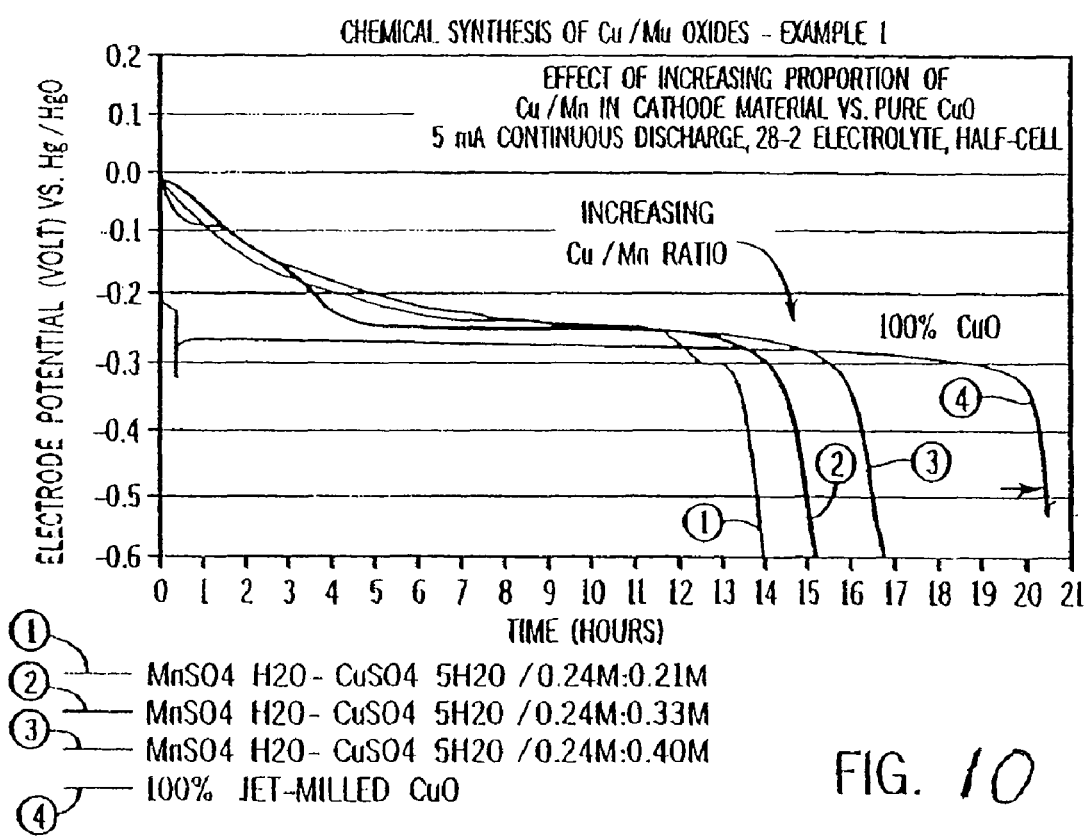
FIG. 10 shows a graph representing the effect of increasing proportions of copper in chemically synthesized Cu/Mn mixed oxides in Cathode Material vs. Pure CuO under conditions using 5 mA continuous discharge, 28-2 electrolyte, in a flooded half-cell.

FIG. 10 shows the behavior of such mixed oxide materials, as well as the effect of increasing Cu content in the synthesis of the cathode material in a flooded electrolyte half-cell. As previously described, new cathode materials are usually tested in flooded half-cell fixtures where complications from other processes are eliminated in order to focus only on the cathode. In such a fixture, there is an excess of electrolyte and the anode is a large surface area inert electrode like Ni gauze. The voltages are recorded vs. a reference electrode which for an alkaline system comprises a Hg/HgO reference as known to those skilled in the art. As seen in FIG. 10, the presence of Mn increases the initial discharge voltage, and as the proportion of Cu in the material increases, the discharge capacity also increases, with minimal detrimental effect on the initial high voltage. Thus, by tuning the composition, desired discharge characteristics, including high initial voltage and long service life, can be obtained.

Figure 11:
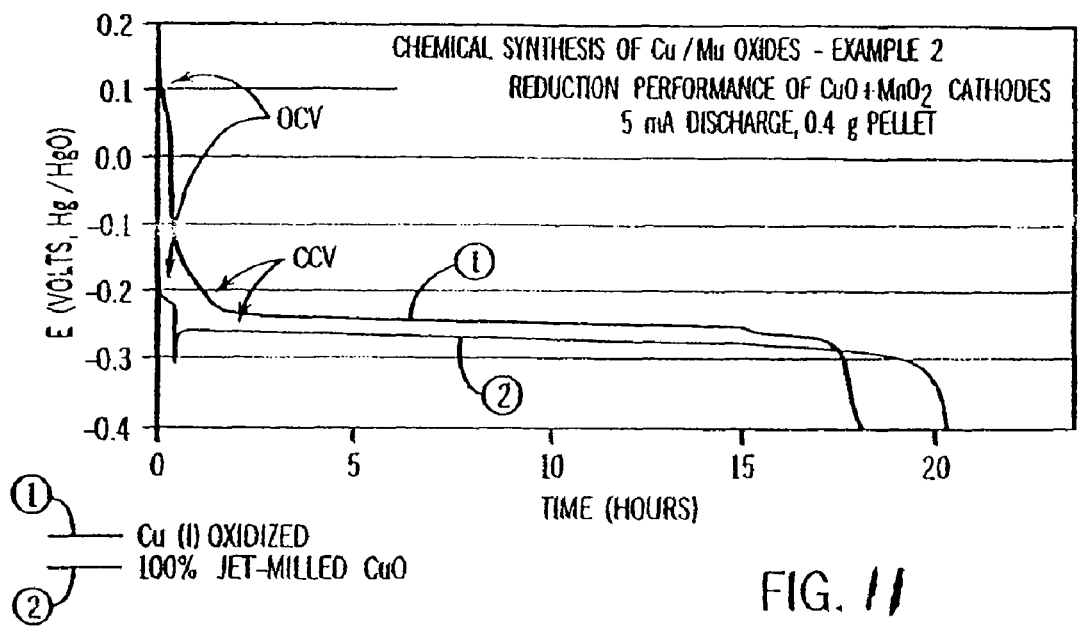
FIG. 11 shows a graph representing the performance of chemically synthesized $CuO+MnO_2$ cathodes under conditions using 5 mA discharge in a flooded half-cell.

Another process for preparing a mixed metal oxide comprises oxidizing a soluble first metal salt such as copper (I or II) salt (e.g., copper acetate) by potassium permanganate in alkali solution. The first metal is oxidized to a higher oxidation state while the Mn in the permanganate is reduced. FIG. 11 compares performance of a Cu/Mn cathode prepared in this manner to a CuO cathode and demonstrates that a desired initial voltage higher than CuO can be attained. FIG. 1 also shows that about 90% of the discharge capacity of the CuO is maintained in the active cathode. It is envisioned that these properties can be tailored by adjusting the relative ratio of Cu and Mn in the synthesis. Additionally, the flat portion of the discharge curve shows at least about 30 mV higher average voltage than CuO material obtained commercially. The surface activity and surface area of the active material play a role in performance here as well. It is believed that the morphology and surface area of the deposited material are also favorable for higher voltage discharge.

It is to be understood that several general synthesis approaches may be utilized to obtain a cathode active mixture comprising copper-manganese mixed oxide materials using different precursors, mixing and reaction conditions, all with the common goal of obtaining a material which has a combination of the desirable properties of $MnO_2$ and CuO. Low temperature solid state synthesis, or co-precipitation may be used. If the copper in the precursor has an oxidation state of 1, then chemical oxidants or thermal oxidation may be utilized to obtain the end product where the copper oxidation state is at least substantially +2.

Figure 12:
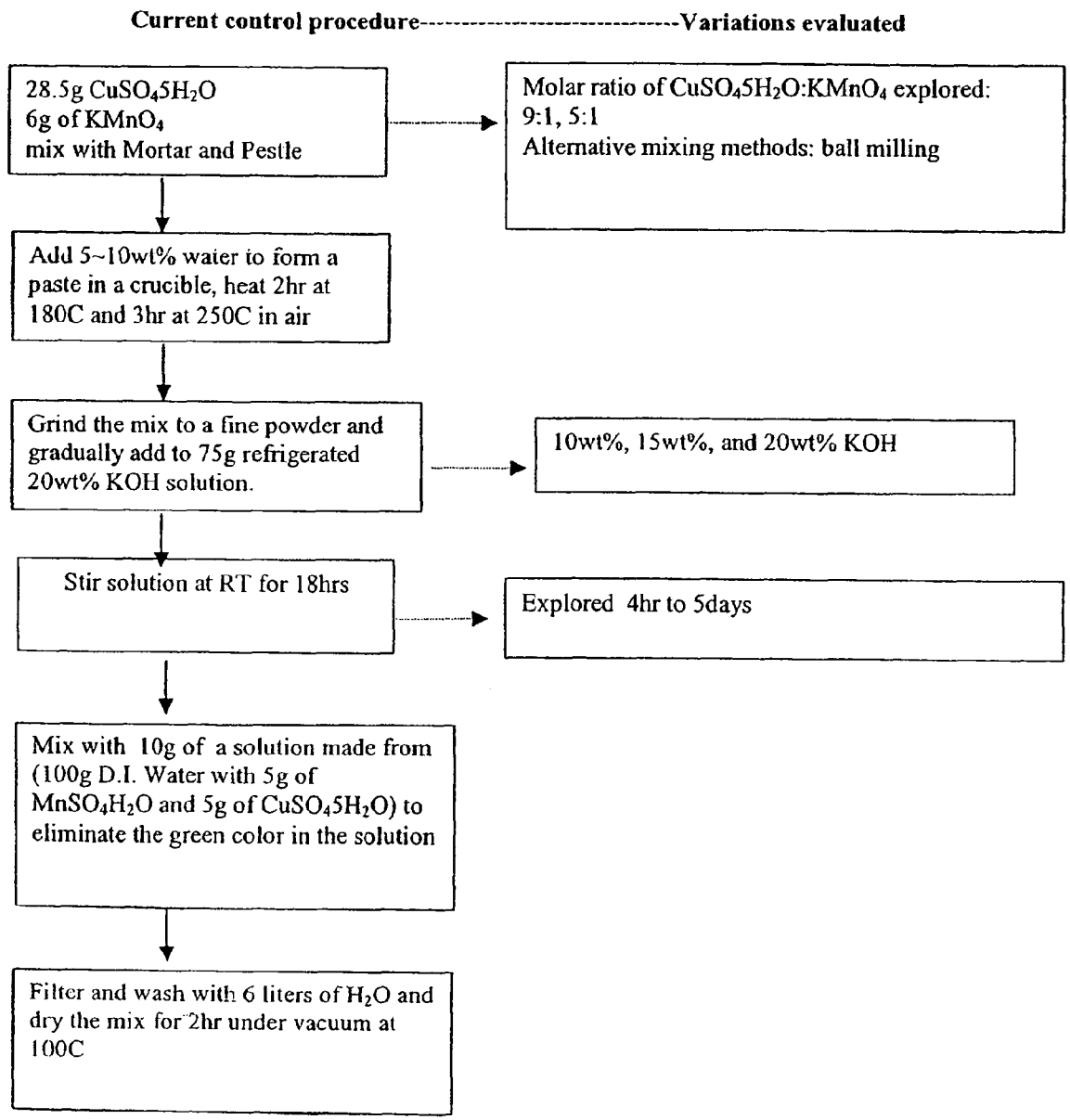
FIG. 12 shows a flowchart representing a process for synthesizing a mixed metal oxide in accordance with one aspect of the invention.
Figure 13:
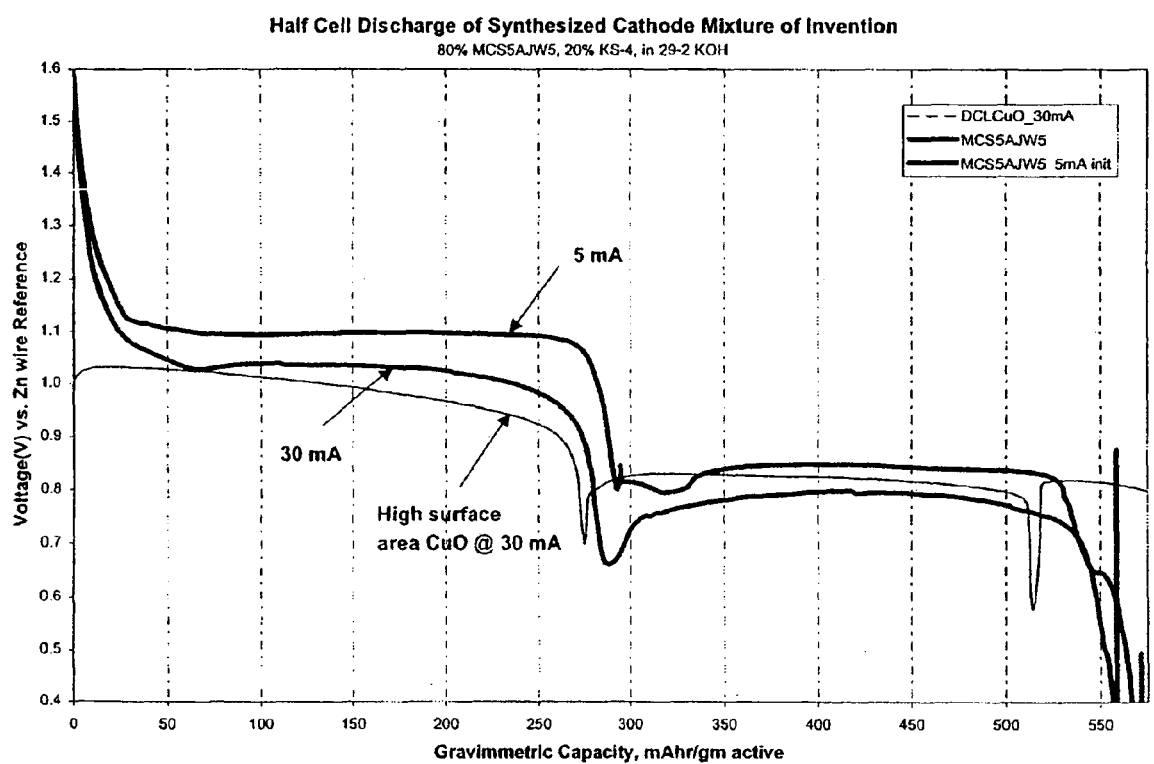
FIG. 13 is a graph illustrating a half-cell discharge of a cathode mixture including a mixed metal oxide.

A process for synthesizing a mixed metal oxide in accordance with one aspect of the invention (illustrated in FIG. 12) involves low temperature solid-state reaction between $CuSO_4$ and $KMnO_4$, which are mixed in one example using a 3:1 molar ratio, dried and heated to 250 C in air. The material is then finely ground and reacted in 20% KOH solution. The material produced is a mixture that shows the discharge behavior of MnO2, CuO and a mixed "bridge" phase. Several variants of this synthesis process involving molar ratio's of 9:1, 5:1, different heating conditions (time, temperature, etc) KOH solution concentration ranging between 10 and 25%, etc produce a material with excellent capacity and rate capability. FIG. 13 shows the ½ cell discharge behavior at 5 mA and 30 mA. The material produced here referred to as MCS5A, generally comprises a manganese oxide phase showing the high initial voltage, a mixed phase representing the transition (or bridge phase) and a CuO type phase that has significantly higher rate capability and operating voltage than commercially available CuO. The mean particle size and particle distribution of this mixture was determined using Coulter LS series particle size analyzer. It is known to one skilled in the art that modifications to the synthesis conditions can produce particle size ranges as desired.

In accordance with one aspect of this invention, the synthesized mixture has a mean particle size within a range defined at its lower end by approximately 0.5 micron, and alternatively 1 micron, 3, 5, 10, and 20 microns, and defined at its upper end by 50 microns. In accordance with another aspect, the synthesized mixture has a means particle size less than 30 microns. In accordance with another aspect of this invention, the synthesized mixture has a mean particle size within between 2-10 microns. A particle 0.1 micron to approximately 200 microns based on volume fraction measurement.

Figure 14:
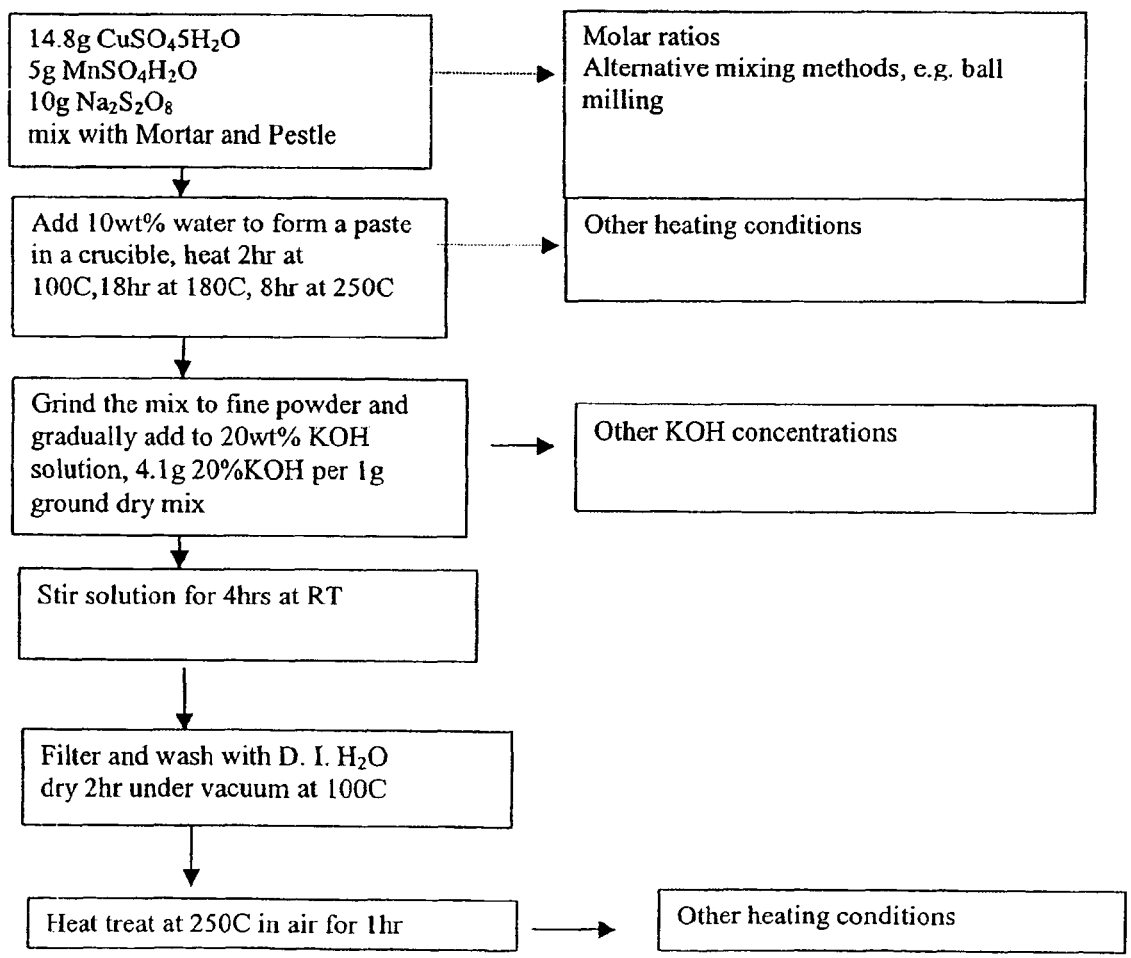
FIG. 14 shows a flowchart representing a process for synthesizing a mixed metal oxide in accordance with an alternative embodiment.

A variant of the above solid state synthesis involves the use of copper sulfate ($CuSO_4$ $5H_2O$) and manganous sulfate $MnSO_4H_2O$ with sodium thiosulfate as oxidizer instead of potassium permanganate. This flow chart is shown in FIG. 14 and the material is designated as NMC. Once again, other molar ratios as well as synthesis conditions may be utilized, without departing from the spirit of the invention. The discharge Table 3 shows the performance characteristics.

The particle sizes, size distribution and shape allow the material to be compacted very efficiently. In a blend with EMD manganese dioxide, the material again packs very efficiently. As such, cathode densities in a range whose lower end is defined by approximately 3.0 g/cc, 3.1 g/cc, 3.2 g/cc, 3.4 g/cc, 3.6 g/cc cathode volume, and whose upper end is defined by 3.8 g/cc, 4.0 g/cc, and 4.2 g/cc cathode volume, are readily obtained. This also allows significantly more active material to be packed into a cell, including anode gel, to provide batteries with longer service life than previously known. AA cells with delivered capacities greater than about 3.5 Ah may be produced.

In accordance with another aspect of this invention, an anode capacity to cell volume ratio greater than about 0.5 Ah/cc is achieved. Additionally, the anode capacity to cell volume ratio is greater than about 0.55 Ah/cc, still further, it is greater than about 0.6 Ah/cc, still further, it is greater than about 0.9 Ah/cc.

A further variant of the above process is shown in FIG. 15 where $CuSO_45H_2O$ and $MnSO_4H_2O$ are mixed with $KMnO_4$ and heated to produce a an active cathode mixture designated as the CMK process.

Figure 16:
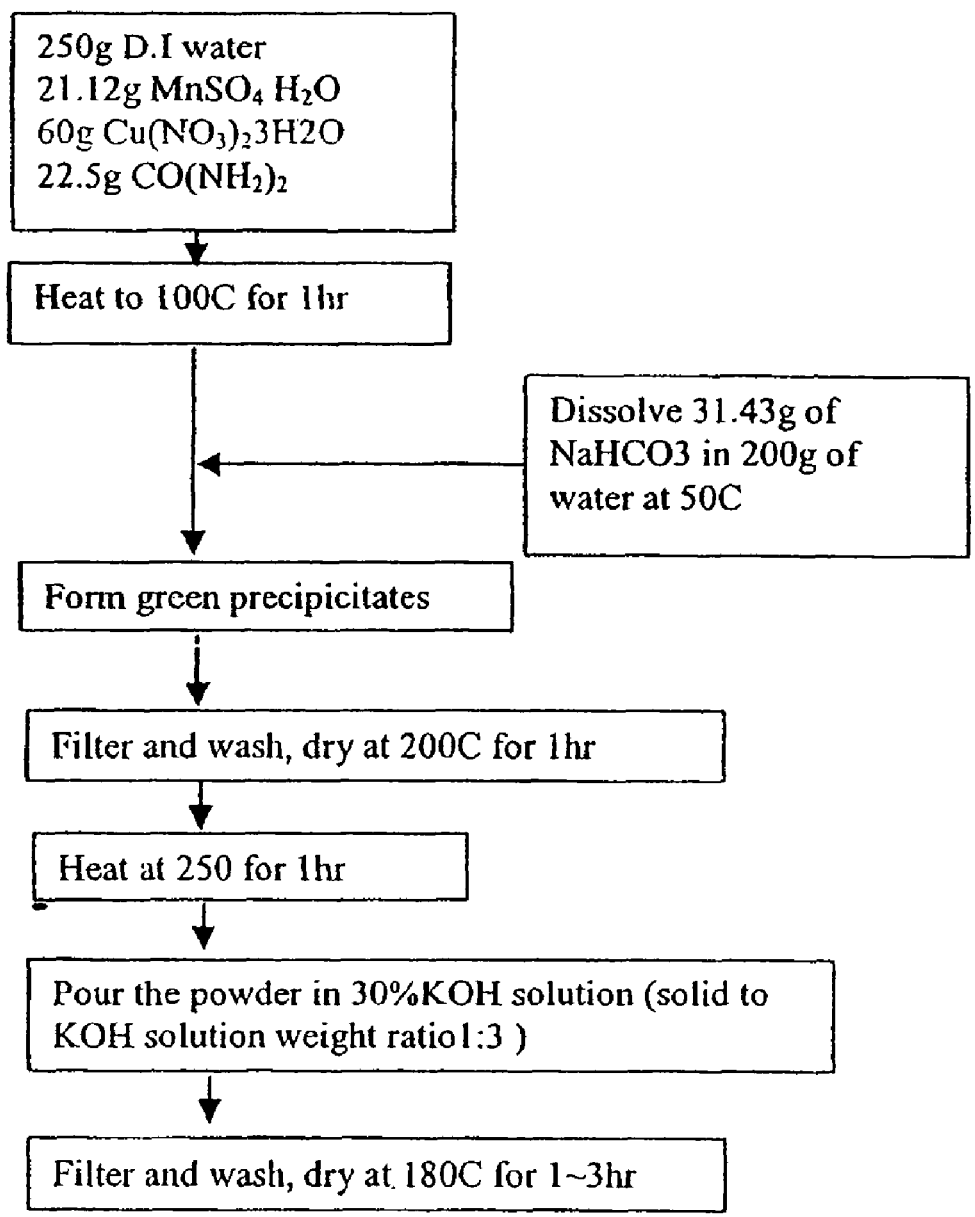
FIG. 16 shows a flowchart representing a process for synthesizing a mixed metal oxide in accordance with yet another an alternative embodiment.

A urea based co-precipitation process is followed by thermal oxidation as shown in FIG. 16. The material is designated as CuMnZ10B.

Another process can be used to synthesize a higher voltage cathode material containing copper. Specifically Cu in the +3 state is synthesized in a silver compound using $AgNO_3$ and $Cu(NO_3)_2.3H_2O$, and the mixed solution is oxidized using $K_2S_2O_8$ in the presence of KOH. Such an oxide in KOH would, however, generate anode-fouling copper and silver species. The present invention therefore also provides a separator system that overcomes this difficulty and yields a viable battery having an acceptable shelf life, as is described in more detail below.

Figure 17:
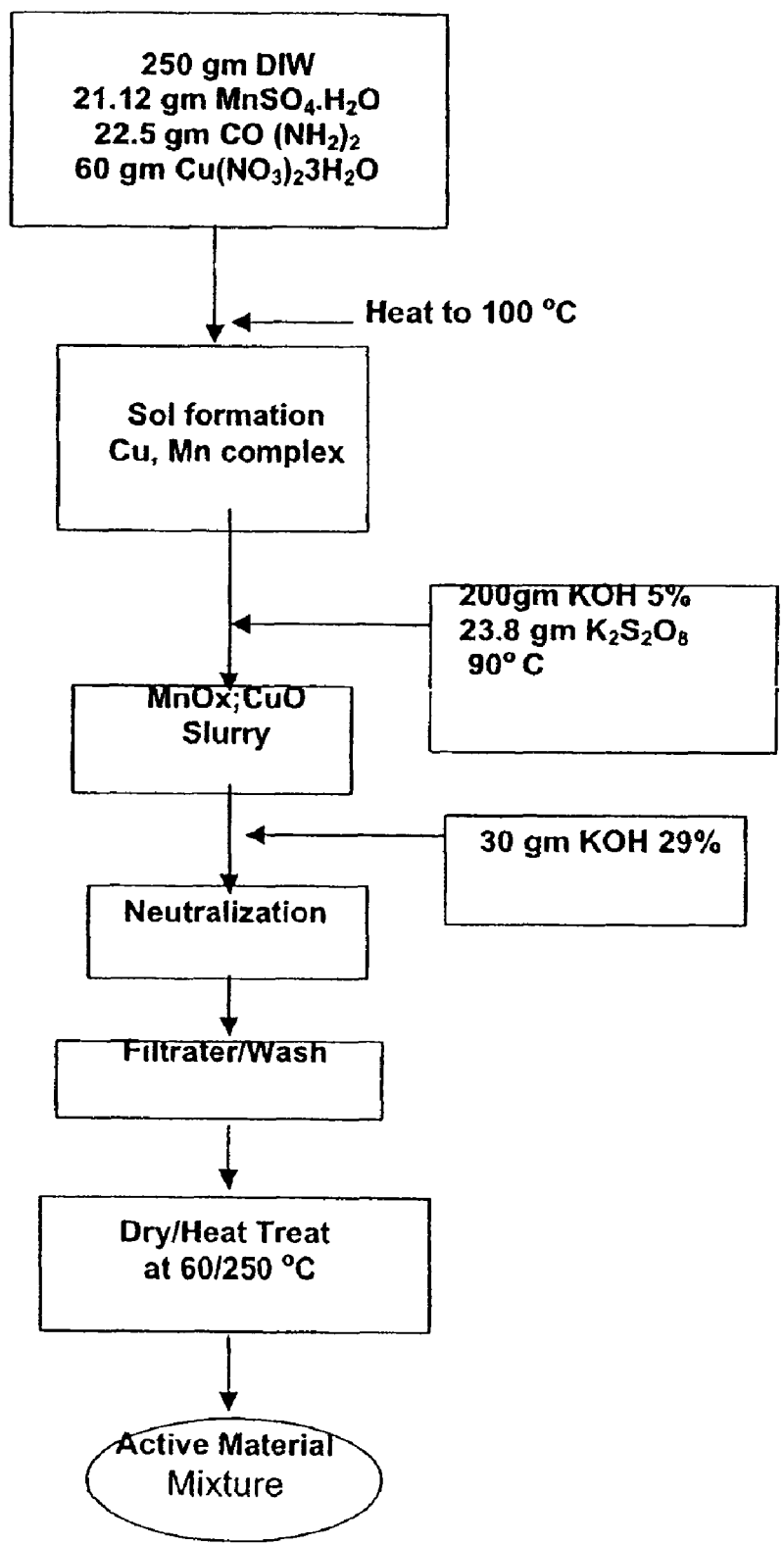
FIG. 17 shows a flowchart representing a process for synthesizing a mixed metal oxide in accordance with still another an alternative embodiment.

Still another process designated as a co-precipitation/gelation method involves the formation of a sol as shown schematically in FIG. 17. The active cathode mixture comprising copper and manganese was prepared by the coprecipitation-gelation method from a solution containing copper (II) nitrate trihydrate (1M), manganese (II) nitrate monohydrate (0.5M) and urea (1.5M). The mixed solution was heated to 100° C. and then kept at this temperature until a pH of about 1 was achieved. Prior gel formation, a hot mixture of an aqueous solution of KOH (10%) and 0.5M $K_2S_2O_8$ was added drop wise until the sol reached a pH of 11. The resulting precipitate was separated by filtration and thoroughly washed with deionized water and then oven dried at 60° C. for about 15 hours. Finally, the mixed oxide cake was ground into smaller particles and heat treated in air at 250° C. for 2 hours. The material shows excellent voltage, rate capability and discharge capacity, as indicated in Table 3. The BET surface area of the material from such a process was determined to be about 100 m²/g.

Table 3 summarizes the discharge capacities of the multi-component active cathode samples produced as disclosed herein, and evaluated using the Half-Cell Test described herein.

TABLE 3

Half Cell Test Results of Various Samples Evaluated

| Synthesis ID | Process | Capacity @ 5 mA to 1.0 V mAh/gm | Capacity @ 30 mA to 1 V mAh/gm | Capacity @ 30 mA to 0.9 V mAh/gm |
|---|---|---|---|---|
| MCS5A | Low Temp SS synthesis, $KMnO_4$ oxidizer | 283 | 240 | 274 |
| NMC | Low Temp SS synthesis $Na_2S_2O_8$ oxidizer | 242 | 203 | 243 |
| CMK | Low Temp SS synthesis $KMnO_4$ oxidizer | 302 | 230 | 276 |
| CuMnZ10B | Urea based co-precipitation w/ thermal oxidation | 275 | 235 | 264 |
| ECuMnO10 | Urea based co-presipitation/gelation method | — | 215 | 273 |

In accordance with one aspect of this invention, a cathode has a discharge capacity greater than about 220 mAh/g of actives, greater than about 250 mAh/g, greater than about 275 mAh/g, greater than about 300 mAh/g, and greater than about 320 mAh/g of actives as determined from the Half-Cell Test described above, performed at 5 mA constant current to 1V vs. a Zinc reference.

In accordance with another aspect of this invention, a cathode has a discharge capacity greater than about 180 mAh/g of actives, greater than about 200 mAh/g, greater than about 220 mAh/g, greater than about 250 mAh/g, greater than about 275 mAh/g, or greater than about 300 mAh/g of actives as determined using the Half-Cell Test described above, at 30 mA constant current discharge to 1V vs. a Zinc reference.

In accordance with a further aspect of this invention, the synthesized mixture comprising the cathode material has a BET surface area greater than about 1 $m^2/g$, greater than about 5 $m^2/g$, greater than about 20 $m^2/g$, greater than about 30 $m^2/g$, greater than about 60 $m^2/g$, greater than about 70 $m^2/g$, greater than about 100 $m^2/g$ and greater than about 150 $m^2/g$.

In a related embodiment, a cathode active material can be obtained by a combination of physical admixing with chemical synthesis. This combination provides copper oxide on the surface of the manganese oxide to facilitate smooth transitions between the phases and discharge profiles of the individual compounds. Using this combination, it is possible to obtain the voltage profiles shown in FIG. 18. The opposite may also be applicable, whereby $MnO_2$ or other material could be provided on the surface of the CuO.

Figure 18:
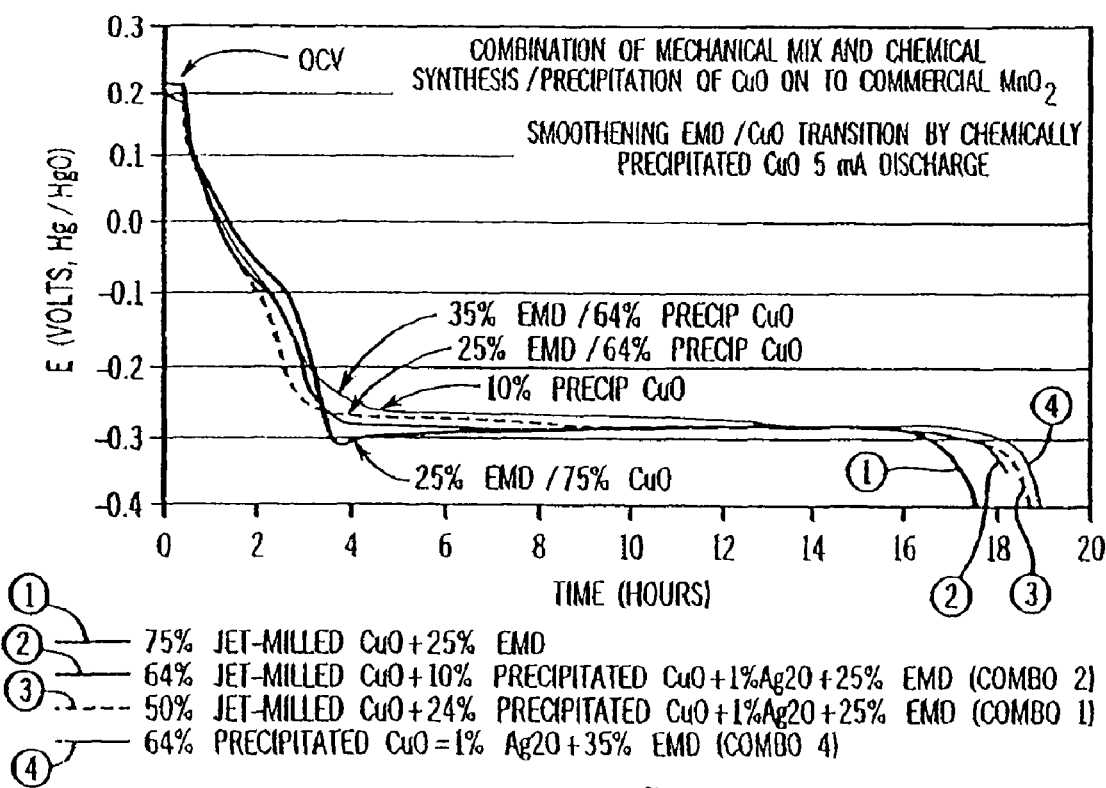
FIG. 18 shows a graph representing the smoothening behavior of EMD/CuO transition by a combination of mechanical mixing and chemical synthesis/precipitation of CuO on to Commercial $MnO_2$ (EMD) under 5 mA discharge conditions.

In accordance with an embodiment of this method, CuO and $Ag_2O$ are precipitated from $CuSO_4$ and $AgNO_3$, respectively in alkali media in the presence of EMD. The cathode material can contain for example, 64% CuO, 35% EMD and approximately 1% $Ag_2O$ added as a conductivity enhancer. The $Ag_2O$ will discharge first, producing highly conducting metallic silver in the cathode. Synthetic, natural or expanded graphites as are well known in the art provide adequate electronic conductivity and integrity to the cathode. The resulting cathode, shown in FIG. 18, shows significant increase in the initial voltage, while providing discharge capacity significantly greater than the $MnO_2$. The flat portion of the discharge is also approximately 45 mV higher on average, than the voltage of CuO alone. The transition from $MnO_2$ behavior to CuO behavior is also smoother in FIG. 18 than is the transition in FIG. 3. It is an advantage of the present invention that discharge capacity of the cell is higher than in conventional cells over a range of discharge rates.

It should thus be appreciated that, in certain aspects of the present invention, an electrochemical cell includes an anode, and a cathode comprising a cathode active material. The cathode active material includes a mixture, the mixture including a first component, a second component and a third component. The first component includes a first element, the second component includes a second element, and the third component includes the first element and the second element. A separator is disposed between the anode and the cathode.

In certain aspects, and the ratio of the first component to the second component is greater than 1/100 or alternatively greater than 1/20 or alternatively greater than 1/10 or alternatively greater than 1/2 or alternatively greater than 1/1.

In other aspects, the ratio of the second component to the first component, by weight, is greater than 1/100 or alternatively greater than 1/20 or alternatively greater than 1/10 or alternatively greater than 1/2 or alternatively greater than 1/1.

In still other aspects of the present invention, the mixture is further combined with at least one of a copper oxide, a manganese oxide, a silver oxide and a nickel oxide to produce an active material combination; wherein the mixture is present in at least about 1% by weight or alternatively at least about 2% by weight, or alternatively at least about 5% by weight, or alternatively at least about 10% by weight, or alternatively less than about 99% by weight, or alternatively less than about 95% by weight, or alternatively less than about 90% by weight.

In another aspect of the invention, an electrochemical cell includes an anode, and a cathode including a cathode active material. The cathode active material includes a mixture of manganese oxide, an oxide of copper, and a component identified by $M_xCu_yO_z$, wherein M is an element capable of producing mixed oxides or compounds or complexes. A separator is disposed between the anode and the cathode. The mixture is present in at least about 1% by weight of the combination, or alternatively at least about 2% by weight of the combination, or alternatively at least about 5% by weight of the combination, or alternatively at least about 10% by weight of the combination, or alternatively less than about 99% by weight of the combination, or alternatively less than about 95% by weight of the combination, or alternatively less than about 90% by weight of the combination.

Anode:

A high capacity anode-formulation is also provided for use in alkaline cells. As noted, cathodes of conventional alkaline cells, for example cathodes whose cathode active ingredient is $MnO_2$, consume more water by the cathodic reaction than is produced by the anodic reaction (i.e., the reaction of zinc anode and electrolyte). Hence the total cell reaction, as represented, consumes water as shown below and are thus said to be "water consuming":

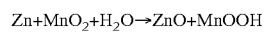

$$Zn+MnO_2+H_2O \rightarrow ZnO+MnOOH$$

The zinc anodes of conventional alkaline cells are thus generally limited to a concentration of zinc by weight below 70% in the anode because higher zinc loadings will not discharge efficiently as the anode would not contain sufficient quantities of electrolyte to properly sustain the water consuming reaction in the cathode. Furthermore, high zinc loadings with conventional particle size distributions result in higher mass transfer polarization due to the low porosity of these anodes leading to early anode passivation and premature failure.

The anode provided in accordance with an embodiment is usable in an electrochemical cell whose cathode consumes less water than conventional alkaline manganese dioxide cells, and achieves a higher discharge efficiency compared to conventional cells. Because the copper oxide and mixed copper oxide active materials of the cathode are low-water-consuming, the amount of electrolyte required in the anode is reduced relative to a conventional zinc manganese dioxide alkaline cell. The low-water consuming reaction advantageously permits an increase in zinc loading in the anode and thereby facilitating a longer cell service life.

It has been determined that a CuO-containing cathode is one example of a cathode that consumes less water than alkaline manganese dioxide cells. A zinc/air battery cathode is an example wherein the reaction does not consume water and the anode operates efficiently at anode zinc loadings of 68% to 76% by weight relative to the total weight of the anode (including electrolyte), which is significantly higher than in a conventional alkaline manganese cell.

The anode thus constructed in accordance with an embodiment can be "drier" than conventional electrochemical cells, meaning that the anode has a higher loading of zinc particles that can be efficiently discharged with reduced electrolyte concentrations given the following anodic cell reaction:

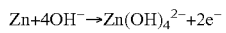

In conventional alkaline batteries, the depletion of hydroxide ions can become prominent during medium and high continuous discharge rates (e.g., greater than 250 mA for a size AA cell) and induce depressed cell performance due to anode failure in these cases. Furthermore when the electrolyte is saturated with zincate $Zn(OH)_4^{2-}$ produced in the above reaction, the zincate precipitates to form zinc oxide which, in turn, passivates the zinc anode, thereby lowering cell performance. Conventional zinc powders contain particles having a wide distribution of particle sizes ranging from a few microns to about 1000 microns, with most of the particle size distribution ranging between 25 microns and 500 microns. Therefore, in order to achieve proper discharge of such conventional zinc powders, a KOH concentration above 34% is conventionally used and necessary.

The present inventors have discovered that a narrow particle size distribution as described in more detail below allows the use of electrolyte concentrations significantly lower than in conventional alkaline batteries. This in turn further favors lower Cu solubility into the electrolyte, better wetting of the cathode surface and assists the discharge efficiency of the cathode.

Specifically, a KOH concentration less than 36% (for example between 25% and 34% KOH concentration) is desirable, using principles of the present invention while avoiding premature anode passivation that would occur in a conventional cell.

Various aspects of the present invention recognize that the particle size distribution ("PSD") of the zinc plays a role in enhancing the effectiveness of discharge in a low electrolyte concentration anode and/or high zinc loading anode, as is described in more detail below. In particular, several PSD's have been identified that allow the use of the lower electrolyte concentrations while providing the necessary anode porosity for an efficient discharge at high zinc loadings.

The present inventors have recognized that physical modifications to the anode can also improve cell service life, either alone or in combination with chemical modifications noted above. For example, one can efficiently discharge cells having an advantageously lower concentration of hydroxide ions in the electrolyte than can be used in conventional cells by reducing diffusion resistance for the hydroxide ions. This can be accomplished, for example, by adjusting the zinc particle size distribution to provide in the anode a narrow distribution of similar zinc particle sizes, thereby enhancing porosity (diffusion paths) for the hydroxide ion transport. In addition to improving mass transport in the gelled anode matrix, the particle size distributions of this invention also provide increased porosity, which allow for less precipitation of ZnO on the zinc particle surface, thereby delaying anode passivation compared to the particle size distributions typically found in conventional cells. This approach is effective for use in the anodes of various aspects of the invention and can be used alone or in combination with other improvements disclosed herein.

Similarly, a suitable zinc particle size distribution is one in which at least about 70% of the particles have a standard mesh-sieved particle size within a 100 micron size range and in which the mode of the distribution is between about 100 microns and about 300 microns. It is desirable that 70% of the particles be distributed in a size distribution range even more narrow than 100 microns, for example 50 microns or even 40 microns or less.

A suitable gelled anode as described herein comprises a metal alloy powder (desirably an alloyed zinc powder), a gelling agent and an alkaline electrolyte. One skilled in the art can readily select a suitable zinc powder (alloyed with In, Bi, Ca, Al, Pb, etc). As used herein, "zinc" refers to a zinc particle that may include an alloy of zinc as is well known to one skilled in the art. Another aspect of the electrochemical cells described herein is that the anode may contain little or no mercury (e.g., less than about 0.025% by weight). It is noted that known gelling agents other than the desirable sodium polyacrylate gelling agent are suitable for use in various aspects of the present invention. Such gelling agents include carboxymethyl cellulose, crosslinked-type branched polyacrylate acid, natural gum, and the like.

The present inventors recognize that another factor that controls cell performance relates to the surface area of the anode. Specifically, increasing the active anode electrode surface area provides sufficient active reaction sites needed to keep up with the cathode reaction at high discharge rates. Accordingly, cells are provided having a predetermined amount of zinc particles (which may either be in the form of zinc or a zinc alloy) added to the anode gel. In accordance with one embodiment of the present invention contemplates zinc particles less than about 75 microns (−200 mesh size), that is, particles that pass a 200 mesh screen size are present in the anode in an amount less than about 10%, by weight relative to the total zinc in the anode (including coarse zinc particles), and desirably within the range of 1% and 10%, alternatively between the range of 1% and 8%, or alternatively within the range of 4% and 8%; it being appreciated that smaller particles further increase the effective surface area of the anode. Mesh sizes are stated herein to specify a range of particle sizes. For example, −200 mesh indicates particles smaller than 75 microns, while +200 mesh indicates particles larger than 75 microns. Alternatively, desirable results may also be attained using an amount of zinc fines greater than 10%, while the zinc particles having a diameter between 75 and 105 microns (+75 and −140 mesh size) may be present at anywhere between 1% and 50%, and more suitably between 10% and 40%, by weight of total zinc present in the anode.

Various aspects of the present invention recognize that multiple ranges of zinc particles having a diameter less than 105 microns (−140 mesh size) including particles between 75 and 105 microns (+200 and −140 mesh size) and zinc fines less than 75 microns (−200 mesh size), may be used to increase cell performance. For instance, the anode may include zinc particles between 75 and 105 micrometers, with the advantages in cell performance being enhanced when the anode gel has an electrolyte (KOH) concentration less than 30%, alternatively between 20% and 30%. When zinc fines have a size between the range of 20 and 75 micrometers (+625 and −200 mesh size), and alternatively between 38 and 75 micrometers (+400 and −200 mesh size), cell performance is particularly enhanced when the KOH concentration is between 30% and 40%, and desirably between 33% and 38%. Yet another suitable range is between 20% and 34%, alternatively, between 25% and 33%, and alternatively, between 25% and 30%. A "low KOH concentration" as used in this disclosure refers to a KOH concentration within or below any of the above-stated ranges.

Although it is known that improved cell performance can result from the use of zinc fines in combination with the low KOH concentrations, one skilled in the art would also recognize the benefits of the use of zinc fines and reduced KOH concentration individually.

While it is particularly desirable to increase the cell operating voltage in CuO containing cells which are generally associated with lower cell potentials, it will be appreciated that certain aspects of the present invention provide for cathodes that contain oxides that comprise copper, but wherein the cathode contains not CuO alone, but CuO in combination with other oxides, sulfides, or mixed copper oxide materials. In certain embodiments, the cathode may be more water consuming than in others. Depending upon the composition of the cathode, one skilled in the art will be able to determine the acceptable modification to the anode that corresponds to the reduced water consumption of such cathodes.

Lower electrolyte concentrations are desirable in the copper or silver containing systems to improve reaction kinetics, reduce copper or silver dissolution (hence migration into the anode), and achieve a high operating voltage. The use of a lower concentration electrolyte (relative to the electrolyte concentration in the anode) to prewet the cathode is believed to result in performance improvements attributed to improved wettability of the cathode. Lower copper or silver ion migration to the zinc reduces self-discharge and gassing at the anode during storage, which results in improved shelf life. Low anode polarization also contributes to achieving the desired close circuit voltage in the cell.

Various versions of the anode described herein result in a number of advancements in the art when compared to conventional anodes usable in a typical $Zn/MnO_2$ alkaline cell. These advancements include:

1. Higher zinc loadings that take advantage of the low-water consuming cathode reaction compared to a conventional $Zn/MnO_2$ alkaline cell. If one were to increase zinc loadings in a conventional alkaline cell, it would typically result in less electrolyte (less water) available for the cathode and thereby inhibit cathode discharge performance. The high water consuming chemistry therefore restricts the overall cell design in conventional cells. In addition, the high capacity and/or density of CuO allows higher capacity cathodes to be packed in less volume than $MnO_2$ cathodes, allowing higher quantities of anode to be placed in the cells, while still maintaining a level of electrolyte required by the cell. This significantly increases the anode capacity to cell volume ratio (Ah/cc) compared to conventional alkaline cells into a range that was not previously known to be attainable. For instance, conventional commercial alkaline cells are restricted to an anode capacity/internal cell volume ratio of ~0.5 Ah/cc based on a zinc capacity of 820 mAh/g and an $MnO_2$ capacity of 400 mAh/g based on a 1.33 electron reduction of $MnO_2$. A cell constructed in accordance with various aspects of the present invention achieves an anode capacity/cell internal volume ratio>0.5 Ah/cc, between 0.55 and 0.9 Ah/cc, and further between 0.55 and 0.7 Ah/cc. The PSD, particle shape, and electrolyte concentration of this invention allows high zinc loading anodes to be discharged at a high efficiency. This results in higher cell capacity.

2. The proper choice of zinc powder PSD of this invention enables the use of lower electrolyte concentrations without the premature passivation that would otherwise occur with regular powders in conventional alkaline cells. In particular, passivation generally occurs in electrochemical cells when the anodic reaction produces zinc oxide, which covers the remaining zinc in the anode, thereby preventing the KOH from accessing and reacting with the remaining zinc. It is well known that conventional $MnO_2$ alkaline cell anodes having conventional PSD prematurely passivate when lower electrolyte concentrations are used. Conventional anode particle sizes are distributed between 45-500 microns, thus within a broad range of 455 microns, rather than a narrow range of 100 to 150 microns that is envisaged by the present inventors.

Figure 19:
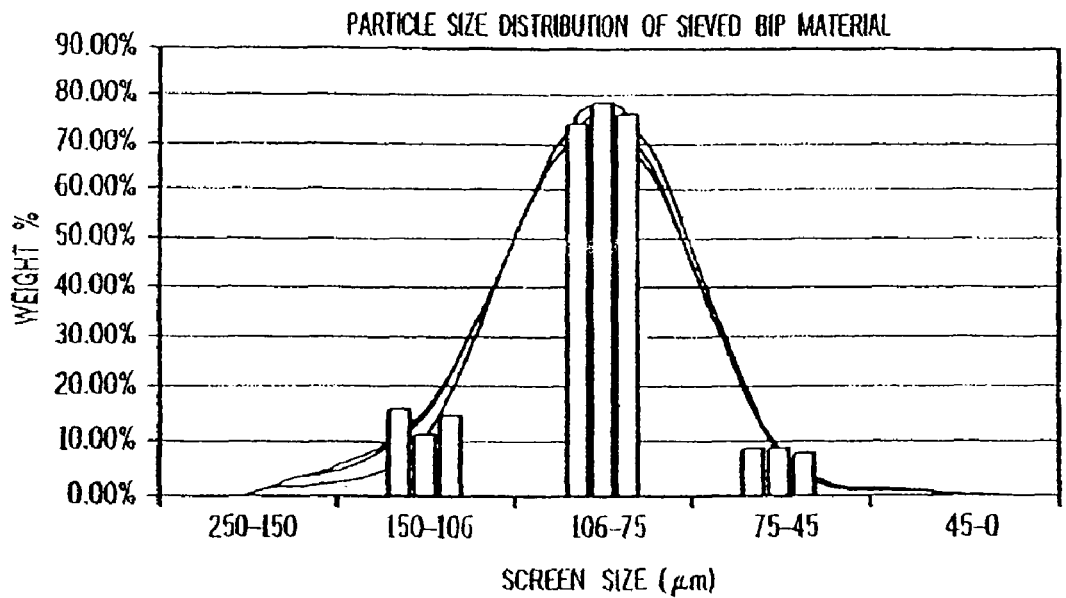
FIG. 19 is a graph plotting the particle size distribution of sieved zinc alloy anode particles.

In accordance with an alternative embodiment, the zinc PSD's disclosed herein desirably can be distributed within a narrow window of 200 microns and, alternatively, 150 microns, meaning that between and including 90% and 95%, and up to 100%, of the particle sizes, by weight, are within the 150, or 200, micron window, and in particular are tight distributions substantially centered around 100 µm, 175 µm and 250 µm, and 300 µm (meaning that between and including 90% and 95%, and up to 100% of the zinc particles have particle sizes centered around the specified sizes). One skilled in the art will recognize that mesh sizes corresponding to these particle sizes can be identified using ASTM Designation: B214-99. The PSD's herein increase the zinc anode porosity, thereby reducing passivation. A zinc powder with a tight PSD centered around 100 µm is illustrated, for example, in FIG. 19. The invention includes similar distributions centered about 175 µm and 250 µm, as described above. The zinc powder illustrated in FIG. 19 includes additives including bismuth, indium, and lead as will be understood by those having ordinary skill in the art. It is to be noted that the "sieved zinc" referred to in the examples refers to zinc having a particle size distributed as shown in FIG. 19. One skilled in the art would recognize that BIP refers to the alloying additives incorporated by manufacturers, and refers to Bismuth, Indium and Lead in the zinc.

Figure 20:
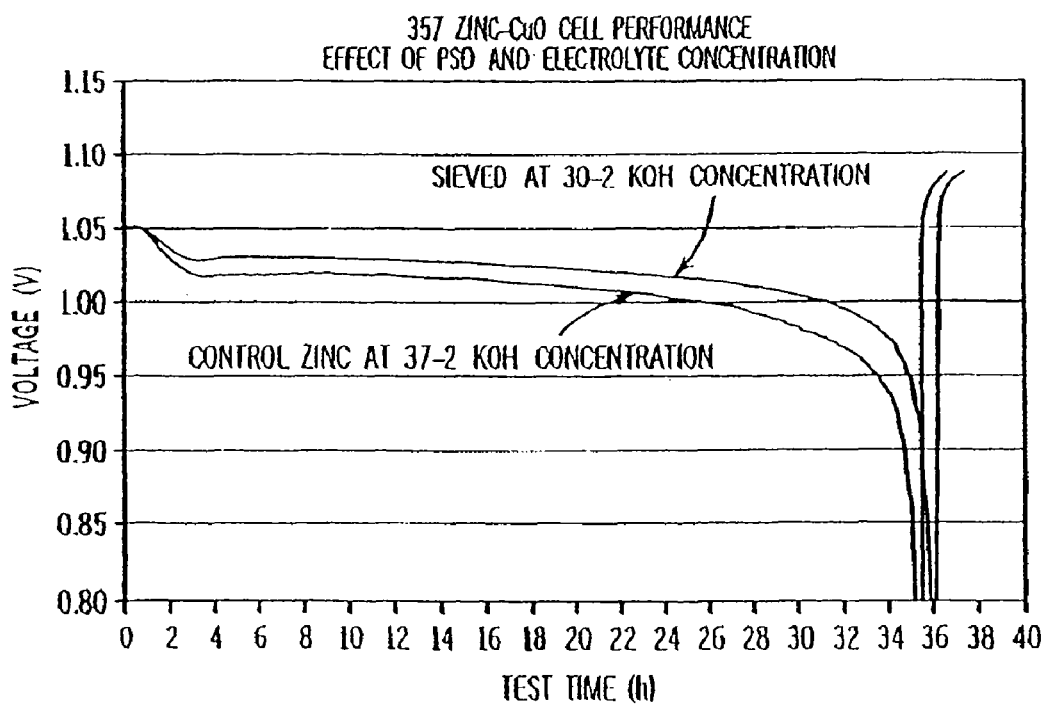
FIG. 20 is a graph plotting cell performance for electrochemical cells containing CuO, wherein a first cell contains sieved zinc at a lower electrolyte concentration, and a second cell contains conventionally distributed zinc and a higher electrolyte concentration.

3. The PSD's when combined with a lower electrolyte concentration typically result in a higher cell operating voltage. In particular, FIG. 20 illustrates cell performance for 1) a first control cell having a 37% electrolyte concentration (concentration by weight of KOH with respect to the electrolyte mixture) and a 2% zinc oxide concentration in the anode, and a conventionally distributed anode, and 2) a second cell constructed in accordance with the principles discussed herein having an electrolyte at 30% KOH concentration and 2% zinc oxide concentration by weight in the anode, and an anode distribution as described herein. FIG. 20 thus illustrates the increase in operating voltage when anodes as described herein are used in Zinc-CuO cells. It should be appreciated that the initial zinc oxide concentration in the anode before cell discharge can be between 0.5% and 6% by weight, and that the concentration of zinc oxide is a function of the electrolyte concentration since solubility of ZnO is a function of KOH concentration.

Figure 21:
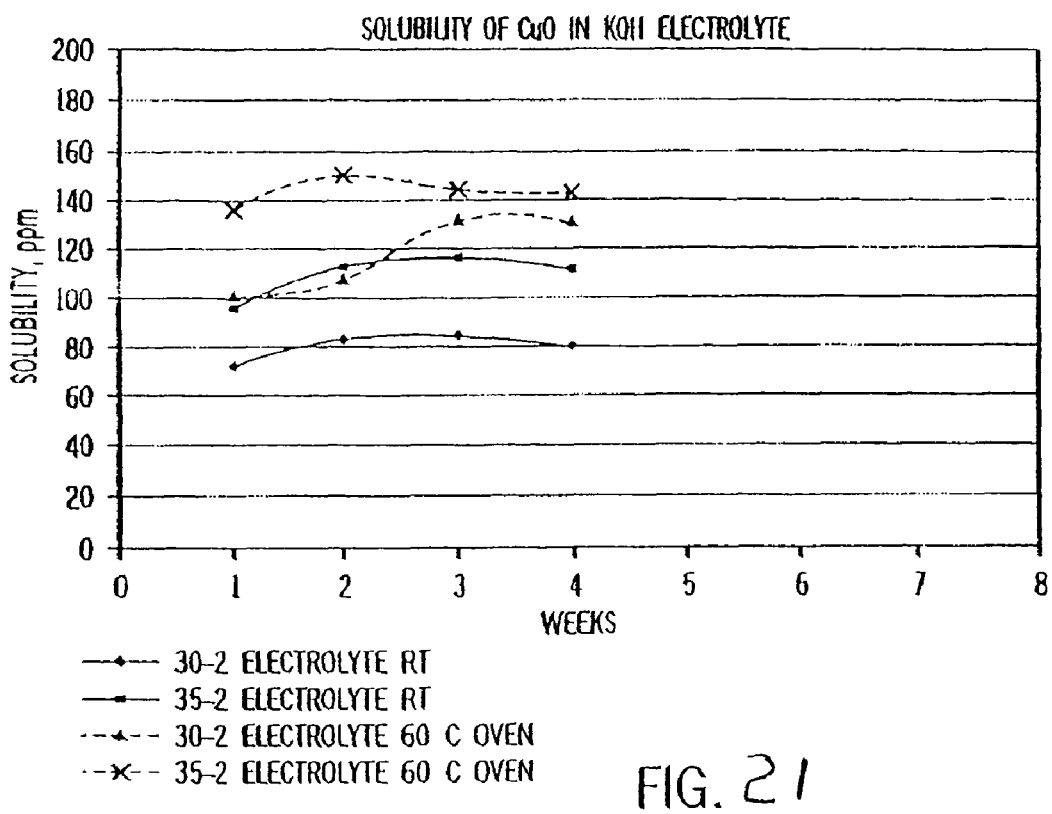
FIG. 21 is a graph plotting the solubility of CuO in KOH electrolyte as a function of electrolyte concentration and storage time.

4. Lower electrolyte concentrations are believed to reduce copper ion solubility, resulting in lower copper ion migration to the anode. Referring now to FIG. 21, electrolytes of concentration 30% KOH and 35% KOH are mixed with CuO at 1) room temperature, and 2) 60 degrees C. In both cases, the solubility of CuO in KOH increased with increasing KOH concentrations. Reduction of the equilibrium KOH concentration in the cell will reduce the dissolution of copper ions in the cathode. Without being limited to theory, the reduction of copper ion dissolution and migration is believed to result in lower self-discharge and gassing at the anode, which is believed to improve battery shelf life.

Figure 22:
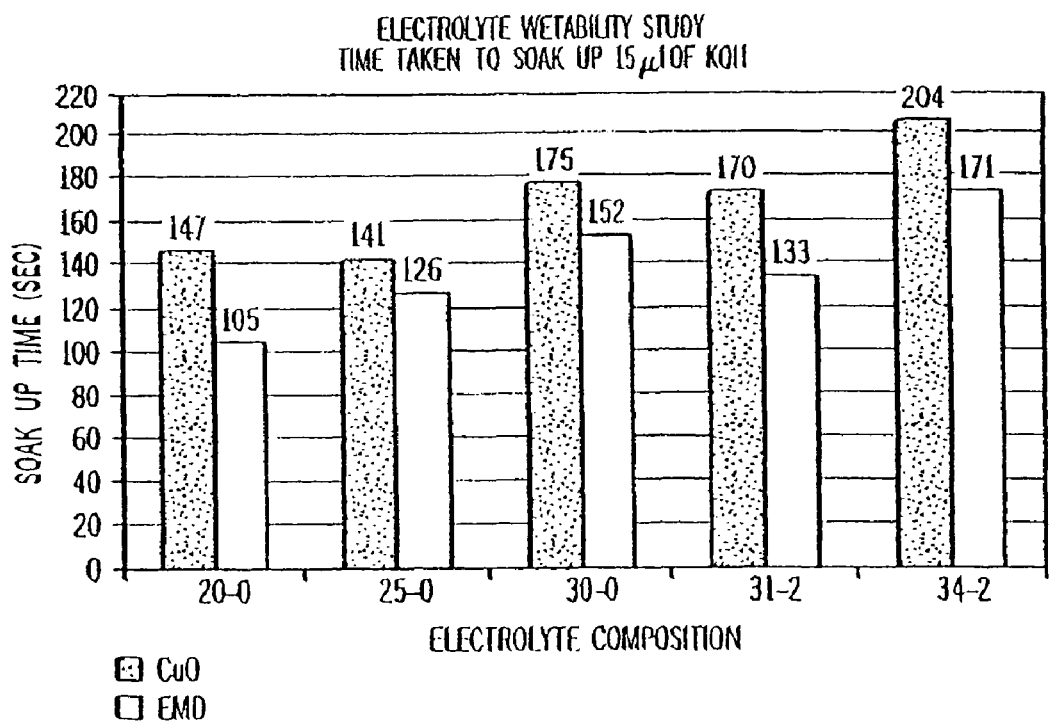
FIG. 22 is a graph plotting the wettability of CuO compared to EMD as a function of electrolyte concentration.

5. Lower electrolyte concentrations also improve the wettability of the cathode comprising copper or silver oxides, which is believed to result in better reaction kinetics. CuO is more hydrophobic than EMD $MnO_2$ as can be seen in FIG. 22 and the use of lower prewet KOH concentration improves the wettability of the cathode and results in improved performance of the inventive electrochemical cells.

Separator

One version of a suitable separator material has a polymer backbone formed from a straight chain, a branched chain, or variants thereof. Examples of materials having such a backbone that have been found to provide a suitable separator include polyvinyl alcohol, (PVA), poly (ethylene-co-vinyl alcohol-EVOH), copolymers of polystyrene, blends or co-extrusions of these and like materials with materials such as polyethylene, polypropylene, polystyrene, and variants of the foregoing. Additional suitable separator materials include cellulosic films such as cellophane and variants thereof. However, not all such polymers are suitable. Rather, suitable polymers retain electrolyte in the separator where, in the separator, the retained electrolytes have a pH value lower than the bulk electrolyte found in the cathode and the anode. The separator-retained electrolyte desirably has a pH value that is 0.5 to 3 pH units lower than the pH of the bulk electrolyte. The extent to which electrolyte is retained in the separator, and the extent to which the pH of the retained electrolyte can vary from that of the bulk electrolyte, can be modulated by polymer side groups provided on the backbone. Alcohol side groups are suitable, ranging from simple hydroxyl groups to more complex side chains that comprise at least one alcohol moiety, including linear, cyclic and branched side chains that can comprise carbon, nitrogen, oxygen, sulfur, silicon, and the like. Other side groups such as carboxylic acid functional groups can be provided on the separator to enhance or inhibit electrolyte retention or pH in the separator. The separator is hydrated by the bulk alkaline aqueous electrolyte, as in conventional cells, but the electrolyte retained in the hydrated separator has a characteristic pH lower than that of the bulk electrolyte.

The separator can be a film and is optionally formed on the cathode or inserted into the cell during cell manufacture. A particularly suitable film has as small a cross-sectional thickness as is practical while retaining manufacturing processibility (e.g., flexibility, mechanical stability, integrity at processing temperatures, integrity within the cell, and the like), adequate electrolyte absorption, as well as the advantageous properties noted herein. Suitable dry film thicknesses typically range from about 10 to about 250 microns. The present inventors have recognized that depending on the difference between the pH value of the bulk electrolyte and the pH value of the electrolyte retained in the separator, the thickness of a film separator may be selectively optimized to effectively limit the migration of anode-fouling soluble species.

One version of the present invention includes a sealed separator system for an electrochemical cell that is disposed between a gelled zinc anode of the type described above and a cathode containing soluble species of copper, silver, or both, as described above. It should thus be appreciated that the term "sealed separator system" is used herein to define a structure that physically separates the cell anode from the cathode, enables hydroxyl ions and water to transfer between the anode and cathode, limits transport other than through the material itself by virtue of a seam and bottom seal, and effectively limits the migration through the separator of other soluble species such as copper, silver, nickel, iodate, and sulfur species from the cathode to the anode.

The utility of an alkaline electrochemical cell constructed in accordance with the principles of the present invention can be significantly enhanced by providing in the cell an improved barrier-separator system that effectively limits the migration of anode-fouling soluble species from the cathode into the anode compartment while permitting migration of hydroxyl ions. With certain cathode materials, such as CuO, CuS, $CuAg_2O_4$ and $Cu_2Ag_2O_3$, it is advantageous to use a separator system that employs a barrier to migration of the soluble species such as Cu, Ag, S, and the like, that are produced (migration reduced by at least about 50%; alternatively at least about 60%; finally at least about 70% in a test as described herein). Such barrier materials can include PVA (polyvinyl alcohol) films, modified or cross-linked PVA (polyvinyl alcohol) films, EVA, EVOH (ethyl vinyl alcohol), cellulose type films, and laminated or non-laminated combinations or synthetic hybrids of such films. These materials enable a larger variety of oxides, sulfides, and metal complexes to be used as cathode active materials in accordance with aspects of the present invention to produce a battery with improved shelf life.

The separator can further have structure and conductivity enhancing agents incorporated therein. Agents such as natural or synthetic clays and silicates such as Laponite, etc. have shown an ability to adsorb or block ionic species, and can be incorporated in the separator material or on the surface of the separator. The separator can be a conformal separator for use in an electrochemical cell wherein the separator comprises materials that effectively limit (i.e., at least about 50%, alternatively at least about 60%; at least about 70%; and finally at least about 90%) the soluble species from passing therethrough.

The cathode of the invention can also be provided with an agent that effectively limits anode-fouling soluble species from migrating from the cathode toward the anode by interacting with the soluble species. Agents such as polyvinyl alcohol, activated carbon, natural and synthetic clays and silicates such as Laponite, etc. have shown an ability to adsorb or block ionic species.

Aspects of the present invention thus overcome at least several difficulties associated with cells having soluble cathode materials in the cathode. These difficulties include:

1. Soluble copper or silver species from cathodes tend to diffuse and migrate to the anode side and deposit in the metallic form and can cause bridge shorting, anode gassing, or anode passivation. Bridge shorting occurs when a material such as zinc oxide, copper, or silver deposits and penetrates through the separator, forming a bridge between the anode and cathode, thereby shortening the battery life. The shorting can be a high resistance short, causing slow decay of the cell voltage and capacity. Agents such as laponite may be incorporated into or on the separator, to increase the tortuosity, and thereby minimize bridge shorting. Anode passivation can lead to varying degrees of anode-fouling, ranging from an increase of the anode resistance (hence higher internal resistance in the battery) to a complete shutdown of the anode reaction.

Sulfur species can also dissolve from the sulfide additives or other sulfur containing coumpounds present to form soluble sulfur species in the alkaline electrolytes. These species can further react with each other and with other ions dissolved in the electrolyte, precipitating out either within the separator or at the separator-to-electrode interface, thereby hindering electrolyte transport between the cathode and anode or causing bridge shorting.

2. When the cathode contains sulfur either as a sulfide or as sulfur mixed with a metal oxide, the sulfide and sulfur can react with alkali and alkaline-earth hydroxides to form sulfides, polysulfides, thiosulfates, and sulfites in solution, which are capable of diffusing and/or migrating to the anode side of the cell, thereby passivating the anode and interfering with the discharge reaction as well as shelf life.

3. The above mentioned species can also react with each other and with other ions dissolved in the electrolyte, precipitating out either within the separator or at the separator-to-electrode interface, thereby blocking desirable ionic and electrolytic transport between the cathode and anode.

4 Even when the separator material effectively limits the migration of soluble copper species, silver species, sulfides, polysulfides, thiosulfates, sulfites, iodates, or similar anode-fouling soluble species, it should be appreciated that cylindrical cell separators have seams (in particular along one or more ends and the side of a cylindrical cell separator) that, if not adequately sealed, can provide avenues for these species to still diffuse and migrate into the anode. Conventional cylindrical cell separators cannot adequately limit such soluble species from migrating into the anode compartment. A "side seam" is defined herein as a seam located at overlapping ends (or potentially adjacent ends) of a cylindrical separator. An "end seam" is defined herein as a seam disposed at one of the open ends of a cylindrical cell separator. It should thus be appreciated that the terms "positive end" and "negative end" refers to the ends of the separator that are disposed proximal the positive and negative ends of a cylindrical cell, respectively, after separator installation into the cell. A "peripheral end seam" is defined herein as the outer periphery of a flat and round, square or rectangular separator that is to be sealed when installed into a button or prismatic cell.

Various aspects of the present invention provide separator combinations and configurations that overcome many of the above-mentioned difficulties for electrochemical cells having or producing a variety of anode-fouling species, such as copper, silver, and sulfur.

Separator Materials and Combinations:

Difficulties 1, 2, and 3 can be addressed by selecting appropriate separator materials or combinations of materials.

In accordance with various aspects of the present invention, several materials and combinations of materials have been found effective for alkaline cells having a gelled zinc anode and copper, silver and sulfur ions in the cathode. These materials were further evaluated to determine what material property effectively limited the migration of the anode-fouling soluble species.

It has been determined that a relatively high physical porosity in the form of open pores that extend through the separator from the anode side of the separator to the cathode side of the separator is undesirable in the separator. For instance, cellophanes, PVA, EVOH, $TiO_2$-filled high molecular weight polyethylene (HMWPE) membranes, and the like are anticipated as illustrated and described with reference to Examples 1-3 below. A HMWPE sample is available from Advanced Membrane Systems, located in Billerica, Mass., and is a porous membrane that can be filled with $TiO_2$ to decrease the porosity and increase the tortuosity of the separator pores.

It has also been determined that PVA films or fabrics coated or impregnated with polymers such as PVA, EVA and EVOH (each of which may be cross-linked), herein defined as a "hybrid separator," are effective in limiting the migration of anode-fouling soluble species as described with reference to Example 6 below if the porosity is minimized or eliminated.

While a non-woven fabric substrate coated or impregnated with an appropriate polymer like PVA or EVA is effective in limiting Cu, Ag, and S migration, it is desirable to reduce the thickness of the material and also to form a relatively impervious film using such materials. In this regard, PVA film may be cast directly from a water-based solution on a substrate from which the dried film can be easily peeled off. A 10% PVA solution (Celvol grade 350 PVA from Celanese Ltd., Dallas, Tex.) cast on a Mylar substrate/release film at 70° C. Experiments per the prescribed Exclusion Test method show that the film possesses desirable barrier properties against migration of copper, silver and sulfur species. Commercially available PVA films have also been evaluated, showing similar trends. One example of a manufacturer of such PVA films is Monosol LLC located in Portage, Ind. Several samples from Monosol have been evaluated, some containing processing aids and/or plasticizers. The resistance of the films in concentrated KOH has also been measured, showing that as the ability to effectively limit the migration of anode-fouling species improves, the ionic resistance increases. In general, PVA film samples containing significant amounts of plasticizer are less effective at limiting migration of soluble species while maintaining acceptably low ionic resistance. It may be appreciated by those skilled in the art, that effective limitation of the migration of soluble species can be attained by selecting the polymer properties, including the chemical composition, molecular weight, molecular weight distribution, additives and by appropriate cross-linking.

Those skilled in the art will appreciate that other polymer solutions may also be used to coat or impregnate non-woven or cellophane separators and achieve effects similar to those seen with PVA when used as a separator for electrochemical cells having a zinc anode and a cathode that contains anode-fouling soluble species. Alternatively, polymer solutions can coat the anode or cathode directly, thereby providing a conformal separator. It should thus be appreciated that many of the polymer solutions discussed below as forming part of a hybrid separator (e.g., a non-woven fabric separator coated or impregnated with the polymer) can alternatively be applied directly to the inner cathode surface or outer anode surface to provide a conformal separator that enables hydroxide ion transport while effectively limiting the migration of soluble copper, silver, and sulfur species. This type of separator can also minimize the need for separate side seam or bottom seal.

Other such polymers are ethyl vinyl acetate (EVA) emulsion (that contains vinyl acetate monomers), vinyl acetate-ethylene copolymers and vinyl acetate polymers that can be coated or impregnated onto a nonwoven separator to effectively limit the migration of anode-fouling soluble species such as, for example, copper, silver, sulfides, polysulfides, thiosulfates, sulfites, iodates, iodides, phosphates, silicates, or carbonates as described in Example 7 below. Another suitable polymer is EVOH.

Organic or inorganic materials, such as Laponite, Bentonite or smectite clays, or clay like materials, can also be incorporated into the polymer solutions to further enhance the performance of the polymer coated separator by providing structure or enhancing ion transport or ionic conductivity. Materials possessing an electronic surface charge may also be incorporated in order to repel soluble species of a similar charge from passing therethrough. The performance of a separator having Laponite incorporated into a cross-linked PVA-coated non-woven F3T23 separator in a 357 size cell is illustrated and described below in Example 8.

It has been discovered that a separator can include a first group (Group I) of separator materials (e.g. cellophane, $TiO_2$ filled HMWPE, etc.) that effectively limits the migration of the anode-fouling soluble copper and silver species in combination with a second group (Group II) of separator materials (e.g. PVA film or PVA coated on or impregnated in a non-woven separator, with or without cross-linking) that effectively limits the migration of the anode-fouling soluble sulfur species. The combination effectively limits soluble copper, Ag and sulfur species. A separator including a combination of Groups I and II is thus effective in minimizing the difficulties 1, 2, and 3 discussed above. Such a separator is tested below in Examples 5 and 6. The two separator materials can be stacked, laminated, or coated in various combinations. For instance, a Group I material can be coated onto an anode-facing or cathode-facing surface of a non-woven separator of Group II (or layers of suitable non-woven separators), or alternatively can be placed between adjacent layers of non-woven separator coated with PVA or a combination of suitable non-woven separators.

It has further been discovered that some materials such as cellulosic materials (e.g. cellophane) absorb larger amounts of soluble species like Cu ions than others. It has further been discovered that other materials, like polyvinyl alcohol are more efficient at effectively limiting the migration of soluble species. Therefore, in order to effectively limit the amount of material that eventually enters the anode, a combination of such materials may be more appropriate than one of them alone. A separator can therefore include a group (Group III) of separator materials (e.g. cellophane) that effectively absorbs more anode-fouling soluble copper and silver species in combination with another group (Group IV) of separator materials (e.g. PVA film or PVA coated on or impregnated in a non-woven separator, with or without cross-linking) that more effectively limits the migration of the anode-fouling species. The combination effectively limits soluble copper, Ag and other species from reaching the anode. The two separator materials can be stacked, laminated, or coated in various combinations. For instance, a Group III material can be coated onto an anode-facing or cathode-facing surface of a non-woven separator of Group IV (or layers of suitable non-woven separators), or alternatively can be placed between adjacent layers of non-woven separator coated with PVA or a combination of suitable non-woven separators.

One measure of the suitability of a separator to effectively limit the migration of anode-fouling soluble species is the air permeability of the separator. Air permeability can be measured in Gurley seconds, as appreciated by one having ordinary skill in the art. Because the Gurley test measures the length of time necessary to pass a predetermined volume of air through a separator, a longer time measurement is an indication of low air permeability. A separator having a Gurley Air Permeability of 500 Gurley seconds or higher has been found suitable for use in an electrochemical cell described above, while overcoming difficulties 1, 2, and 3. The Gurley measurement was taken using Model No. 4150N, commercially available from Gurley Precision Instruments, located in Troy, N.Y., at a pressure drop of 12.2 inches of water to displace 10 cc air through a 1 sq. inch area. The higher the Gurley number, the better. One having ordinary skill in the art will now recognize that a film separator having a relatively high Gurley air permeability will have few, if any, open pores.

It is to be appreciated that air permeability is not necessarily an accurate indicator of the permeability of the separator when wet with electrolyte containing the anode-fouling soluble species. Hence, a more direct measure of the suitability of a separator to effectively limit the migration of the anode-fouling soluble species is to use the results of a direct measurement analysis such as the Exclusion Test described below.

The separator is also compatible with known variations and improvements in cathode, anode and electrolyte structure and chemistry, but finds particular advantage for cells having a cathode that contains one or more cathode active materials comprising at least one of a primary oxide or sulfide of a metal, a binary oxide or sulfide of a metal, a ternary oxide or sulfide of a metal or a quaternary oxide or sulfide of a metal, where the metal is selected from manganese, copper, nickel, iron and silver, that can dissolve to form one or more anode-fouling soluble species, including but not limited to ionic metallic species and sulfur species, that can disadvantageously migrate from the cathode to the anode in the bulk electrolyte fluid in fluid communication with both the cathode and the anode. As used herein, "binary," "ternary," and "quaternary" refer to containing two, three or four of a particular species. Materials finding utility as cathode active materials include but are not limited to manganese dioxide, copper sulfide, copper oxide, copper hydroxide, nickel oxyhydroxide, silver oxides, copper iodate, nickel iodate, copper fluoride, copper chloride, copper bromide, copper iodide, copper silver oxides and copper manganese oxides, and combinations thereof. Combinations of cathode active materials can be provided in a cathode as mixtures or as separate entities.

In varying aspects of the invention, routes of fluid communication between the cathode and the anode, including the separator seams, are sealed to minimize or eliminate fluid communication (e.g., of bulk electrolyte) except through the separator material, at least one layer of which is provided. Moreover, substantially all anode-fouling species in the bulk electrolyte are desirably retained on the cathode side of the separator and do not migrate to the anode. The separator is thus associated with an "Exclusion Value" that refers to a percentage of soluble species that is prevented from migrating from the cathode through the separator to the anode. "Substantially all" is intended to indicate that the separator has an Exclusion Value of at least about 50%; alternatively at least about 60%; alternatively at least about 70%, alternatively at least about 80%, alternatively at least about 85%; alternatively at least about 90%; alternatively at least about 95%; alternatively at least about 97%; and finally alternatively at least about 99% per the test method developed and described herein.

It will be appreciated, however, that to the extent the anode active material of a cell tolerates the soluble species, the cell can tolerate some migration through the separator of anode-fouling soluble species. Generally, therefore, a suitable separator effectively limits the migration of anode-fouling soluble species if the separator passes less of the species than the anode active material can tolerate without becoming fouled. Substantially lower amounts of the soluble species are desired, however.

Also, a substantial portion of the electrolyte retained in the separator, for instance at least about 50%, is associated with (typically, non-covalently associated with) the polymer backbone or its side groups. A suitable measure of such an association is obtained by analyzing the separator material to determine the temperature at which water retained in the separator melts after freezing. Whereas free water retained in, but not physically associated with, the polymer melts at about 0° C., a lower melting temperature indicates an association with the polymer and, accordingly, a desirable separator. A suitable method for determining the temperature at which separator-retained water transitions to the liquid phase employs a simple differential scanning calorimetric (DSC) test. A suitably sized sample of the separator material is swollen in water for one hour then immersed in liquid nitrogen until frozen. The frozen sample is melted at a rate of 2° C. per minute in a low temperature DSC apparatus (commercially available from TA Instruments (Newark, Del.)) and the melting temperature is observed at temperatures in the range of at least as low as about −30° C. to about 20° C. (see FIG. 23).

Figure 23:
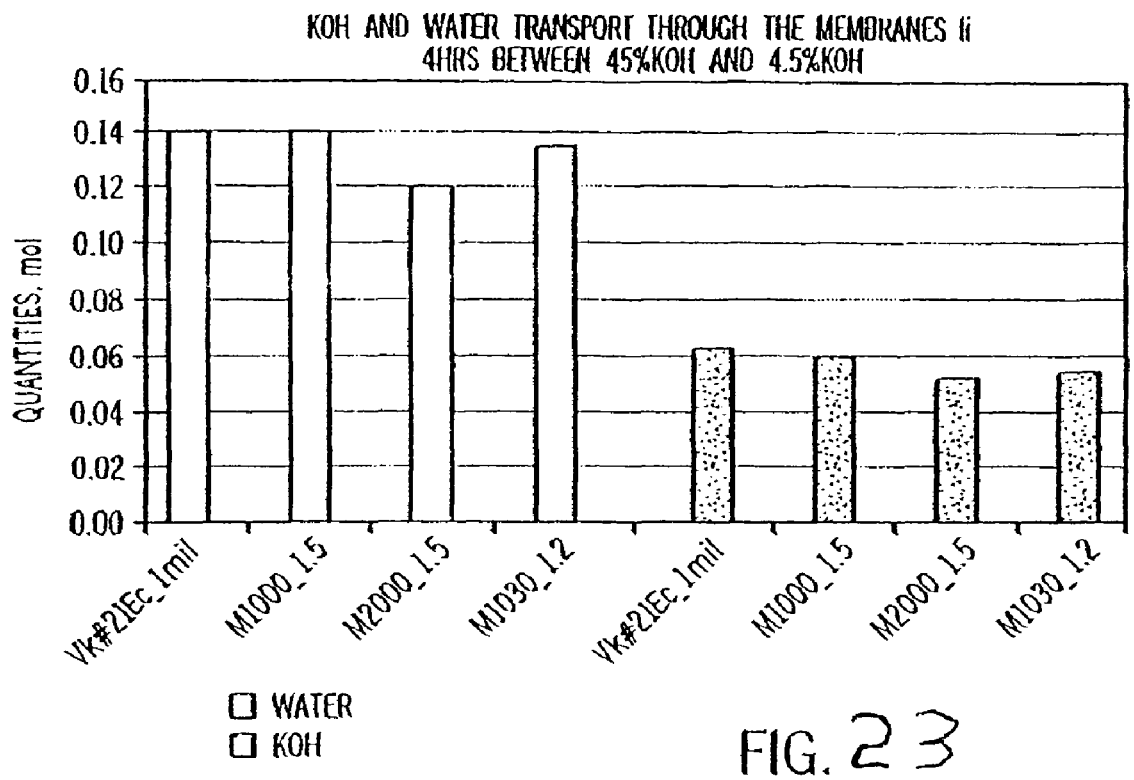
FIG. 23 is a graph plotting KOH and water transport in 4 hours through various separator materials.

A suitable separator material in an electrochemical cell also desirably transports water preferentially over hydroxide ions, and hydroxide ions over soluble species. FIG. 23 depicts the relative amounts of water and KOH transported through various candidate films and shows the relative ability with which water and KOH are transported across the films. This is an indication of "osmotic" transport. When such materials are used as separators in electrochemical cells, this property of the films can be advantageously leveraged to benefit the discharge behavior of a cell by accelerating the rebalancing of the OH⁻ and $H_2O$ concentrations in the electrolyte as the cell discharges. This is described in detail later, in reference to FIG. 27.

Osmotic Transport Test

Water and KOH transport through films and membranes are performed using a glass fixture similar in construction to the one described to measure Copper and Sulfur species transport through films in the Exclusion Test. The film in question is placed between Side A and Side B and sealed with an "O" ring such that fluid communication between the two sides occurs only through the film. The tubes in this case are graduated in steps of 0.1 ml, such that the volume changes on each side may be monitored. After assembling the fixture, 14 ml of 45% KOH is placed in side A and 14 ml of 4.5% KOH solution in side B. Prior to assembly, the separators are equilibrated with 29% KOH for 12 hrs so as to minimize "wet-up" time.

The liquid level on the side containing 45% KOH rises, while the level on the other side falls. This is because osmotic transport causes the water to be transported through the film at a faster rate than the OH-ions. The preferential water transport to the side containing 45% KOH causes the liquid level to increase. The rate of volume change is monitored, and after 4 hours the solutions on both sides were sampled to determine KOH concentration. The volume change on the 45% KOH side can be measured as a function of time for various films evaluated. The rate of water transport can then be calculated. The exposed cross-sectional surface area of the separators in this test is 1.4 $cm^2$. Determination of the concentration of liquid on each side provides an estimate of the average molar rate of transport through the film. The calculations are based on the total moles of water transported in a 4 hour period in the Osmotic Transport Test as shown in FIG. 23. Based on this calculation method As explained in reference to FIG. 27, preferential water transport is believed to minimize concentration gradients between the anode and cathode in certain electrochemical systems and thereby reduce concentration polarization and maintain a higher cell operating voltage. While not being limited to specific discharge rates, this property is particularly beneficial during high rate discharges where concentration polarization tends to play a bigger role.

In accordance with one aspect of this invention, the electrochemical cell comprises film separators having a water osmosis rate greater than at least about $1 \times 10^{-6}$ moles/cm/hr as determined using the Osmotic Transport Test described herein. Further, the film separators possess the ability to transport water at a rate greater than at least about $1 \times 10^{-5}$ moles/cm/hr, and at least about $5 \times 10^{-5}$ moles/cm/hr Separator Configuration and Seam and Bottom Sealing:

Difficulty number 4 described above (involving ion permeability through the separator side and/or end seam(s)) is addressed by the following methods and corresponding apparatus.

A sealed separator, while applicable to all battery systems, finds particular applicability to a system such as that described herein, where soluble species from one electrode can migrate to the other electrode, thereby degrading performance or shelf life. These are generally referred to as anode-fouling soluble species. In such cases, separator material alone can be insufficient because soluble species can migrate around a seam or end of the separator, unless a substantially impervious seal is provided.

As described above, it is desirable that fluid communication between the cathode and the anode via routes around the separator is minimized or eliminated by sealing the separator such that the anode is in substantial fluid isolation from the cathode except via a route through the separator. The method of sealing the separator material can be achieved by known methods, including adhesive sealing, heat sealing, ultrasonic sealing, and the like. The separator so formed can take the shape of a tube having a closed end. For water-soluble separator materials, including polyvinyl alcohol, softening the materials with a limited amount of water and then sealing with heat or pressure or both can form the seal. This arrangement is desirable as the fused separator seal typically limits the likelihood of an undesired channel for direct fluid communication between the cathode and the anode.

In a button or prismatic flat cell, a good seal is generally attainable to effectively limit anode-fouling soluble species from seeping around the separator, since the separator is pressed tightly against a flat surface (e.g., the disc or prismatic shaped electrode) by an opposing member such as an insulating grommet. In cylindrical cells however, a good seal is not easily achieved, since for ease, speed and cost of manufacture, the separator is normally inserted as a convolute, spiral wound tube or cross-placed into the cavity and the seam is difficult to seal.

A cylindrical separator can be provided having an outer periphery and a first and second end. The end of the separator to be disposed proximal the positive terminal end of the cell can be seamless, either during fabrication of the separator (i.e., via extrusion, melt blowing, and the like) or can be sealed by chemical or physical means to effectively limit the migration of anode-fouling soluble species. Chemical sealing methods include the use of an adhesive with or without a chemical bond involved. Physical sealing methods include heat (welding), vibration (e.g. ultrasonic bonding), and application of pressure or combinations thereof. Various combinations of chemical and/or physical sealing methods may also be applied depending on the material of choice—for example, to bond a PVA film to itself, use of heat, water and/or pressure can be used to produce an effective seal/joint.

Among the chemical sealing methods, one method of forming such a seal involves using a cross-linkable polymer and a cross-linking agent to provide at least a seam seal and a bottom seal and desirably also a top seal (after introduction of the gelled anode into the separator cavity).

A seam-sealed and bottom sealed separator configuration can be produced externally and then inserted into a cell, or can be produced in situ after insertion of a spirally wound, convolute or cross-placed separator tube into a cell cavity.

Cross-linking locks a polymer in place and produces a seal that is intact throughout the life of the battery. Simple coagulation of the polymer or precipitation in a high pH environment typically produces a gelatinous mass that can move or be displaced by expansion or contraction during operation or physical or mechanical shock in normal handling or transportation, thereby compromising the seal. Adhesive polymers without cross-linking may also be used, it being desired, of course, that the seal produced is stable in the battery electrolyte over the life of the battery and it does not permit more transport of anode-fouling species at the seam or bottom seal, than the separator material itself.

With the proper choice of materials, both cross-linking and coagulation can be effective. Two suitable separator materials are presented as examples of ex-situ seals. One material is cellophane and the other is a hybrid separator, which comprises a non-woven fabric coated with PVA, which is cross-linked using a cross-linking agent. Sufficient loading of PVA is necessary (>5 $g/m^2$) to make the non-woven paper substantially impermeable to air, with Gurley air permeability>500 sec. Low air permeability ensures that in a battery, when the polymer swells upon absorbing electrolyte, there would be substantially no paths for the transport of the anode-fouling soluble species through the material. To make a seam seal, a layer of viscous PVA solution (e.g., 2-10% by weight in water) is applied near the seam, the two surfaces brought together, followed by application of a thin layer of a cross-linking agent such as sodium borate or others known in the art. The seal area cross-links immediately, while also bonding the two surfaces together. A simple test of 5 days soak in concentrated KOH electrolyte shows that the seam is intact and cannot be physically torn apart, suggesting good operational characteristics in a battery. The efficacy of the seal in effectively limiting anode-fouling soluble species may be tested using the Exclusion Test described herein. Other suitable cross-linkable polymers suitable or use as the adhesive include but are not limited to polyethylene glycol, polyvinylbutyral, and polyvinylpyrrolidone.

To produce a bottom seal, one end of a wound separator tube with at least some overlap between layers (and with a mandrel inside) is folded to form a cup over a disk shaped piece of the same or other separator-placed on the end face of the mandrel followed by a drop of the cross-linkable polymer (e.g. PVA). Upon addition of sufficient cross-linking agent, a cross-linked, adherent composite folded bottom is created, which effectively limits the migration of the anode-fouling soluble species. The tubular shaped separator can then be utilized to produce a battery in the traditional manner.

While an ex-situ seal as described above is very effective, it is not the most desirable from a battery design and performance perspective because there is often a gap that exists between the sealed tube and the cathode cavity. This space can create a poor wetted interface between the anode and the cathode, leading to poor battery performance, particularly after prolonged shelf storage. One solution to this problem is to use a separator that swells significantly upon electrolyte absorption, thereby filling the space that existed between the dry tube and the cathode. A pleated tubular shaped separator-that can expand after insertion can also be used. Another solution to the problem is to produce such a seal in-situ after insertion of a spiral wound tube (for example), as described below for the case of a cross-linkable polymer-coated non-woven separator. The particular advantage of an in-situ aspect is that when an unsealed spirally wound tube or cross-placed separator is inserted into a cavity, it has the opportunity to expand into the volume available and reduce the gap between itself and the cathode material to produce a good interface. This can be further aided in the case of a wound tube in the process of removing the insertion mandrel, by a slight counter-directional twist or a controlled jet of gas to allow or cause the separator to expand into the cavity since the seam is not yet sealed.

Hence in a desired embodiment, to obtain an in-situ seal, a non-woven separator may be coated with sufficient loading of a mixture of a cross-linkable polymer (e.g., PVA) and a cross-linking agent (e.g. a borate derivative) to render it substantially impervious (Gurley air permeability>500 sec). The cross-linking agent is selected such that it will not immediately cross-link the PVA (i.e. remain dormant until activated appropriately). An example of such a borate derivative cross-linking agent is boric acid. In this particular example, cross-linking will occur when the pH increases above 7 in the battery after (KOH) electrolyte contacts the separator, thereby activating the cross-linking agent. The substantially dry PVA/boric acid coated separator is wound around a mandrel (as in present day alkaline cell manufacturing) with at least some overlap between layers. One end is folded to form a cup shaped bottom, and the tube is inserted into a cathode cavity. A bottom disk comprising the same or other separator material coated with a cross-linkable polymer and cross-linking agent, as above, is next inserted into the tube so as to rest inside the folded bottom of the wound separator tube. When a pre-shot of electrolyte is introduced into the separator tube, or Zn gel containing electrolyte is added, it will cause cross-linking of the PVA in the presence of the boric acid, simultaneously also forming a seal or bond between adjacent layers of the separator, the bottom disk and tube, as well as the seam in the overlap region.

Another method of achieving the same objective is to start with a non-woven paper, which has a sufficient amount of cross-linkable polymer, e.g. PVA (but without cross-linking agent) coated on it to render it substantially impervious (Gurley air permeability>500 sec). A folded bottom is created and it is inserted into a cathode cavity as described above, followed by insertion of a bottom cup coated or impregnated with PVA. Cross-linking agent (e.g. sodium borate) is next applied to the inserted separator tube, thereby simultaneously cross-linking and sealing the adjacent layers of the separator tube, the bottom to the bottom cup and the seal region at the overlap. It has been found that this process of cross-linking becomes more efficient if the separator is pre-wet or sprayed with water prior to application of the cross-linker. It should be appreciated that the correct process steps and conditions should be optimized based on the nature of the cross-linkable polymer and the cross-linker.

Other polymers and/or cross-linking agents can be used to achieve the same end result. By way of non-limiting example, carboxylic groups can be introduced into PVA and cross-linked with glutaraldehyde to improve film properties, as can regenerated cellulose coated or laminated on PVA or modified PVA. PVA can be copolymerized with acrylic acid to significantly lower ionic resistance. Acetylized PVA films can be modified with polyacrylic acid. Acrylic- or methacrylic acid-grafted PVA can also be used. Similarly, grafted methacrylic acid on a polyethylene or polypropylene membrane is also suitable as a separator.

In another aspect, a combination of the ex-situ and in-situ processes can also be used. For example, the PVA can first be applied to the wound separator seam and bottom of an appropriate separator material followed by insertion into the cell cavity. The requisite amount of sodium borate (or other) cross-linking agent may next be applied into the tube, to cause the assembly to cross-link and seal in place.

An additional aspect of this invention is the optional incorporation of conductivity and structure-enhancing fillers like Laponite, fumed silica, Bentonite, etc. into the separator during the polymer coating process. Since higher loadings of PVA than in conventional cells is required to make the non-woven layer impervious, this can increase the electrical resistivity of the separator. Incorporation of appropriate fillers will tend to enhance the conductivity to more acceptable levels and improve battery discharge characteristics.

A second general method of producing a sealed separator is physical, using a heat-sealable polymeric material, such as PVA, polyethylene, polypropylene, nylon, and the like. The seal is formed by providing a layer of the polymeric material, in the form of a continuous film, or porous fibrous film, and inserting the layer into the area to be sealed (e.g., the outer periphery of a separator to be installed into a size AA cell). The separator then can form a seal under controlled heating with or without application of pressure. The heat sealable polymeric layer can also be applied to one surface of a separator layer (that may or may not be heat sealable), and subsequently wound into a cylinder, such that the overlapping region will comprise a layer of the sealable polymeric material interfacing with another separator layer. The heat sealable polymeric material will thus seal against the other separator layer under a controlled heating condition. The polymeric material may further be positioned adjacent the outer periphery or the inner periphery cylindrical separator prior to forming the separator into a cylinder. Alternatively, the polymeric material can be applied to the interface of two overlapping ends (that would not otherwise bond with each other) of a cylindrical separator. The polymeric seal would thus bond the two ends together under a controlled heating condition, and form a seal. A suitably shaped polymeric layer can also be laminated or coated onto either side of a separator to be installed into a button cell, such that the polymeric material seals the outer periphery of the separator during a controlled heating condition.

The use of ultrasonic vibration to fuse the material to itself or another material has been found effective in producing a good seal in (for example) PVA films.

A third method for forming a seal is to apply hot wax, or epoxy resin, or other glue type sealant to the seams. An important aspect is that the materials used here (wax or epoxy) be resistant to the highly alkaline environment of the battery and maintain their sealing characteristics.

Alternatively, seamless separator tubes using a variety of polymer processing methods such as extrusion, injection molding, or blow moulding/blown films can be employed. Likewise, seamless tubes can be prepared by, e.g., completely coating a seamed material such as a fibrous material with a suitable separator forming polymer such as regenerated cellulose such that the seam is not present in the separator, but rather in the underlying material. It should be appreciated that the separator structures described herein may include any number of layers of the materials described above to more effectively limit the migration of the anode-fouling soluble species.

A still further alternative is to combine heat sealing and polymer cross-linking by coating or laminating a cross-linkable polymer with cross-linking agent onto a separator such as cellophane. The separator can be placed into position using convention placement methods. Introduction of electrolyte alone or in the anode will cross-link the polymer to form a sealed separator.

It should be further appreciated that the positive and negative ends of the separator should also be desirably sealed in a manner sufficient to effectively limit the migration of anode-fouling soluble species to the anode. Cylindrical cells typically include an annular grommet disposed proximal the negative cell terminal end that is compressed either axially or radially against the cathode and separator to prevent anode spillover. The negative end of the separator can abut and be sealed against the grommet by dispensing a polymer to the periphery of the separator at the negative end, and sealing the polymer against the grommet under controlled heating conditions. A chemical bond including cross-linking may also be used to create a seal. The negative end of the separator can also be mechanically sealed using a grommet or the like with an appropriately designed separator lock. Alternatively, a physical seal can be applied to the upper end of the zinc anode to effectively limit the migration of anode-fouling soluble species to the anode. The negative end can also be sealed by using a disk shaped cap coated with a cross-linkable polymer which will seal against the seam and bottom-sealed cylindrical separator tube when the polymer is cross-linked. Alternatively, the top surface and edge of the cathode may be covered by appropriate cross-linkable polymers or polymer gels to effectively limit migration of anode-fouling soluble species. Alternatively, the top surface of the anode may be covered by appropriate cross-linkable polymers or polymer gels to effectively limit migration of anode-fouling soluble species from the cathode.

Figure 24:
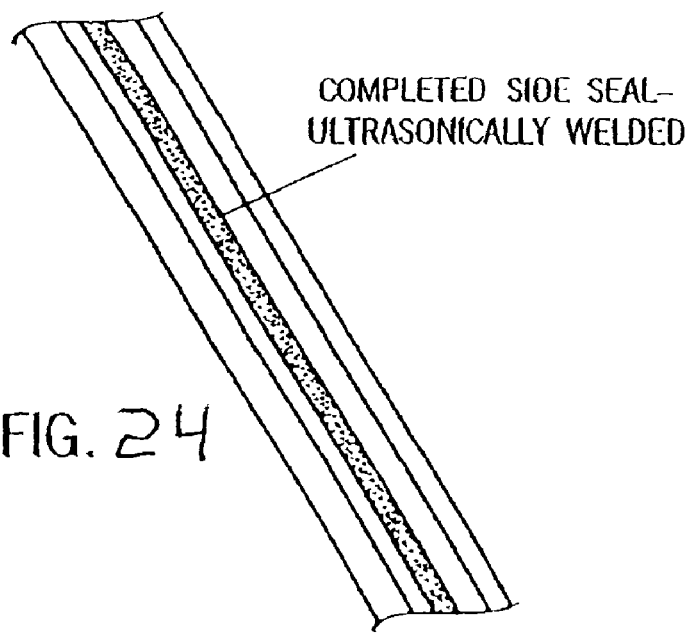
FIG. 24 is an illustration of a fully welded side seam of PVA film using an ultrasonic welding technique.

In a fourth method, a side seal can be fabricated using a mandrel and shoe set-up and ultrasonically fusing the material to form a side (seam) seal. A cut piece of PVA film is wrapped around the mandrel and held captive by the shoe. Sufficient film over-wrap is maintained for processing purposes, and a seal overlap of approximately 3 mm is targeted. The mandrel/shoe set-up is placed onto a speed-programmable slide, which is in turn mounted to a spring-loaded plate. The slide and plate are then placed under an ultrasonic welding horn, operating desirably between 20 kHz and 40 kHz. The force that the plate exerts between the horn and the PVA film on the mandrel (desirably 3-10 $lb_f$, alternatively 4-7 $lb_f$, or alternatively 5-6 $lb_f$) is adjustable by using springs with different spring constants. The quality of the welded seam is dependent upon the speed of the slide, the pressure of the film against the horn, the amplitude of the welder, and the moisture content/temperature of the film during the welding process. Moisture content at 21 C is desirably 1-25%, alternatively 3-10%, and alternatively still 5-7%. When welding is complete, the final tube should be a continuously sealed cylinder substantially devoid of porosity (in excess of that of the base film material) caused by either insufficient or excessive heating derived from ultrasonic welding (FIG. 24). The excess over-lap may be trimmed away from the cylindrical tube.

In order to create a sealed separator tube or bag, at least a portion of an end of the fully side-sealed cylinder should be sealed. Using an impulse heat-sealing apparatus (Fuji FS-315), at least a portion of an end of the cylinder is sealed in a line substantially perpendicular to that of the side seal (FIG. 25). The sealed end can then be folded and formed into a cylindrical shape via multiple methods such that the internal bag volume is maximized and the tube is given the shape of the bottom of the can into which it is subsequently inserted (FIG. 26). Any other suitable end sealing method including ultrasonics, adhesive sealing or the like may be employed as described so long as anode-fouling soluble species are effectively limited from migrating to the anode.

The creation of a sealed tube substantially free of leaks is desirable to provide a suitably operable cell. A qualitative test is used to determine seal quality in the following manner. A hollow tube with an outer diameter (OD) that is undersized from the PVA bag inner diameter (ID) by about 0.005" is connected to a gas supply (preferably Argon or Nitrogen). A PVA bag, which is significantly taller than the height required for the cylindrical cell, is inserted onto the hollow tube so that the total height of the bag to be installed in the cell is still below the bottom of hollow tube. An elastomeric O-ring is then placed over the PVA bag in such a manner as to seal the bag against the hollow tube. A gas pressure of 2-3 psig is supplied to the tube, and sufficient time is allowed for the bag to fill with gas and reach an ultimate pressure of 2-3 psig. Once the bag is inflated (without any dimensional deformation to the PVA bag) it is inserted into a bath of Ethanol (95.2%, Fisher Scientific, located in Pittsburgh, Pa.) and the presence of gas bubbling through the ethanol is indicative of a leak in the sealed bag and will render the bag unusable.

Finally, diffusion of anode-fouling soluble species may be effectively limited when a suitable separator is configured as described herein. Simple experiments can be performed to screen various sample materials directly in button cells or other test vehicles and monitor the open circuit voltage (OCV) over time. A decay in OCV is an indicator of a change in the surface of one of the electrodes, most likely the result of migration of an anode-fouling soluble species, since all other components in the cell are known to typically not cause OCV decay. For more quantitative separator material screening and selection as well as to evaluate improvements and/or modifications made to a particular material, an "out-of-cell" test (such as the Exclusion Test described herein) in a specially designed fixture is more desirable. The Exclusion Test was performed as follows to determine suitability of separator materials or to determine the efficacy of a seal.

A glass tube was provided having a first end (Side A) and a second end (Side B) divided by two L-shaped O-ring seal joints with an o-ring size of –112 (Ace Glass, located in Vineland, N.J.). The separator or sealed seam of the separator sample was placed in the center of the tube, between the O-ring seal joints. Side A of the glass tube was filled with 10 mL of 34 wt. % KOH containing a mixture of 0.25 g CuO and 0.25 g of CuS. This ensured that there was a constant supply of soluble copper and sulfur species in the bulk solution substantially close to the equilibrium concentration under those conditions for the duration of the experiment. Side B was filled with 10 mL of 34 wt. % of KOH substantially free of CuO, CuS, or a mixture of CuO and CuS. The use of CuO and CuS particles was selected over the use of a known concentration of the soluble copper and sulfur species in side A because it also more closely mimics the conditions prevailing in a battery containing the solid cathode materials in electrolyte. For silver exclusion experiments, 0.25 g of AgO was utilized in Side A. The difference between the concentrations of the species on side A vs. side B provided an Exclusion Value, which is a measure of the ability of the separator to effectively limit migration of anode-fouling soluble species through the separator. When starting with undissolved materials like CuO or CuS powders placed in KOH in side A of the glass tube, the experiment will also indicate the solubility of the soluble species from the undissolved materials. A high concentration of KOH (e.g. 34 wt. %) is desirable, to ensure rapid and significant solubility of the anode-fouling soluble species. The above-described experiment was performed at 60° C. for 5 days.

When an alkaline battery discharges, the cathode reaction consumes water and generates $OH^-$ ions, while the anode consumes $OH^-$ and generates water. It is therefore necessary to have sufficient water available within the pores of the cathode for the immediate needs of the reaction at the cathode. A fresh anode generally has adequate electrolyte to support the anode and cathode discharge reactions since the zinc particles are suspended in a gel. As the reaction progresses, particularly under continuous high drain conditions, concentration gradients in the anode and cathode contribute to cell polarization, resulting in a decreasing voltage. To compensate for the accumulation of $OH^-$ ions in the cathode and of water in the anode, rapid mass transport between the two electrodes is critical in order to decrease the cell polarization and thereby keep the operating voltage from decaying too rapidly. Since the wet separator represents the interface between the two electrodes, it is advantageous under such conditions to use separator materials that have the ability to rapidly and preferentially transport water or $OH^-$ ions such that the concentration gradients do not become too high. Since it is a relatively dry mass, water transport to the cathode to keep the $OH^-$ concentration from becoming too high, is highly desirable. The opposite is true in the anode, where too rapid a dilution of the electrolyte is undesirable since it can cause premature passivation of the Zinc anode leading to premature failure.

Transport of a solvent through a membrane from a region of low concentration of a salt to a region of high concentration is termed Osmosis. Film separators such as cellophane, polyvinyl alcohol, ethyl vinyl alcohol, etc. show a strong osmotic behavior. The films transport water preferentially over $OH^-$ when there is a concentration gradient across them. This property of such films has been put to use in batteries by using such films as separators, where, during high rate constant current discharge, the separator film is able to selectively and rapidly transport water from the anode compartment to the cathode compartment to reduce the polarization that normally occurs. This keeps the anode electrolyte concentration high and the cathode electrolyte concentration low enough to provide a higher than normal operating voltage. As a result, a high rate device would run longer with a battery using such a separator.

Figure 27:
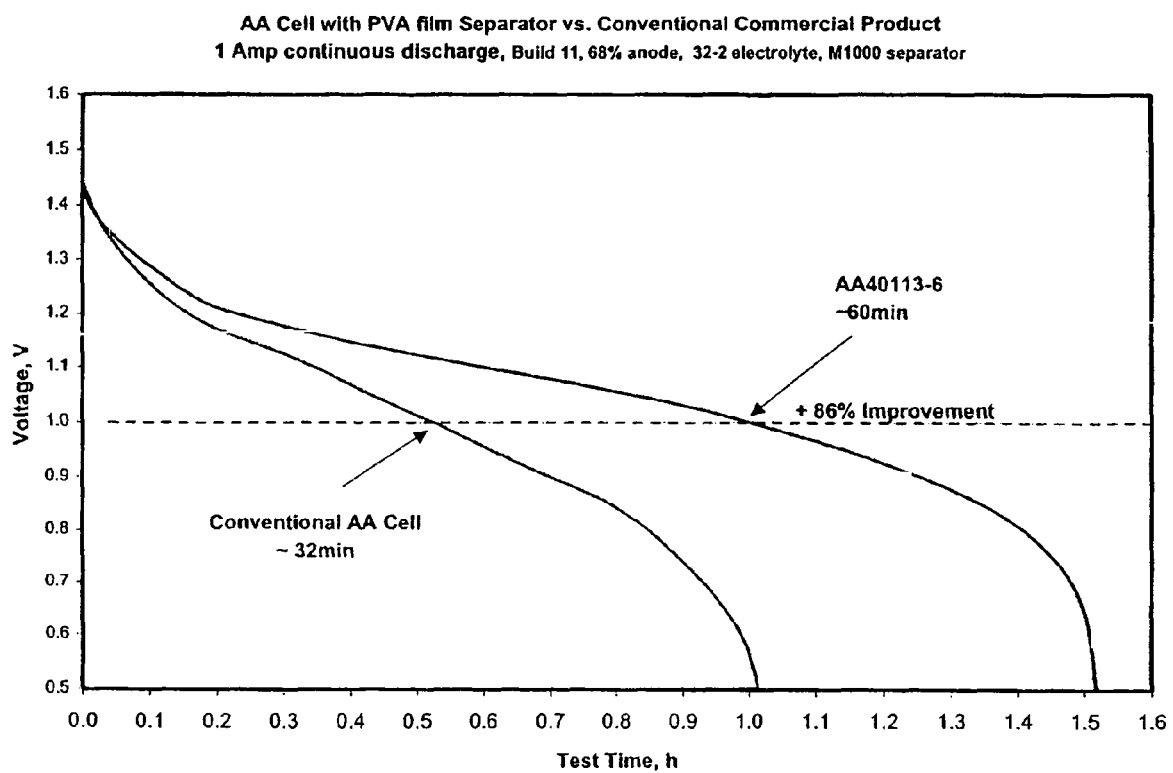
FIG. 27 is a graph plotting the voltage profile of a size AA cell using a separator constructed in accordance with one aspect of the present invention compared to a size AA cell including a traditional non-woven fabric separator.

FIG. 27 compares a AA alkaline battery with PVA film separator to a conventional AA alkaline battery using a non-woven separator on a 1 Amp continuous discharge test. It can be seen that the voltage of the battery with the PVA film separator remains significantly higher than the comparative conventional cell, providing more than 45 minutes, alternatively 50 minutes of discharge to the 1V limit vs. only about 32 minutes. This represents >80% improvement in performance. It is to be noted that the best commercially available AA primary alkaline batteries deliver about 40 minutes on the 1 Ampere continuous discharge test.

Another benefit of using such film separators is that the volume occupied by the separator becomes significantly reduced over conventional designs using several layers of non-woven materials. This increased internal volume is available for active materials and electrolyte, further enhancing battery service life particularly at the low and intermediate discharge drains where the amount of active material dictates the service life of the battery. While there are particular benefits to the use of film separators of the type disclosed here, these materials may also be used in combination with a layer or more of a non-woven or micro-porous material which may impart other desirable properties to the system, like for example, rapid electrolyte absorption during high speed manufacture, etc.

Still another potential benefit is that a film such as PVA softens and swells upon absorption of electrolyte, thereby conforming to the surface of the cathode and providing an intimate anode/cathode interface, which is beneficial to high rate performance.

It is to be noted that the use of such films possessing desirable water transport properties is not limited to electrochemical cells where anode fouling soluble species are generated at the cathode. The preferential water transport properties are beneficial to a wide range of electrochemical systems like Fuel Cells and conventional alkaline $Zn/MnO_2$ batteries. When utilizing such films in a conventional alkaline battery such as $Zn/MnO_2$, it is not necessary to completely seal the seam and bottom as is necessary in situations where anode-fouling species are present. Hence in these instances, it is not necessary to configure the separator such that all fluid communication occurs only through the separator material. As long as internal shorting between the anode and cathode can be prevented by other means involving a careful design of the battery, such film materials may be used without a seam seal and a bottom seal and still leverage the preferential water transport properties.

The thicknesses of the films described here typically ranged from about 25 microns (micrometer) to about 40 microns. However, a wider range of thicknesses may be used depending on the characteristics desired and the properties of the films. For example, since PVA is more resistive than cellophane, in a conventional alkaline battery with an $MnO_2$ cathode, it may be desirable to use as thin a layer of PVA as practically possible for high speed manufacture of the film as well as the battery. In some circumstances it may be necessary to combine a film with another material (for example, a non-woven layer) to facilitate handling and cell assembly, etc. Another option may be to incorporate agents in or on the film, such as Laponite™ that can help to decrease the resistivity of the film, thereby allowing thicker films to be utilized. Agents such as polyacrylic acid or acrylates may be incorporated to modify properties such as water or electrolyte absorption. As such, films ranging in thickness from about 10 microns to about 150 microns may be used.

A. Button Cell Tests:

A 357 size button cell is provided including the separator to be tested. The cathode includes 92% active material, 5% graphite, 2.5% electrolyte, and 0.5% polyethylene binder. The anode includes 68% sieved zinc with 31.25% 34-2 electrolyte and 0.75% of a combination of gelling agents and corrosion inhibitors. The cell was stored in an oven at a temperature of 60 C. Cell open circuit voltage (OCV), impedance, and cell expansion was monitored. Cell impedance was measured using a frequency response analyzer (e.g. Model 12 from Schlumberger Inc.). Reduction in OCV implies the potential of one or both electrodes is deteriorating from its thermodynamic value, and indicates that anode-fouling soluble species are migrating through the separator. Increase in cell impedance implies increase in the resistance between the two electrodes, which may also be caused by blocking of the separator or passivation of the Zinc anode surface by the diffusing or migrating anode-fouling species. Cell expansion is a sign of internal pressure build-up from gas generation, which is also an expected result if copper ions migrate through the separator and come in contact with the zinc anode. Expansion can be measured by monitoring the external height increase over time, of the assembled cell. Hence monitoring these characteristics is very instructional in understanding and valuating the efficacy of a particular separator material or its seal quality, or to screen several candidate materials or combinations.

B. Exclusion Test:

A more quantitative method involves a direct measure of the concentration of the anode-fouling species on either side of the separator in question. The set up is stored at 60° C. in an oven for 5 days with the top of the glass tube sealed to limit electrolyte evaporation. The electrolyte on both sides is then analyzed for the specific ion concentrations as described herein.

When specific ion concentration on side B is less than the concentration on side A, the separator or seal is deemed effective in limiting the migration of anode-fouling soluble species. The results in Table 5 indicates the results of the exclusion test, as described in more detail herein.

Soluble Cu species were analyzed in KOH using standard inductively coupled plasma (ICP) analytical techniques utilizing a Thermo Iris Intrepid II (radial unit) supplied by Thermo Electron Corporation (Waltham, Mass.). Typically, samples were prepared using 1 g of electrolyte sample diluted to 50 ml with 10% nitric acid solution prior to analysis. Calibration curves consisted of three solutions: blank, 0.5 ppm, and 1 ppm where all solutions were 10% nitric acid. Copper is calibrated using a 1000 ppm Spex standard. Measurements for copper were made using the average of four wavelengths (223.0, 224.7, 324.7, 327.3). A Scandium internal standard was used in each sample and standard (20 ppm) measured.

Soluble sulfur species were analyzed in KOH using standard inductively coupled plasma (ICP) analytical techniques utilizing a Thermo Iris Intrepid II (radial unit) supplied by Thermo Electron Corporation (Waltham, Mass.). Typically, samples were prepared using 1 g of electrolyte sample diluted to 50 ml with 10% nitric acid solution. Normally an additional 5:50 or 10:50 dilution was made, which was measured by volume to provide suitable results in this technique. Calibration curves consisted of three solutions: blank, 0.5 ppm, and 1 ppm where all solutions were 10% nitric acid. Sulfur was calibrated using standards prepared from Spex $SO_4$ ($K_2SO_4$ starting source) standard. Measurements for sulfur were made using the average of two wavelengths (180.7, 182.0). A Scandium internal standard was used in each sample and standard (20 ppm) measured.

It is also noted that plasticizers or processing aids used in manufacture of films such as polyvinyl alcohol can adversely affect the ability of the film to effectively limit the migration of anode-fouling soluble species when used as a separator in a cell, and, as such, films prepared with substantial quantities of one or more plasticizers are disfavored. It is desirable that a film separator for use in accordance with the invention contain less than about 15% plasticizers by weight, alternatively, contain less than about 10% or less than about 5% plasticizers by weight. Particularly suitable film separators contain about 3% plasticizers by weight or less.

One possible separator is non cold-water soluble, non-crosslinked polyvinyl alcohol film separator comprising less than about 3% plasticizers by weight. Two such suitable polyvinyl alcohol films are M-1000 and M-2000 (Monosol). As appreciated by one skilled in the art, the film separator can be formed as an ex-situ film, and subsequently installed into the cell, in accordance with one aspect of the invention.

Although a separator of the invention can be provided as described, the separator can optionally be coupled with (e.g., laminated or tacked to) a conventional non-woven fabric layer in an otherwise conventional manner.

The following Examples describe various embodiments of the present invention. Other embodiments within the scope of the appended claims will be apparent to a skilled artisan considering the specification or practice of the invention as described herein. It is intended that the specification, together with the Examples, be considered exemplary only, with the scope and spirit of the invention being indicated by the claims, which follow the Examples.

EXAMPLES

Example 1

This is an example that illustrates the efficacy of various separators' ability to effectively limit the migration of anode-fouling soluble species. The OCV was compared for a plurality of 357 cells made with various separators both initially and after 1 day room temperature of storage. The cathode was CuO (commercially available from Aldrich), and the cell anode was a conventional alkaline Zn gel anode having conventional zinc and electrolyte concentrations.

In most cases, two layers of separator were used in the cell, one facing the cathode ("cathode side separator"), the other facing the anode ("anode side separator"). The OCV data presented below in Table 4 includes the average of two cells of the given cell type. It should be appreciated that a decrease in OCV indicates increased migration of anode-fouling soluble copper species into the anode.

TABLE 4

| Cathode Side Separator | | Anode Side Separator | OCV, V (initial) | OCV, V (after 1 day) |
|---|---|---|---|---|
| Category | Type | | | |
| Cellophane | 350P00 | FS2213 | 1.115 | 1.098 |
| | SC-216 | F3T23 | 1.116 | 1.095 |
| | SC-216 | SC-216 | 1.299 | 1.163 |
| | SC216 | None | 1.115 | 1.101 |
| | SF-586 | F3T23 | 1.107 | 1.018 |
| | SF-586 | None | 1.250 | 1.169 |
| FAS Micro-porous membranes | A | F3T23 | 1.118 | 1.096 |
| | B | F3T23 | 1.116 | 1.108 |
| | C | F3T23 | 1.116 | 1.107 |
| | D | F3T23 | 1.130 | 1.091 |
| | E | None | 1.268 | 1.138 |
| Micro-porous membranes | F | F3T23 | 1.088 | 0.554 |
| | G | F3T23 | 1.095 | 0.736 |
| | Celgard 3407 | F3T23 | 1.118 | 0.856 |

Note:
350P00: commercially available from UCB Film Inc. UK.
SC-216 and SF-586: commercially available from Viskase Corporation, IL
FAS micro-porous membrane samples provided by Advanced Membrane System, MA.
Sample F is provided by W.L.Gore.& Associates, INC., MD.
Sample G is provided by Aporous, MA
Celgard 3407: commercially available from Hoechst Celanese Corporation, NC.
FS2213: commercially available from Freudenberg, Germany
F3T23: commercially available from Kuraray Co. LTD., Osaka, Japan As shown in Table 4, based on the deterioration in OCV, it is seen that the cellophane and the TiO$_2$ filled HMWPE (high molecular weight polyethylene) membranes outperform the microporous-type membranes (e.g. Celgard 3407 PE, B10ab Nylon and Excellerator Alkaline PTFE, etc), indicating that they are more effective in limiting migration of anode-fouling copper species.

Example 2

This is an example that illustrates the ability of various separators to effectively limit the migration of anode-fouling species. As explained elsewhere, Side A of the glass tube fixture was filled with 34% KOH having a known concentration of copper ions and electrolyte free of copper ions was added to compartment B. The concentration of complex copper ions on side B was measured after 1 week at room temperature.

Referring now to Table 5, the Exclusion Test was performed on various separators to determine the Exclusion Value of soluble copper, silver, and sulfur species after storage at a temperature of 60 C. Side A of the glass fixture was filled with 34% KOH solution with 0.25 g of CuO (copper oxide) and 0.25 g of CuS powder which produce the soluble copper and sulfur species concentrations shown in columns 2 and 4. For silver exclusion determination, 0.25 g of AgO was used in side A of the AgO was used in side A of the fixture to produce silver concentrations shown in column 6. The summary results are displayed below in Table 5.

TABLE 5

Exclusion Test results for soluble copper, silver, and sulfur species after 54 days at 60° C.

| Separator Film (1-ply unless noted) | Side A Copper ion (ppm) | Side B Copper ion (ppm) | Side A Sulfur (ppm) | Side B Sulfur (ppm) | Side A Silver (ppm) | Side B Silver (ppm) | Exclusion Value of Cu (%) | Exclusion Value of S (%) | Exclusion Value of Ag (%) |
|---|---|---|---|---|---|---|---|---|---|
| SC-216 (Viskase) | 166 | 47 | 358 | 192 | 31 | <1 | 72 | 46 | >97 |
| SC-216, 2-ply (Viskase) | 129 | 22 | 410 | 100 | — | — | 83 | 76 | — |
| SF-586 1-ply | 157 | 58 | — | — | — | — | 63.0 | — | — |
| Hybrid #33 | 123 | 86 | 277 | 174 | — | — | 30 | 37 | — |
| Hybrid #33/SC216/ Hyb #33 | 115 | 34 | 313 | 156 | — | — | 70 | 50 | — |
| In-house PVA (film #3)* | 115 | 22 | 362 | 38 | — | — | 81 | 90 | — |
| Monosol PVA M1030 | 136 | 69 | 321 | 162 | — | — | 49 | 50 | — |
| Monosol PVA M1000 | 133 | 18 | 377 | 83 | 32 | <1 | 87 | 78 | >97 |
| Monosol PVA M2000 | 136 | 23 | 348 | 61 | 33 | <1 | 83 | 83 | >97 |

Conditions:
10 mL 34% KOH each side of film, Copper from 0.25 g CuO, Sulfur from 0.25 g CuS, Silver from 0.25 g AgO, 5 days at 60° C. storage
*PVA film cast from 10.6% PVA solution (Celvol 350)

The results of Table 5 above illustrate that multiple layers of a separator are more effective than a single layer of the same separator material in limiting the migration of soluble copper and sulfur species at 60C. The results also indicate suitability of PVA films in excluding soluble copper, silver, and sulfur species.

Example 3

Figure 28:
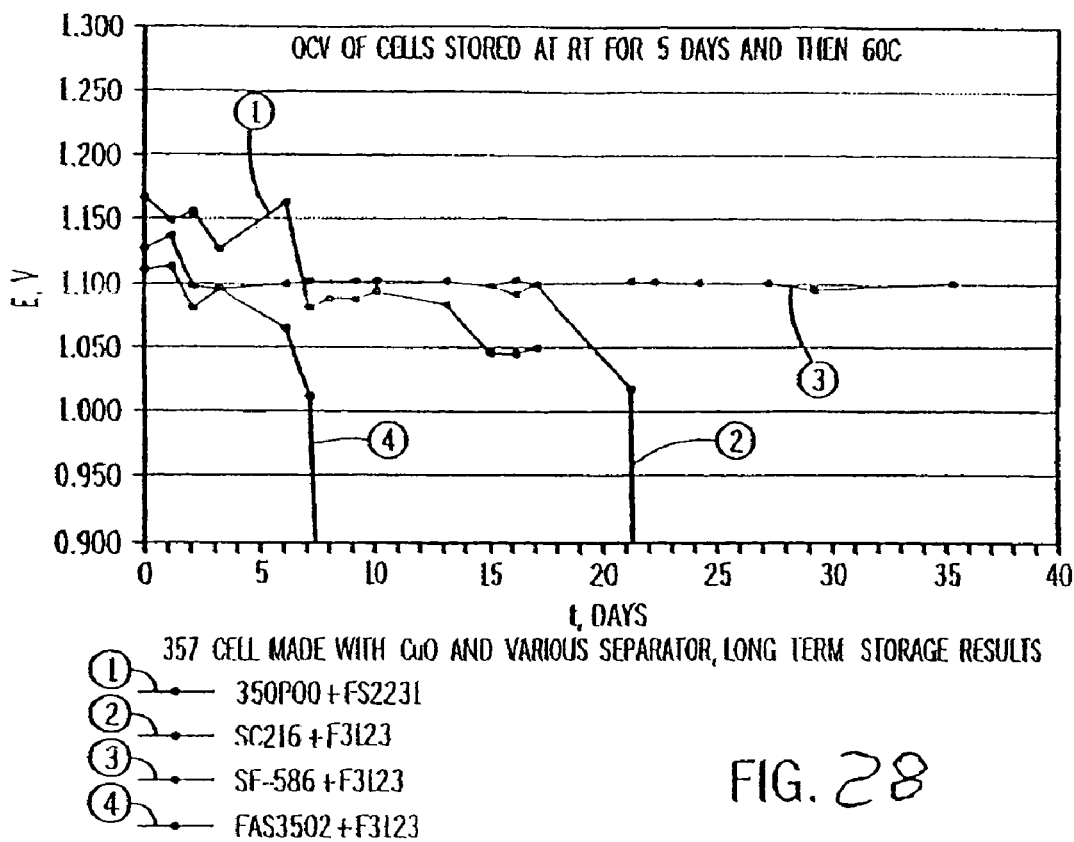
FIG. 28 is a graph plotting the open circuit voltage for a plurality of cells having CuO cathodes and varying separators.

This is an example that illustrates the utility of effectively limiting the migration of anode-fouling soluble species in stored 357 size button cells. Referring now to FIG. 28, four cells having CuO cathodes were stored for five days at room temperature, followed by 60 degrees C. until the cells failed (as determined by OCV, impedance and expansion as discussed previously). The OCV was continuously measured for each cell from the first day of storage. FIG. 28 shows that cellophane separators are better than FAS 350Z separator for cells containing CuO cathodes. Also, thicker cellophane separators (SF-586, 3 mil thick) outperform the thinner separator (350P00, and SC216 both are 1 mil thick) confirming results from the Exclusion Test experiments.

Example 4

Figure 29:
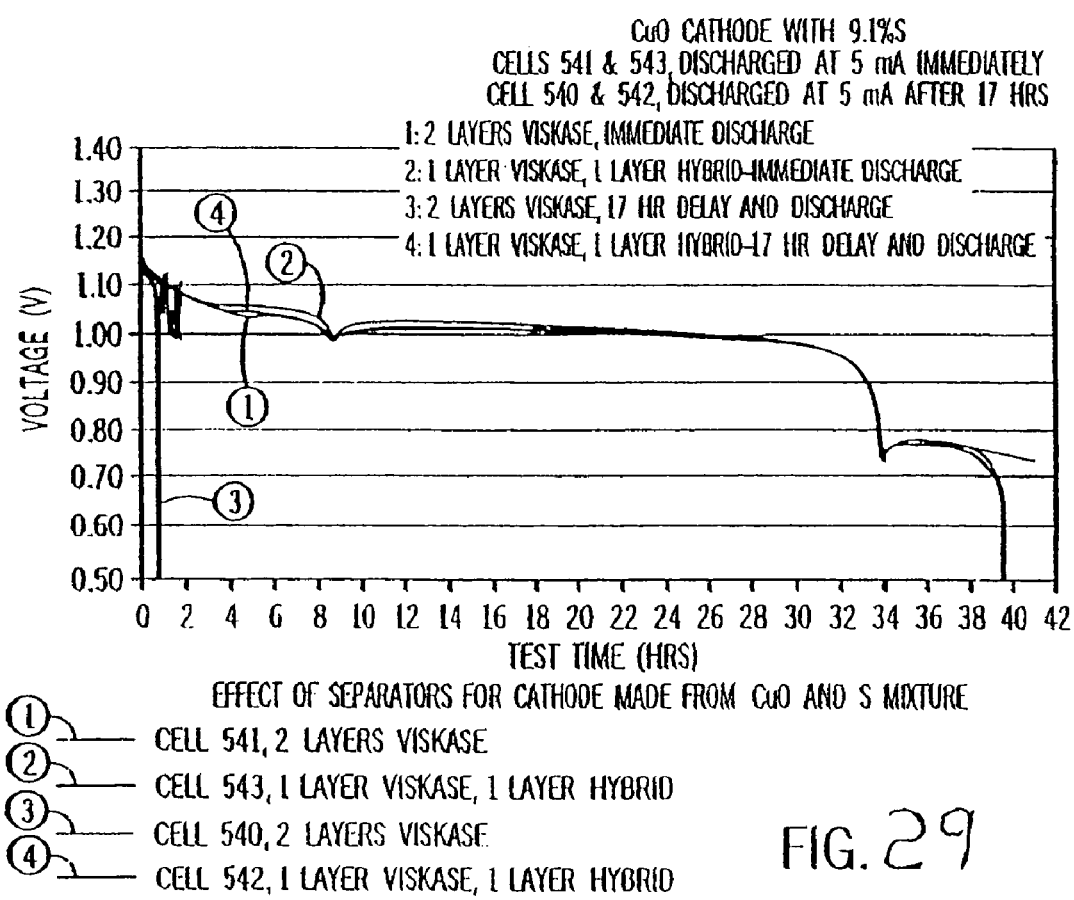
FIG. 29 is a graph plotting the discharge profile of cells having CuO/CuS cathodes and various separators and combinations.

This is an example that illustrates the utility of a cell made from materials of the herein described invention. Referring now to FIG. 29, two pairs of cells were provided. Each pair of cells included 1) one cell whose separator contained a layer Viskase Cellophane (SC-216) in combination with a layer of a hybrid separator comprising cross-linked PVA on a F3T23 nonwoven fabric; and 2) a second cell whose separator comprised two layers of Viskase Cellophane. The first pair of cells (cells 541 and 543) were discharged at 5 mA immediately after cell fabrication. The second pair of cells (cells 540 and 542) were discharged at 5 mA after 17 hours.

FIG. 29 shows that the cell built with 2 layers of Viskase Cellophane separator (SC-216) discharges to full capacity if it is discharged immediately, but has a very short capacity if it is discharged after 17 hrs rest. The cell built with 1 layer of Viskase cellophane separator and 1 layer of hybrid (cross linked PVA coating on F3T23) separator discharged to full capacity even after 17 hr rest. One skilled in the art will readily appreciate that although a separator material may demonstrate an adequate Exclusion Value, the seal in a battery such as a button cell may affect its ability to effectively limit the migration of anode-fouling soluble species.

Example 4 thus shows that a combination of cellophane and hybrid separator is more effective in limiting the migration of soluble copper and sulfur species than 2 layers of SC 216 cellophane.

It should be appreciated that the hybrid separator layer used above was fabricated by cross-linking a 2% PVA in water solution with a 5% sodium borate solution on the surface of a F3T23 non-woven separator. The PVA loading in the hybrid separator was approximately 10 g/m$^2$, and it had an air permeability in the dry state of 1800 Gurley seconds. The hybrid layer was placed on the anode gel side of the separator structure. The air permeability was determined using a Gurley Precision Instrument Tester described above.

Example 5

Figure 30:
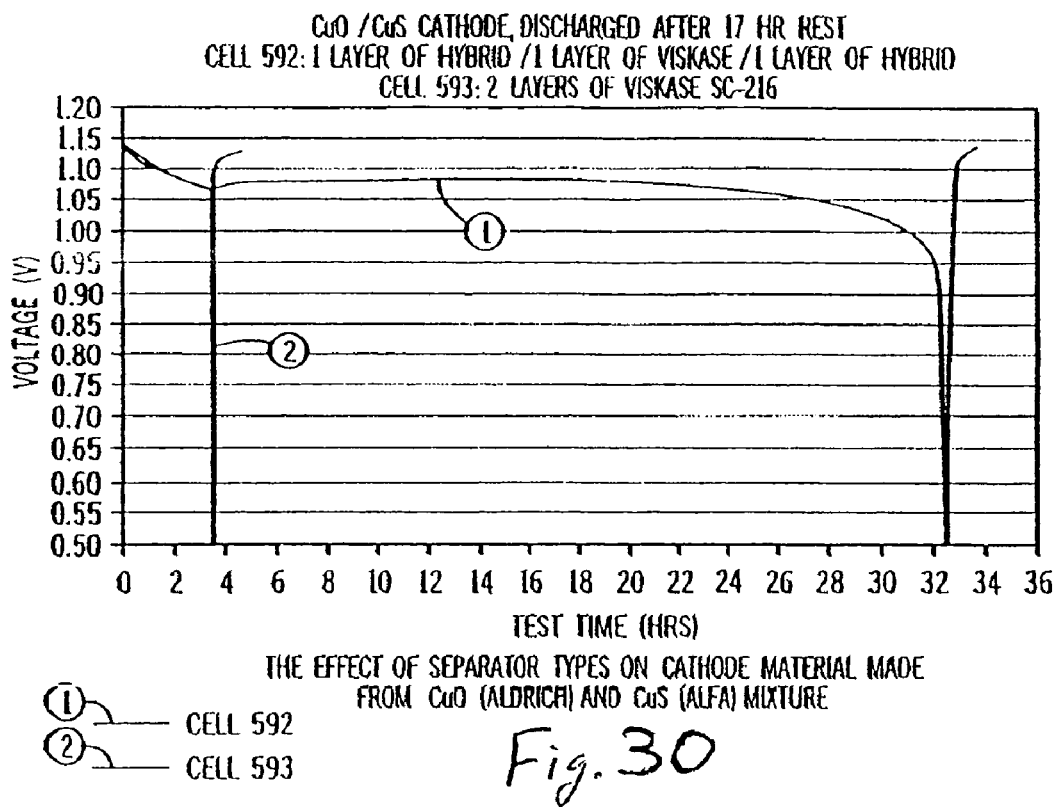
FIG. 30 is a graph plotting the discharge profile of a pair of cells having CuO/CuS cathodes and varying separators.

This is an example that illustrates the utility of a cell made using separators and cathode materials of various aspects of the present invention. Referring now to FIG. 30, a pair of electrochemical cells was provided having a cathode that included CuO and CuS. The cells were discharged after 17 hours of rest. The first cell had a separator comprising a layer of Viskase Cellophane disposed between two layers of hybrid separator. The hybrid layers therefore faced outwardly, that is towards the anode, and towards the cathode. FIG. 30 shows, similar to FIG. 29, that for mixtures of CuO and CuS, a combination of cellophane separator and hybrid separator (cross linked PVA coating on F3T23) is more effective than 2 layers of cellophane alone.

Example 6

Figure 31:
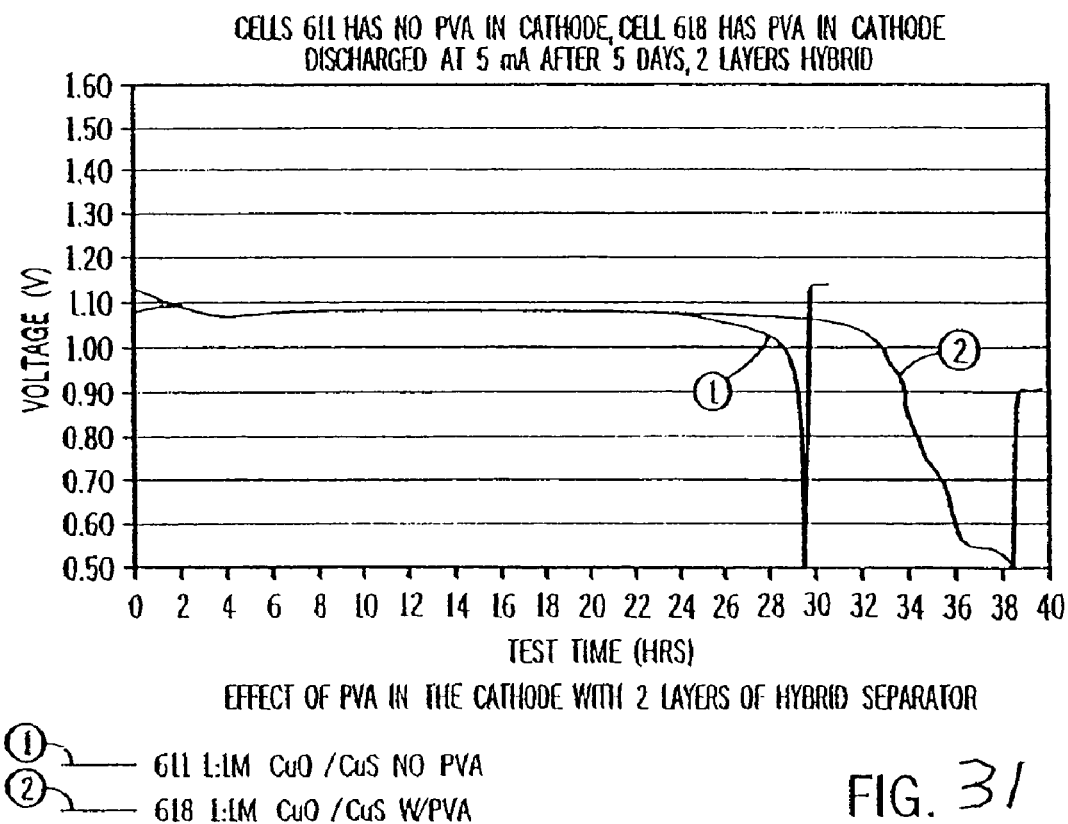
FIG. 31 is a graph plotting the discharge profile of a pair of cells having CuO/CuS cathodes to illustrate the effect of including PVA in the cathode.

This is an example that illustrates the utility of a cell made to represent an aspect of the present invention. Referring to FIG. 31, a pair of cells was discharged at 5 mA after 5 days. Each cell contained a cathode comprising CuO and CuS with 2 layers of hybrid separator (cross linked PVA coated on F3T23). One of the cells contained PVA binder in the cathode, while the other cell did not. FIG. 31 shows that with a cathode comprising a CuO/CuS mixture, 2 layers of hybrid separator are effective in limiting migration of anode-fouling soluble copper and sulfur species even after 5 days, thereby allowing the cell to discharge to full capacity. Furthermore, adding 0.2 wt % PVA to the cathode is shown to extend cell discharge capacity by enabling better utilization of the cathode capacity.

Example 7

Figure 32:
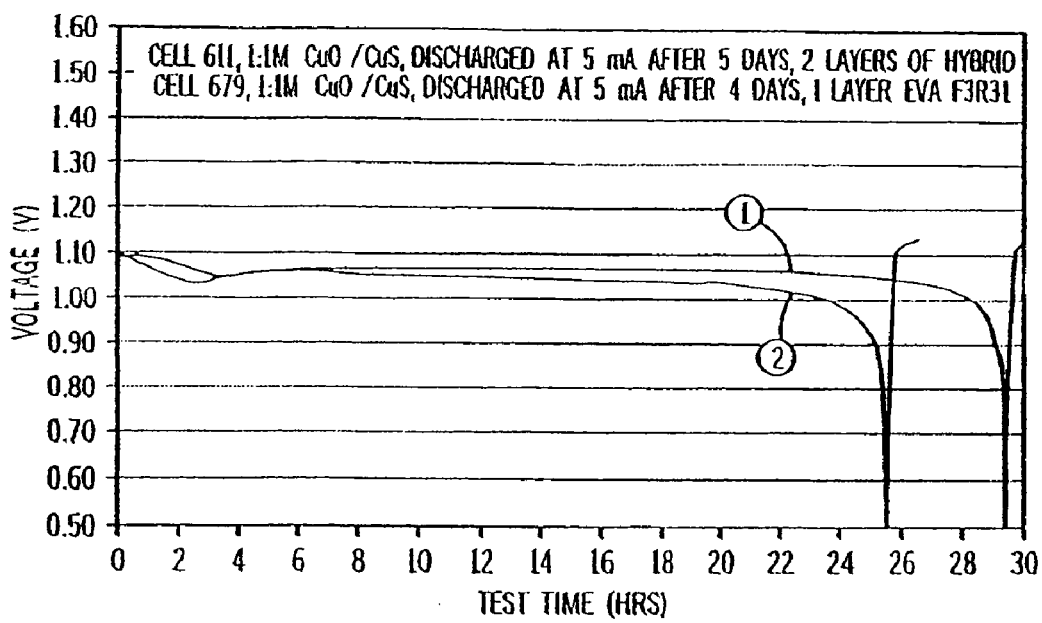
FIG. 32 is a graph plotting the discharge profile of a pair of cells having CuO/CuS cathodes and varying separators.

This is an example that illustrates the utility of the separator and cathode materials described herein. Referring now to FIG. 32, a pair of size 357 button cells were provided. The cathodes were made with a 1-to-1 molar ratio of CuO and CuS mixture. The first cell had a separator comprising a pair of hybrid layers (cross linked PVA coated onto F3T23). The other cell had one layer of EVA emulsion coated onto F3R23 (commercially available from Kuraray). The first cell was discharged at 5 mA after 5 days. The second cell was discharged at 5 mA after 4 days. FIG. 32 shows that the cross-linked PVA coated onto F3T23 outperformed the EVA-coated F3R23, even after an additional day before testing. It also shows that the EVA-coated F3R23 separator does not show the performance deficiency previously noted with 2 layers of SC 216 cellophane (Example 6)

Example 8

Figure 33:
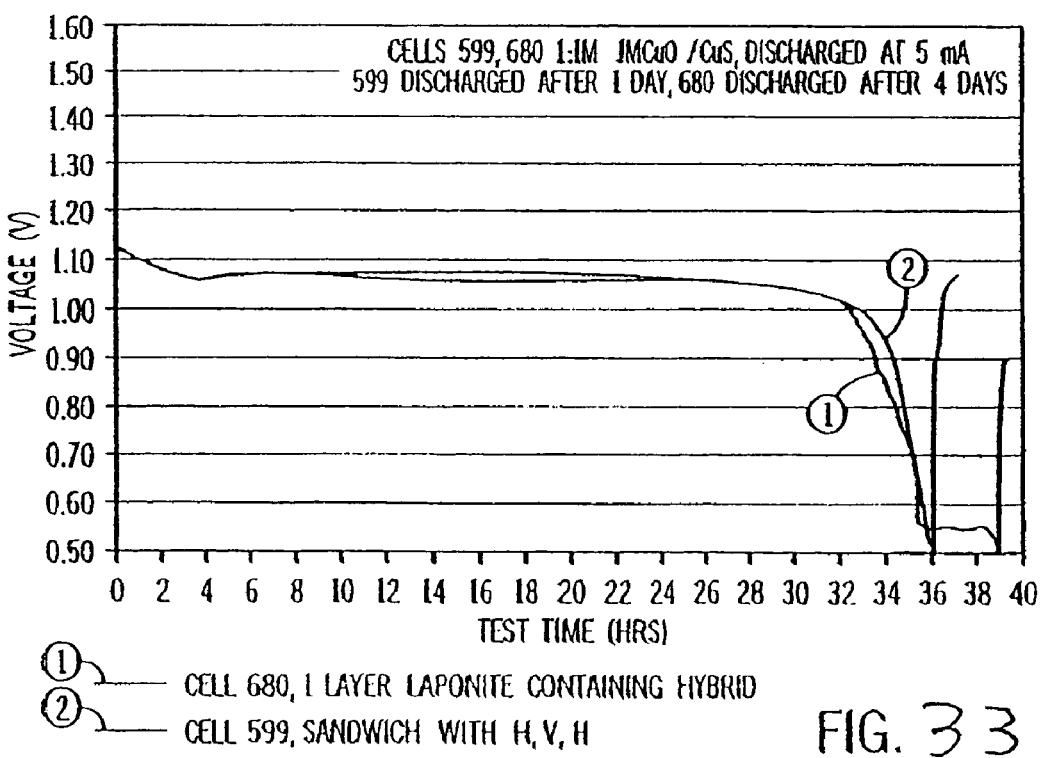
FIG. 33 is a graph plotting the discharge profile of a pair of cells having CuO/CuS cathodes and varying separators.

This is an example that illustrates the effectiveness of limiting the migration of anode-fouling species in a cell made according to various aspects of the present invention. Referring now to FIG. 33, a pair of cells was provided, each having a cathode containing a 1-to-1 molar mixture of CuO and CuS. The first cell had one layer of hybrid separator impregnated with Laponite. The second cell had a layer of Viskase cellophane sandwiched between two layers of hybrid (cross-linked PVA coated onto F3T23). The first cell was discharged at 5 mA after four days. The second cell was discharged at 5 mA after one day. FIG. 33 shows that both separators were effective in limiting the migration of soluble sulfur and copper species into the anode.

Example 9

This example illustrates the effect of using an additive such as ZnO in the cathode to reduce the ability of the copper and sulfur species to foul the anode. Two 357 size button cells were constructed in a similar manner with the exception that the cathode of one button cell contained 2% ZnO blended with the cathode. The cathode mix was produced from a 1:1M ratio of jet-milled CuO and as received CuS dry blended with KS4 graphite and ZnO additive such that the cathode composition was 95% actives, 3% graphite and 2% ZnO. The cathode composition for the cell without the ZnO additive was 95% actives and 5% KS4 graphite. The anode consisted of a 68% sieved BIP anode and the separator was a single ply of M 2000 PVA film. Both cells were discharged after a 7 day period of ambient storage. Both cells were exposed to an intermittent test regime involving a 12.5 mA current for 1 hour followed by open circuit rest, repeated 4 times per day. The results, shown in the Table 6 below demonstrate that the cell with 2% ZnO delivered 240 mA/g discharge capacity as compared to only 100 mAh/gm for the control cell with no ZnO. The results demonstrate the beneficial aspects of added ZnO on battery shelf life.

TABLE 6

| Cathode | Cell Discharge Capacity to 0.7 V, mAh/g |
|---|---|
| 95% 1:1 M CuO/CuS + 5% KS4 | 100 |
| 95% 1:1 M CuO/CuS, 3% KS4, 2% ZnO | 240 |

Example 10

Figure 34:
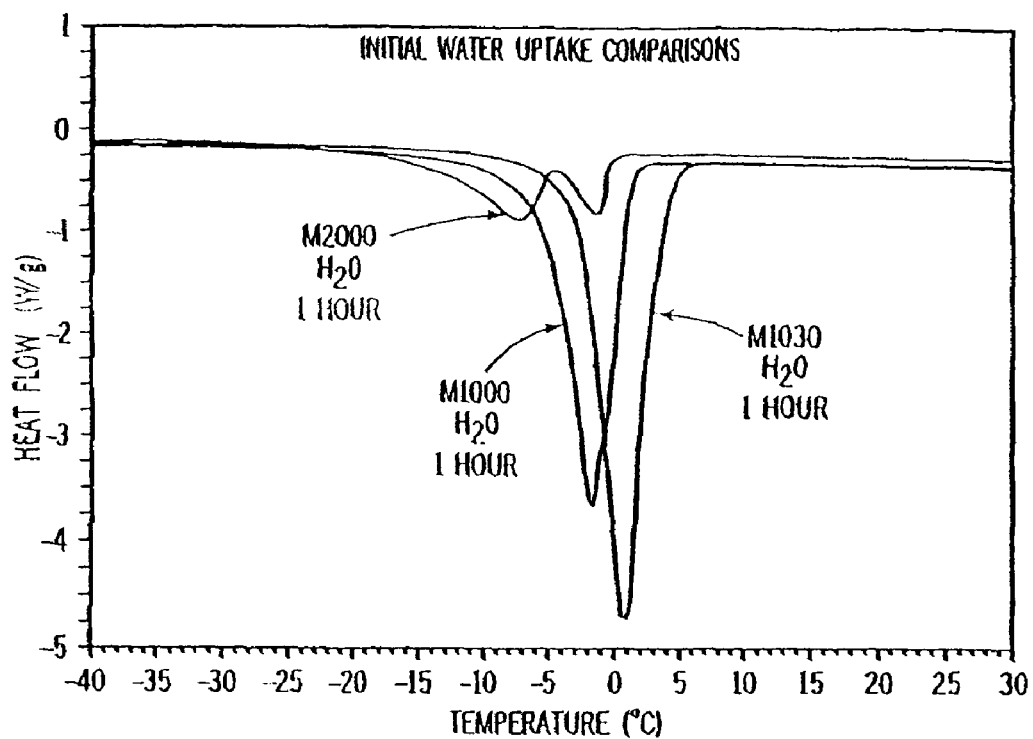
FIG. 34 is a graph comparing initial water uptake of various separator materials.

Referring to FIG. 34, this example illustrates the method used to identify the relative amounts of free and bound water in a separator sample. Samples of separator material having a diameter of 0.11" were prepared and preconditioned in dry atmospheric conditions (<1% relative humidity) for 24 hours. The samples were then soaked in deionized water for one hour, removed under an atmosphere of <1% relative humidity, and blotted with a Kimwipe. Also in an atmosphere of <1% relative humidity a sample pan was tared and the prepared sample was then inserted into the sample pan. The prepared sample was then weighed and the weight recorded. The sample lid was then crimped onto the pan. The sample container was immediately immersed in liquid nitrogen to freeze any water present in the sample. A differential scanning calorimeter (available from TA Instruments of New Castle, Del., Model Q100) was used to evaluate the sample. The system was programmed to ramp at 2° C. per minute and scan the temperature range from −80° C. to 50° C. The amount of bound water was determined by evaluating the heat flow curves generated and by determining the proportion of the curve that lies below −1° C. and the portion that lies above −1° C. When the melting curve for a material indicated a greater than 50% of the energy (J/g) of melting to be below −1° C. then the material was determined to have more bound water than free water within the separator. Having more bound water than free water is an indication that a material is suitable to provide the attributes required for a separator to effectively limiting the migration of anode-fouling soluble species.

Example 11

Figure 35:
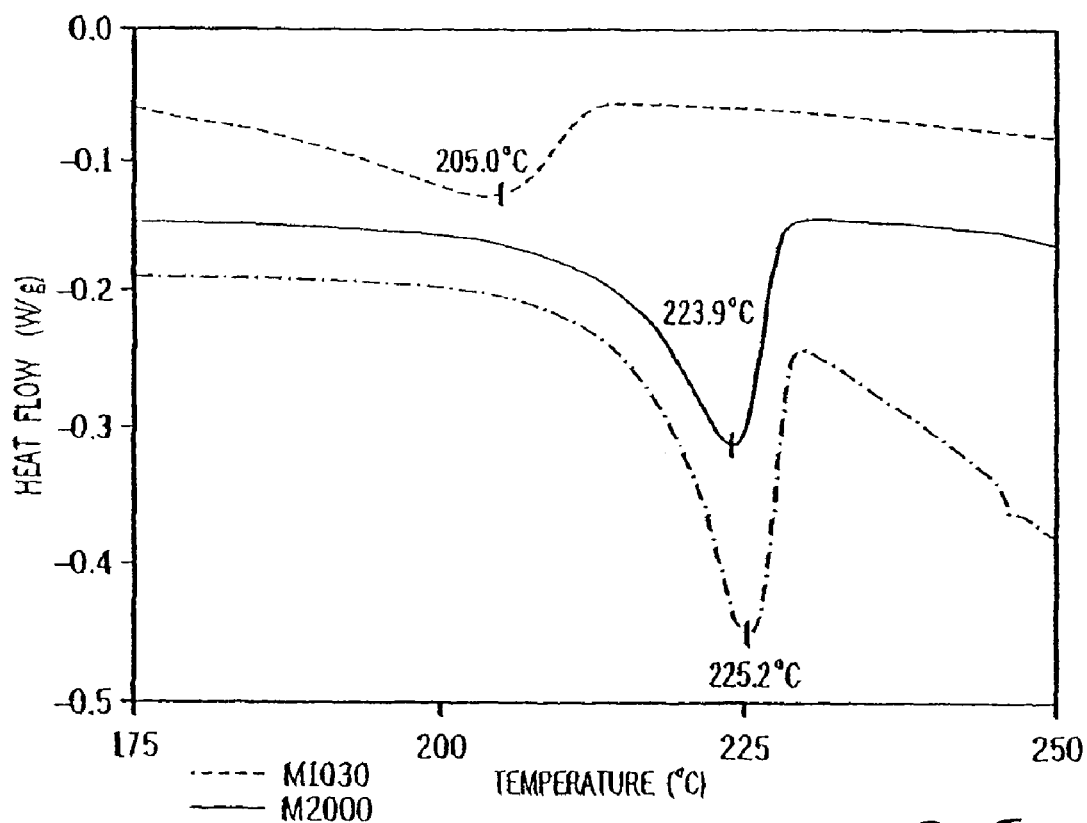
FIG. 35 is a graph illustrating the melting curves, and corresponding melting points, of various separator materials.

This is an example that illustrates the method used to identify the relative melting points of PVA separator samples. Samples of separator material having a diameter of 0.11" were prepared and preconditioned in 50% relative humidity atmospheric conditions for 24 hours. Also in an atmosphere of 50% relative humidity a sample pan was tared and the prepared sample was then inserted into the sample pan. The prepared sample was then weighed and the weight recorded. The sample lid was then crimped onto the pan. The sample container was inserted into a differential scanning calorimeter (available from TA Instruments of New Castle, Del., Model Q100) which was used to evaluate the sample. The system was programmed to ramp at 5° C. per minute and to scan the temperature range from 30° C. to 300° C. The melting point of the material was determined by the first significant peak in the heat flow curve (W/g) as will be understood by one skilled in the art (See FIG. 35). When the melting curve for a material indicated a melting point greater than 215° C. the PVA material was determined to be a suitable material for use in effectively limiting the migration of anode-fouling species as described herein.

Example 12

This is an example that illustrates the method used to identify the relative pH value of the electrolyte retained in a separator. Samples of separator materials were preconditioned in dry atmospheric conditions (<1% RH) for a minimum of 24 hours. Samples were weighed to the nearest 0.0001 g. Monosol M2000, M1000, and M1030 PVA film were soaked in 10 ml of 34-0 KOH for 24 hours at 23° C. After soaking, the films were dipped in methanol to remove surface KOH and water and rinsed with methylene chloride to remove residual solvent. The samples with absorbed KOH were then allowed to evaporate the residual methylene chloride by standing at 23° C. for 5 minutes and the weights were recorded to 0.0001 g. The film was then digested in 25 mL of deionized water at 70° C. until dissolved. The pH was recorded along with the temperature of the solution during measurement. The pH at 23° C. of retained electrolyte within each film was calculated using solution pH and temperature data using standard chemical calculation methods. Control samples were run using duplicates of the materials being tested but exposing them to only pH 7 de-ionized water solution. Variation from pH 7 was compensated (added or subtracted) from the corresponding sample to yield the normalized pH of the electrolyte retained within the sample separator. Table 7 shows that in separators that demonstrate adequate Exclusion Values, the pH values of the retained electrolyte in these separators are lower than the pH values in the bulk electrolyte.

TABLE 7

| Separator | pH Value of Retained Electrolyte | pH Value Difference vs. Bulk Electrolyte |
|---|---|---|
| M1000 | 13.7 | 1.8 |
| M2000 | 13.7 | 1.8 |

Standard 34-0 bulk electrolyte had a pH value of 15.5

In view of the above, it will be seen that the several advantages of the invention are achieved and other advantageous results attained. As various changes could be made in the above processes and composites without departing from the scope of the invention, it is intended that all matter contained in the above description and shown in the accompanying drawings shall be interpreted as illustrative and not in a limiting sense.

We claim:
1. An electrochemical cell comprising:
an anode;
a cathode comprising a cathode active material, the cathode active material comprising a mixture, the mixture comprising a first metal oxide component, a second metal oxide component and a third metal oxide component, wherein the first, second and third metal oxide components are different, and further wherein the first metal oxide component consists of a first metallic element and oxygen, the second metal oxide component consists of a second metallic element different from the first metallic element and oxygen, and the third metal oxide component is a compound comprising the first metallic element manganese and the second metallic element; and a separator disposed between the anode and the cathode wherein the cathode active material displays a continuous discharge profile that is substantially at least 1.0V for the first 20% of cell discharge when discharged at a discharge rate of 30 mA in a half-cell test.

2. The electrochemical cell as recited in claim 1, wherein the second element is copper.

3. The electrochemical cell as recited in claim 2, wherein the copper content is greater than about 0.5% by weight of the mixture.

4. The electrochemical cell as recited in claim 1, wherein the third metal oxide component further comprises a third metallic element.

5. The electrochemical cell as recited in claim 1, wherein the third metal oxide component is a compound identified by $M_xCu_yO_z$, and:

M is a metallic element Mn capable of producing mixed metal oxide compounds or complexes, and $x \leq 20$, $y \leq 20$, and $z \leq 100$.

6. The electrochemical cell as recited in claim 1, wherein the ratio of the first metal oxide component to the second metal oxide component is greater than about 1:100.

7. The electrochemical cell as recited in claim 6, wherein the ratio of the first metal oxide component to the second metal oxide component is greater than about 1:20.

8. The electrochemical cell as recited in claim 5, wherein $M_xCu_yO_z$ has the formula where x is substantially equal to 3−y and z=4.

9. The electrochemical cell as recited in claim 5, wherein $M_xCu_yO_z$ has the formula where x is substantially equal to 2−y and z=2.

10. The electrochemical cell as recited in claim 5, wherein $M_xCu_yO_z$ has a spinel type of crystal structure.

11. The electrochemical cell as recited in claim 5, wherein $M_xCu_yO_z$ has a tenorite type of crystal structure.

12. The electrochemical cell as recited in claim 5, wherein the third metal oxide component further comprises an additional metal A, the third component having the formula $A_wM_xCu_yO_z$, wherein $w \leq 20$.

13. The electrochemical cell as recited in claim 12, wherein the additional metal is selected from the group consisting of Li, Na, K, Rb, Cs, Ca, Mg, Sr, Ni and Ba.

14. The electrochemical cell as recited in claim 5, wherein the third metal oxide component is amorphous.

15. The electrochemical cell as recited in claim 5, wherein the third metal oxide component is at least partially crystalline.

16. The electrochemical cell as recited in claim 1, wherein the first metal oxide component consisting of a manganese oxide.

17. The electrochemical cell as recited in claim 16, wherein the manganese oxide consisting of manganese dioxide.

18. The electrochemical cell as recited in claim 1, wherein the second component consisting of an oxide of copper.

19. The electrochemical cell as recited in claim 18, wherein the oxide of copper comprises cupric oxide.

20. The electrochemical cell as recited in claim 1, wherein the cathode achieves a discharge capacity of at least 220 mAh/g at 5 mA constant current to a 1.0V end point in a half-cell test.

21. The electrochemical cell as recited in claim 1, wherein the cathode achieves a discharge capacity of at least 180 mAh/g at 30 mA constant current to a 1.0V end point in a half-cell test.

22. The electrochemical cell as recited in claim 1, wherein the separator comprises a film, the separator being configured to effectively limit the migration of anode fouling soluble species.

23. The electrochemical cell as recited in claim 22, wherein substantially all fluid communication between the anode and the cathode occurs through the separator.

24. The electrochemical cell as recited in claim 1, wherein the mixture comprising the cathode active material has a BET surface area between 1 $m^2/g$ and 200 $m^2/g$.

25. The electrochemical cell as recited in claim 1, wherein the cathode further comprises a conductive additive present in an amount between 3% and 8.5% by weight of the cathode.

26. The electrochemical cell as recited in claim 25, wherein the conductive additive is selected from the group consisting of a graphitic carbon and a carbon black.

27. The electrochemical cell as recited in claim 26, wherein the graphitic carbon comprises at least one of natural, synthetic or expanded graphite.

28. The electrochemical cell as recited in claim 26, wherein the carbon black comprises an acetylene black present in an amount within a range having a lower end of 0.2% and an upper end of 2% by weight relative to the total cathode.

29. The electrochemical cell as recited in claim 1, wherein the mixture has a particle size distribution between 0.1 microns and 200 microns.

30. The electrochemical cell as recited in claim 1, wherein the mixture is further combined with at least one of a copper oxide, a manganese oxide, a silver oxide, and a nickel oxide to produce an active material combination.

31. The electrochemical cell as recited in claim 30, wherein the manganese oxide is selected from the group consisting of EMD, NMD, and CMD.

32. The electrochemical cell as recited in claim 30, wherein the copper oxide is cupric oxide.

33. The electrochemical cell as recited in claim 30, wherein the mixture is present in the combination in a range having a lower end of 1% and an upper end of 99%, by weight, of the combination.

34. The electrochemical cell as recited in claim 33, wherein the lower end is 1% and the upper end is 70%.

35. The electrochemical cell as recited in claim 25, wherein the additive has a particle size substantially similar to the particle size of the mixture.

36. The electrochemical cell as recited in claim 31, further comprising an alkaline electrolyte.

37. The electrochemical cell of claim 36, wherein the alkaline electrolyte is present in an amount such that the cell includes a water/$MnO_2$ molar ratio greater than about 1.3.

38. The electrochemical cell as recited in claim 1, wherein the cathode has a density in a range defined at its lower end by 3.0 gm/cc and its upper end by 4.2 gm/cc.

39. The electrochemical cell as recited in claim 1, wherein the anode capacity to cell internal volume ratio is between 0.55 Ah/cc and 0.9 Ah/cc.

40. An electrochemical cell comprising:

an anode;

a cathode comprising a cathode active material, the cathode active material comprising a mixture of three different metal oxide components, wherein the components are selected from an oxide consisting of manganese and oxygen, an oxide consisting of copper and oxygen, and a component identified by the formula $Mn_xCu_yO_z$; and a separator disposed between the anode and the cathode wherein (i) y has a positive value that is less than 3, $x=3-y$, and $z=4$, (ii) y has a positive value that is less than 2, $x=2-y$, and $z=2$, or (iii) $1 \leq x \leq 5, 1 \leq y \leq 5$, and $1 \leq z \leq 20$; and wherein the cathode active material displays a continuous discharge profile that is substantially at least 1.0V for the first 20% of cell discharge when discharged at a discharge rate of 30 mA in a half-cell test.

41. The electrochemical cell as recited in claim 40, wherein the mixture is combined with at least one of a manganese oxide, a silver oxide, a copper oxide and a nickel oxide to produce an active material combination.

42. The electrochemical cell as recited in claim 41, wherein the manganese oxide is selected from the group consisting of EMD, NMD, and CMD.

43. The electrochemical cell as recited in claim 42, wherein the mixture is present in the active material combination in an amount ranging between 1% and 99%, by weight, of the active material combination.

44. The electrochemical cell as recited in claim 42, wherein the mixture is present in the active material combination in an amount ranging between 1% and 70%.

45. The electrochemical cell as recited in claim 42, the cell further comprises an alkaline electrolyte.

46. The electrochemical cell of claim 45, wherein the alkaline electrolyte is present in an amount such that the cell includes a water/$MnO_2$ molar ratio of at least 1.4.

* * * * *